US010491384B2

(12) United States Patent
French et al.

(10) Patent No.: US 10,491,384 B2
(45) Date of Patent: Nov. 26, 2019

(54) DEVICE FOR SECURE MULTI-PARTY CRYPTOGRAPHIC AUTHORIZATION

(71) Applicant: BARCLAYS BANK PLC, London (GB)

(72) Inventors: George French, London (GB); Evan Hood, London (GB); Peter Dooman, London (GB); David Taylor, London (GB)

(73) Assignee: BARCLAYS SERVICES LIMITED, London (GB)

( * ) Notice: Subject to any disclaimer, the term of this patent is extended or adjusted under 35 U.S.C. 154(b) by 139 days.

(21) Appl. No.: 15/155,550

(22) Filed: May 16, 2016

(65) Prior Publication Data
US 2016/0261409 A1 Sep. 8, 2016

Related U.S. Application Data

(63) Continuation of application No. PCT/GB2015/051200, filed on Apr. 23, 2015.

(51) Int. Cl.
*H04L 9/32* (2006.01)
*G06F 21/00* (2013.01)
(Continued)

(52) U.S. Cl.
CPC ........... *H04L 9/0861* (2013.01); *G06Q 20/10* (2013.01); *G06Q 20/3278* (2013.01); *G06Q 20/4012* (2013.01); *G09C 1/00* (2013.01); *H04L 9/00* (2013.01); *H04L 9/3066* (2013.01); *H04L 9/32* (2013.01); *H04L 9/3234* (2013.01); *H04W 12/06* (2013.01); *H04L 2209/46* (2013.01);
(Continued)

(58) Field of Classification Search
CPC ....... H04L 9/0861; H04L 9/32; H04L 9/3066; H04L 9/00; H04L 9/3234; H04L 2209/56; H04L 2209/46; H04W 12/06; H04W 4/008; H04W 12/04; G09C 1/00; G06Q 20/4012; G06Q 20/3278; G06Q 20/10
USPC ................ 713/168, 182; 726/5, 26; 380/262
See application file for complete search history.

(56) References Cited

U.S. PATENT DOCUMENTS 5,898,154 A 4/1999 Rosen
6,098,053 A 8/2000 Slater
(Continued)

FOREIGN PATENT DOCUMENTS

EP 08696327 A2 10/1998
EP 0982674 A2 3/2000
(Continued)

OTHER PUBLICATIONS

Forrest, "Building Diverse Computer Systems" IEEE, 1997.
(Continued)

*Primary Examiner* — Aravind K Moorthy
(74) *Attorney, Agent, or Firm* — Foley & Lardner LLP

(57) ABSTRACT

An electronic device that implements each module of a plurality of modules to jointly perform a secure multiparty cryptographic process to generate authorisation data based on input data, the authorisation data being suitable for use in authorising the electronic device, wherein each module uses secure data that is not shared outside that module to generate intermediate data for use in the secure multiparty cryptographic process to generate authentication data.

11 Claims, 10 Drawing Sheets

(51) Int. Cl.
| | |
|---|---|
| G06F 7/04 | (2006.01) |
| G06F 12/14 | (2006.01) |
| H04L 9/00 | (2006.01) |
| H04L 9/08 | (2006.01) |
| G06Q 20/10 | (2012.01) |
| G06Q 20/32 | (2012.01) |
| G06Q 20/40 | (2012.01) |
| G09C 1/00 | (2006.01) |
| H04L 9/30 | (2006.01) |
| H04W 12/06 | (2009.01) |
| H04W 4/80 | (2018.01) |
| H04W 12/04 | (2009.01) |
| H04W 12/00 | (2009.01) |

(52) U.S. Cl.
CPC ........... H04L 2209/56 (2013.01); H04W 4/80 (2018.02); H04W 12/00512 (2019.01); H04W 12/04 (2013.01)

(56) References Cited

U.S. PATENT DOCUMENTS

| | | | |
|---|---|---|---|
| 7,110,986 | B1 | 9/2006 | Zajkowski |
| 7,222,108 | B2 | 5/2007 | Moribatake |
| 7,546,327 | B2 | 6/2009 | Zheng |
| 9,204,299 | B2 | 12/2015 | McCann et al. |
| 2003/0084295 | A1* | 5/2003 | Xie .......... G06F 21/80 713/170 |
| 2003/0105876 | A1 | 6/2003 | Angelo |
| 2003/0194086 | A1 | 10/2003 | Lambert |
| 2004/0199474 | A1 | 10/2004 | Ritter |
| 2005/0135608 | A1 | 6/2005 | Zheng |
| 2005/0232428 | A1* | 10/2005 | Little .......... H04L 9/0841 380/277 |
| 2006/0041757 | A1 | 2/2006 | Fang |
| 2007/0116283 | A1 | 5/2007 | Tuyls |
| 2007/0244779 | A1 | 10/2007 | Wolff |
| 2008/0082817 | A1* | 4/2008 | Takahashi .......... G06F 21/31 713/155 |
| 2008/0104673 | A1 | 5/2008 | O'Connor |
| 2008/0184029 | A1 | 7/2008 | Sims |
| 2008/0229098 | A1 | 9/2008 | Ishak |
| 2008/0304657 | A1 | 12/2008 | Tuyls |
| 2009/0185687 | A1 | 7/2009 | Wankmueller et al. |
| 2009/0187757 | A1 | 7/2009 | Kerschbaum |
| 2009/0214027 | A1* | 8/2009 | Landrock .......... H04L 9/3066 380/30 |
| 2009/0215431 | A1 | 8/2009 | Koraichi |
| 2010/0100724 | A1 | 4/2010 | Kaliski |
| 2010/0280958 | A1* | 11/2010 | Hasson .......... G06Q 20/40 705/75 |
| 2010/0303230 | A1 | 12/2010 | Taveau |
| 2011/0022521 | A1 | 1/2011 | Collinge et al. |
| 2011/0179274 | A1* | 7/2011 | Veugen .......... H04L 9/3271 713/169 |
| 2011/0191586 | A1* | 8/2011 | Jung .......... H04L 9/32 713/168 |
| 2011/0202755 | A1* | 8/2011 | Orsini .......... H04L 63/029 713/151 |
| 2011/0216902 | A1 | 9/2011 | Kolesnikov |
| 2011/0231319 | A1 | 9/2011 | Bayod |
| 2011/0246769 | A1* | 10/2011 | Wilson .......... G06F 21/81 713/168 |
| 2012/0011362 | A1 | 1/2012 | Lambert |
| 2012/0072723 | A1* | 3/2012 | Orsini .......... G06F 21/6209 713/165 |
| 2012/0131350 | A1 | 5/2012 | Atherton |
| 2012/0189125 | A1 | 7/2012 | Eichholz et al. |
| 2012/0296829 | A1 | 11/2012 | Camenisch et al. |
| 2012/0297206 | A1 | 11/2012 | Nord et al. |
| 2014/0040147 | A1 | 2/2014 | Varadarajan et al. |
| 2014/0164767 | A1* | 6/2014 | Ruan .......... H04L 9/3066 713/168 |
| 2014/0185797 | A1* | 7/2014 | Yasuda .......... H04L 9/008 380/44 |
| 2014/0258736 | A1* | 9/2014 | Merchan .......... G06F 21/62 713/193 |
| 2014/0369493 | A1* | 12/2014 | Dottax .......... G06F 21/34 380/28 |
| 2015/0134966 | A1* | 5/2015 | Wallrabenstein ... H04L 63/0853 713/174 |
| 2015/0270949 | A1* | 9/2015 | Michiels .......... H04L 9/14 380/28 |
| 2016/0012252 | A1* | 1/2016 | Deleeuw .......... G06F 21/6254 726/26 |
| 2016/0028719 | A1* | 1/2016 | Kobayashi .......... H04L 9/085 713/156 |
| 2016/0072625 | A1* | 3/2016 | Takashima .......... H04L 9/065 380/44 |
| 2016/0099814 | A1 | 4/2016 | Negi et al. |
| 2016/0189147 | A1* | 6/2016 | Vanczak .......... G06Q 20/32 705/71 |
| 2017/0053566 | A1* | 2/2017 | Takashima .......... G09C 1/00 |
| 2017/0103395 | A1* | 4/2017 | Everhart .......... G06F 3/0482 |
| 2017/0222801 | A1 | 8/2017 | Le Saint |
| 2017/0244563 | A1 | 8/2017 | Bartok et al. |
| 2018/0070271 | A1 | 3/2018 | McCann et al. |

FOREIGN PATENT DOCUMENTS

| | | |
|---|---|---|
| EP | 2081143 A1 | 7/2009 |
| EP | 2355443 A2 | 8/2011 |
| EP | 2712222 A1 | 3/2014 |
| GB | 2333878 A | 8/1999 |
| WO | 2006079145 A1 | 8/2006 |
| WO | 2008028291 A1 | 3/2008 |
| WO | 2008068675 A2 | 6/2008 |
| WO | 2010064128 A2 | 6/2010 |
| WO | 2013046062 A1 | 4/2013 |
| WO | 2013155226 A1 | 10/2013 |

OTHER PUBLICATIONS

Orlandi, "Is Multiparty Computation Any Good in Practice?" IEEE, 2011.
Herzberg, "Proactive Secret Sharing or: How to Cope With Perpetual Leakage", Laboratory of Computer Science, 1995.
Bogetoft, "A Practical Implementation of Secure Auctions Based on Multiparty Integer Computation" Di Crescenza and A. Rubin (Eds.) 2006.
Barak, "Can We Obfuscate Programs", www.cs.princeton.edu. 2014.
Yao, "Protocols for Secure Computation", IEEE, 1982.
"Secure multi-party Computation", Wikipedia, 2013.
Bogetoft, "Secure Multiparty Computation Goes Live", Inst. of Food and Resource Economics.
Boneh, "Short Signatures from the Weil Pairing", Asiacrypt, 2001.
Hong, "Secure Authentication in Group Communications Using Media Access Control (MAC) Address", Recent Patents on Computer Science, 2010.
Labrou, "Wireless Wallet", IEEE, 2004.
PCT International Search Report dated Oct. 30, 2014.
Damgard, "Multiparty Computation From Somewhat Homomorphic Encryption", Department of Computer Science, 2012.
International Preliminary Report on Patentability in International Application No. PCT/GB2015/051200 dated Nov. 8, 2016 (9 pages).
International Search Report and Written Opinion in International Application No. PCT/GB2014/053234 dated Feb. 27, 2015 (9 pages).
International Search Report and Written Opinion in International Application No. PCT/GB2015/051200 dated Sep. 28, 2015 (14 pages).
Non-Final Office Action on U.S. Appl. No. 15/035,509 dated May 18, 2018.
Damgard et al, Multiparty Computation from Somewhat Homomorphic encryption, International Association for Cryptologic Research, vol. 20121106:030404, Nov. 6, 2012 (Nov. 6, 2012), pp. 1-46, XP061006405.

(56) References Cited

OTHER PUBLICATIONS

EPO Examination Report dated Mar. 14, 2019 in corresponding foreign application No. 16172782.1, pp. 1-4.

* cited by examiner

DEVICE FOR SECURE MULTI-PARTY CRYPTOGRAPHIC AUTHORIZATION

TECHNICAL FIELD

The present disclosure relates to a method of configuring a system to perform a cryptographic operation, a method of performing multiparty computation to carry out an operation, a method of configuring a system to perform a cryptographic operation, and apparatus, computer programs and systems for carrying out such methods.

The present disclosure also relates to a method for a mobile electronic device to generate and provide an output relating to a financial transaction, a method for configuring a mobile electronic device to carry out such a method, apparatus and computer programs for carrying out said methods, and a method for creating a system for performing a cryptographic process to generate a result.

BACKGROUND

It is known to provide a virtual payment product (for example a virtual credit card or a virtual debit card) on an electronic device (such as a mobile telephone) to enable the electronic device to perform a contactless payment process (for example using near field communications (NFC)). Current implementations of this use a hardware device, known as a Secure Element (SE)—the SE could be, for example, a subscriber identity module (SIM), a so-called "Chip in Handset", a MicroSD card, etc. The SE stores data relating to the virtual payment product (such as a virtual card number). SEs are seen to provide protection of payment data with the same level of security as a standard physical "chip and PIN" card as the SE has the same security properties such as hardware, operating system and procedures to provision the payment product.

However, utilising SEs has a number of problems and undesirable constraints. These may include: a large upfront investment cost; a high cost of ownership; and a large variety and number of different entities who are required to work in synchronisation to effect the technology, particularly when those entities may wish to keep their processes secret/secured.

Furthermore, managing SEs may be very complicated as a consequence of at least one of: unstable technology across the whole system due to continual technological evolution; the technology across the whole system being controlled by multiple different standards bodies (for example, EMVco, GSMA, NFC Forum, GlobalPlatform); non-standard deployments being used on the SEs (for example in Mobile Network Operators (MNOs), Wallets, Registration, Eligibility and Operations); the need continually to cater for new models of electronic devices, SIMs, Operating Systems and standards; and sensitivities over customer ownership, for example with Wallets, and loss of end to end customer experience.

SUMMARY

It would, therefore, be desirable to be able to address one or more of the above-mentioned problems.

The present disclosure provides a method of configuring a system to perform a cryptographic operation, wherein the system comprises one or more processors arranged to perform the cryptographic operation, at least in part, by performing a multiparty computation that uses a plurality of parties that jointly generate a result based on input data, wherein each party is arranged to use respective secret data for the multiparty computation, wherein the method comprises: updating the respective secret data of at least two of the parties, wherein the updated secret data is arranged so that, for each possible value of the input data, performance of the multiparty computation using the updated secret data generates the same result as performance of the multiparty computation using the secret data prior to the step of updating.

There is also described a method of altering first secret data stored as part of a first party implemented in software and second secret data stored as part of a second party implemented in software, the first secret data comprising a first initial value and the second secret data comprising a second initial value, the method comprising the steps of: modifying the first initial value to a first modified value; and modifying the second initial value to a second modified value; wherein the first party and the second party are configured to jointly perform multiparty computation using the first secret data and the second secret data to execute a cryptographic process to generate a result, and wherein execution of the cryptographic process generates a first result when the first secret data comprises the first initial value and the second secret data comprises the second initial value, and wherein execution of the cryptographic process generates a second result when the first secret comprises the first modified value and the second secret comprises the second modified value, and wherein the first result is the same as the second result.

There is also disclosed a method of configuring an electronic device to execute a cryptographic operation, the electronic device comprising a first party implemented in software and a second party implemented in software, the method comprising the step of: transitioning the first party and the second party from a first configuration to a second configuration; wherein in the first configuration, the first party comprises first secret data and the second party comprises second secret data, the first party and the second party being configured to jointly perform multiparty computation to execute a cryptographic operation based at least in part on the first secret data and the second secret data to generate a result; and wherein in the second configuration, the first party comprises modified first secret data and the second party comprises modified second secret data, the first party and the second party being configured to jointly perform multiparty computation to execute the cryptographic operation based at least in part on the first secret data and the second secret data to generate the result; and wherein the modified first secret data is different from the first secret data and the modified second secret data is different from the second secret data.

There is also described a method of configuring an electronic device to generate a result obtainable by performing a cryptographic algorithm based on a key, the method comprising the steps of: implementing in software on the electronic device a first party comprising first secret data and a second party comprising second secret data, the first party and the second party being configured to jointly perform multiparty computation using the first secret data and the second secret data to generate the result; and modifying the first secret data and the second secret data, the first party and the second party being configured to jointly perform multiparty computation using the modified first secret data and the modified second secret data to generate the result.

For any of the above mentioned methods, the cryptographic operation may be based, at least in part, on a key, wherein said updating does not change said key.

Preferably, updating the respective secret data of the at least two of the parties comprises updating the respective secret data using at least a modification value.

Optionally, updating the respective secret data of the at least two parties comprises: a first of the at least two parties adding the modification value to the respective secret data of the first party; and a second of the at least two parties subtracting the modification value from the respective secret data of the second party.

Optionally, each of the at least two of the parties determine the modification value.

Optionally, the modification value is determined using at least a public key associated with the first of the at least two of the parties and a public key associated with the second of the two or more parties.

Optionally, determining the modification value further comprises public-private key exchange between the at least two parties.

Optionally, the public-private key exchange is based, at least in part, on elliptic curve cryptography Optionally, the modification value is determinable using at least a public key associated with a first of the at least two parties and a public key associated with a second of the at least two parties, and the method further comprises: updating the public keys using at least the modification value such that a new modification value is determinable using at least the updated public keys.

Optionally, the method further comprises: before updating the respective secret data of at least two of the parties, checking that the updated respective secret data will have positive values; and updating the respective secret data of at least two of the parties only if the updated respective secret data will have positive values.

Optionally, the method further comprises: if either the updated respective secret data of the first party or the respective secret data of the second party will have a negative value, performing a corresponding predetermined action indicative of a negative value.

Optionally, the method further comprises: counting the number of times the respective secret data of at least two of the parties has been updated; and updating the respective secret data of at least two of the parties only if the counted number of times the respective secret data of at least two of the parties has been updated is less than a threshold value.

Optionally, the method further comprises: if the counted number of times the respective secret data of at least two of the parties has been updated is greater than or equal to a threshold value, performing a corresponding predetermined action indicative of the threshold value having been reached.

Optionally, the cryptographic operation comprises a data encryption process.

Optionally, the cryptographic operation comprises a keyed hash function for generating a message authentication code.

Optionally, the cryptographic operation comprises generating a digital signature.

Preferably, the cryptographic operation is based, at least in part, on (a) data relating to a transaction and (b) electronic device information, wherein the electronic device information comprises one or both of: (i) information suitable for identifying the mobile electronic device and (ii) information specifying at least part of a configuration of the mobile electronic device.

Optionally, the information suitable for identifying the mobile electronic device is based, at least in part, on at least one of a device MAC address; and/or a device IMEI, and/or wherein the information specifying at least part of a configuration of the mobile electronic device is based, at least in part, on at least one of: the whole or a part of an operating system of the device; a version or type of the mobile electronic device; and/or a mobile operating system application software token provided by a platform application store stored on the mobile electronic device.

The present disclosure also provides a method of configuring a system to perform a cryptographic operation, wherein the system comprises one or more processors arranged to perform the cryptographic operation, at least in part, by performing a multiparty computation that uses a plurality of parties that jointly generate a result based on input data, wherein each party is arranged to use respective secret data for the multiparty computation, wherein the method comprises: checking that updating the respective secret data will result in the updated respective secret data having positive values; and updating the respective secret data of at least two of the parties only if the updated respective secret data will have positive value, wherein the updated secret data is arranged so that, for each possible value of the input data, performance of the multiparty computation using the updated secret data generates the same result as performance of the multiparty computation using the secret data prior to the step of updating.

The present disclosure also provides a method of configuring a system to perform a cryptographic operation, wherein the system comprises one or more processors arranged to perform the cryptographic operation, at least in part, by performing a multiparty computation that uses a plurality of parties that jointly generate a result based on input data, wherein each party is arranged to use respective secret data for the multiparty computation, wherein the method comprises: counting the number of times the respective secret data of at least two of the parties has been updated; and updating the respective secret data of at least two of the parties only if the counted number of times the respective secret data of at least two of the parties has been updated is less than a threshold value, wherein the updated secret data is arranged so that, for each possible value of the input data, performance of the multiparty computation using the updated secret data generates the same result as performance of the multiparty computation using the secret data prior to the step of updating.

The present disclosure also provides an electronic device comprising: a processor; and a memory storing a software program, wherein the software program, when executed by the processor, causes the processor to perform any of the above disclosed method.

The present disclosure also provides a system for any of the above disclosed methods.

The present disclosure also provides one or more software programs configured to perform any of the above disclosed methods when executed on one or more processors of one or more electronic devices.

The present disclosure also provides a method of performing multiparty computation to carry out an operation, wherein the multiparty computation uses a plurality of parties arranged to jointly generate a result for the operation based on input data, the method comprising: each party of the plurality of parties generating corresponding intermediate data for use in generating the result; and performing a first authentication process on first authentication data, the first authentication data being based on the intermediate data generated by a first party of the plurality of parties, and, if the first authentication data fails the first authentication process, performing a corresponding predetermined action indicative of failure of the operation.

Preferably, the first authentication data comprises the intermediate data generated by the first party.

Optionally, generating intermediate data for use in generating the result is based, at least in part, on elliptic curve cryptography, and the first authentication process comprises determining if the intermediate data generated by the first party is on an elliptic curve.

Optionally, said first authentication process is performed by a second party of the plurality of parties, the second party being different from the first party.

Preferably, the first authentication process is based, at least in part, on the intermediate data generated by the second party.

Preferably, the first authentication process is based, at least in part, on the intermediate data generated by a second party of the plurality of parties, the second party being different from the first party.

Optionally, the first authentication data comprises a first authentication value generated by the first party, the first authentication value being based, at least in part, on: the intermediate data generated by the first party; and data based at least in part on the input data.

Optionally, the first authentication value is based, at least in part, on: data based at least in part on a public key associated with the first party.

Optionally, the first authentication process further comprises: comparing the first authentication value against a check value generated by a second party of the plurality of parties, wherein: the check value is based, at least in part, on: the intermediate data generated by the first party; and data based at least in part on the input data.

Optionally, the check value is also based, at least in part, on data based at least in part on a public key associated with the first party.

Optionally, the first authentication data comprises a first authentication value generated by the first party, the first authentication value being based, at least in part, on $Q_1$, $W_1$, intermediate data generated by the first party, $U_1$ and $V_1$, wherein: $Q_1$=a public key associated with the first party; $W_1$=a hash of the input data, wherein the hash is generated by the first party; $U_1=r_1*G$, wherein $r_1$ is a random, or pseudo random number, and G is a generator of an elliptic curve; and $V_1=r_1*W_1$.

Optionally, the first authentication process further comprises: comparing the first authentication value against a check value generated by a second party of the plurality of parties, wherein: the check value is based, at least in part, on $Q_1$, $W_2$, intermediate data generated by the first party, $U_1$ and $V_1$, and wherein $W_2$=a hash of the input data, wherein the hash is generated by the second party.

Optionally, if the comparison of the first authentication value against the check value does not meet a pass criterion, the first authentication data fails the first authentication process.

Optionally, the pass criterion is that the first authentication value is the same as the check value.

Optionally, a second authentication process is performed on second authentication data, the second authentication data being based on the intermediate data generated by the second party, and, if the second authentication data fails the second authentication process, performing a corresponding predetermined action indicative of failure of the operation.

Optionally, said second authentication process is performed by the first party.

The second authentication process may be analogous to the first authentication process performed by the second party. That is to say:

Preferably, the second authentication process is based, at least in part, on the intermediate data generated by the first party.

Preferably, the second authentication process is based, at least in part, on the intermediate data generated by a first party of the plurality of parties.

Optionally, the second authentication data comprises a second authentication value generated by the second party, the second authentication value being based, at least in part, on: the intermediate data generated by the second party; and data based at least in part on the input data.

Optionally, the second authentication value is based, at least in part, on: data based at least in part on a public key associated with the second party.

Optionally, the second authentication process further comprises: comparing the second authentication value against a check value generated by a first party of the plurality of parties, wherein: the check value is based, at least in part, on: the intermediate data generated by the second party; and data based at least in part on the input data.

Optionally, the check value is also based, at least in part, on data based at least in part on a public key associated with the second party.

Optionally, the second authentication data comprises a second authentication value generated by the second party, the second authentication value being based, at least in part, on $Q_2$, $W_2$, intermediate data generated by the second party, $U_2$ and $V_2$, wherein: $Q_2$=a public key associated with the first party; $W_1$=a hash of the input data, wherein the hash is generated by the first party; $U_2=r_2*G$ wherein $r_2$ is a random, or pseudo random number, and G is a generator of an elliptic curve; and $V_2=r_2*W_1$.

Optionally, the second authentication process further comprises: comparing the second authentication value against a further check value generated by the second party, wherein: the further check value is based, at least in part, on $Q_2$, $W_1$, intermediate data generated by the first party, $U_2$ and $V_2$, and wherein $W_1$=a hash of the input data, wherein the hash is generated by the first party.

Optionally, if the comparison of the second authentication value against the further check value does not meet a pass criterion, the second authentication data fails the second authentication process.

Optionally, the pass criterion is that the second authentication value is the same as the further check value.

Preferably, each party of the plurality of parties comprises respective secret data, and wherein the respective intermediate data generated by each of the plurality of parties is based at least in part on the input data and respective secret data.

Also provided in the present disclosure is a method for authenticating at least part of a multiparty computation process performed between a first party implemented in software and a second party implemented in software, the first party and the second party being configured jointly to execute a process using multiparty computation to generate an output based at least in part on a first result and a second result, the method for authenticating comprising the steps of: the first party executing a first operation to generate the first result; the second party executing a second operation to generate the second result; the first party providing the first result to the second party; and the second party performing an authentication process on the first result using at least the second result.

Optionally, the method further comprises the steps of: the first party generating, based at least in part on the first result, first authentication data; the first party providing the first authentication data to the second party; and the second party performing the authentication process on the first result using at least the first authentication data and the second result.

Optionally, the method further comprises the steps of: the second party providing the second result to the first party; and the first party performing an authentication process on the second result using at least the first result.

Optionally, the method further comprises the steps of: the second party generating, based at least in part on the second result, second authentication data; the second party providing the second authentication data to the first party; and the first party performing the authentication process on the second result using at least the second authentication data and the first result.

Also provided in the present disclosure is a method for performing a cryptographic process to generate an output, the method comprising the steps of: a first party, implemented in software, executing a first operation to generate a first result; a second party, implemented in software, executing a second operation to generate a second result; the first party providing the first result to the second party; the second party performing an authentication process on the first result using at least the second result; and the second party generating the output based at least in part on the first result and the second result.

Also provided in the present disclosure is a method for authenticating at least part of a multiparty computation process performed between a first party implemented in software and a second party implemented in software, the first party and the second party being configured jointly to execute a process using multiparty computation to generate an output based at least in part on a first result, which is obtainable by the first party executing a first operation, and a second result, which is obtainable by the second party executing a second operation, the method for authenticating comprising the steps of: the first party providing the first result to an authentication module implemented in software; the second party providing the first result to the authentication module implemented in software; and the authentication module performing an authentication process on the first result using at least the second result.

Optionally, the method further comprises: the authentication module performing an authentication process on the second result using at least the first result.

Also provided in the present disclosure is a method of configuring a system to perform a cryptographic operation, the method comprising the steps of: configuring the system to perform multiparty computation to perform the cryptographic operation according to the above disclosed methods, and the system performing the multiparty computation according to the above disclosed methods.

Also provided in the present disclosure is an electronic device comprising: a processor; and a memory storing a software program, wherein the software program, when executed by the processor, causes the processor to perform any one of the above disclosed methods.

Also provided in the present disclosure is a system arranged to carry out any of the above disclosed methods.

Also provided in the present disclosure is one or more computer programs that, when executed by one or more processors, cause the one or more processors to carry out any of the above disclosed methods.

BRIEF DESCRIPTION OF THE DRAWINGS

The present invention is described herein, by way of example only, with reference to the following drawings in which.

DETAILED DESCRIPTION

Figure 1:
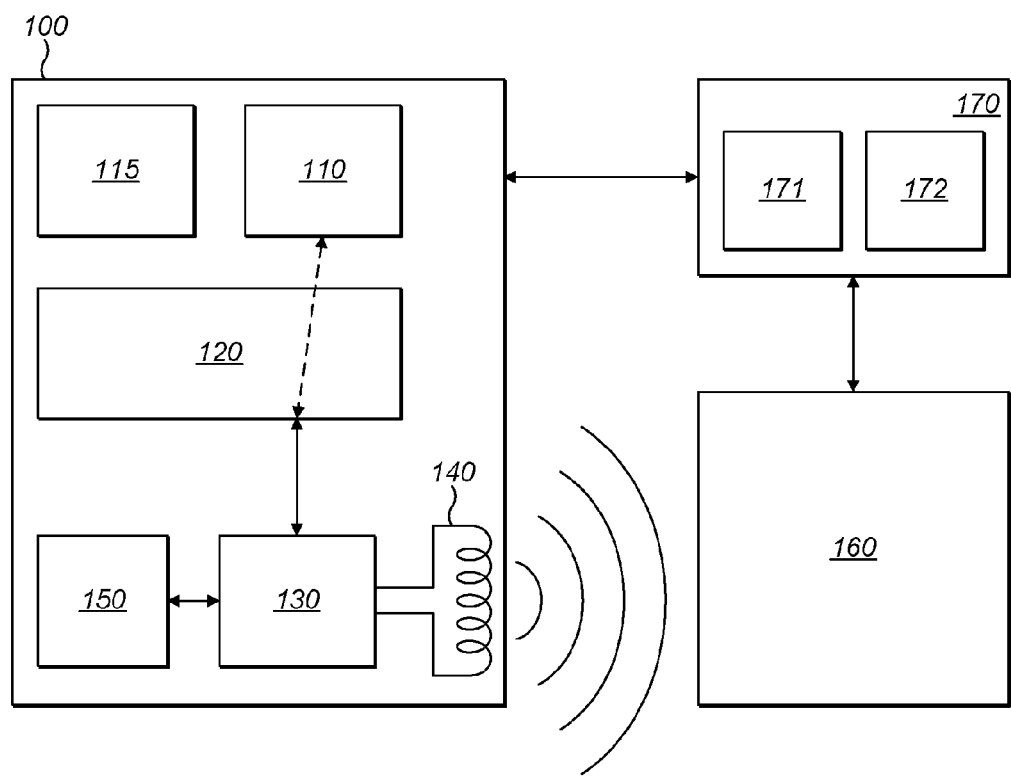
FIG. 1 shows a representation of a virtual card NFC payment system.

FIG. 1 shows a representation of a virtual card NFC payment system according to an embodiment of the invention. The system comprises a mobile electronic device 100, a point of sale (POS) 160 and a host system 170.

The electronic device 100 comprises a processor (not shown in FIG. 1) that is arranged to execute virtual card payment software 110 (referred to herein as transaction software 110) that is stored in a memory of the mobile electronic device 100. The virtual card payment software is for providing a virtual payment product (for example a virtual credit card or a virtual debit card or a virtual merchant/store card)—the virtual payment product is to enable payment transactions to be carried out using the electronic device 100. The processor is also arranged to execute an operating system (OS) 120, and may execute any other software 115 that may be stored in the memory of the electronic device 100.

The electronic device 100 also comprises an NFC controller 130 and an NFC input/output element 140 (such as an aerial for NFC communications). NFC and protocols for performing NFC are well-known in this field of technology and shall not be described in detail herein. The NFC controller 130 is responsible for performing the NFC functionality at the electronic device 100 and for using the NFC input/output element 140 to communicate, via NFC, with another NFC-enabled device (such as the POS 160, as discussed below).

The electronic device 100 may also comprise a (potentially removable) secure element (SE) 150, for example a subscriber identity module (SIM) 150, although it will be appreciated that embodiments of the invention do not require the SE 150.

The electronic device 100 is "mobile" in the sense that a user can carry or move it to the POS 160 in order to be able to carry out a transaction via the POS 160. The electronic device 100 may be, for example, a mobile telephone, a personal digital assistant, a tablet computer, a laptop, etc.

The POS 160 may be any point of sale or terminal, for example, a point of sale located at a shop, a merchant retail outlet, a train station, an airport, a fuel station, etc. The POS 160 may be any terminal capable of accepting NFC transactions from the electronic device 100, for example a second NFC enabled electronic device (such as a mobile telephone, a personal digital assistant, a tablet computer, a laptop), or a terminal that is attached to and in communication with a second electronic device, for example a mobile telephone, a personal digital assistant, a tablet computer, a laptop, etc., (for example an NFC terminal in a taxi that is attached to and in communication with a second electronic device, such as the driver's mobile telephone etc). As POSs are well-known in this field of technology, they shall not be described in more detail herein except as necessary to understand embodiments of the invention.

The electronic device 100 and the POS 160 are configured to communicate wirelessly with each other using suitable NFC radio frequency (RF) protocols when the NFC input/output element 140 and the POS 160 are within range of each other.

The POS 160 may communicate with the host system 170 by any suitable communications means, such as via one or more networks (such as the internet, a metropolitan area network, a local area network, a telecommunications network, a satellite network, etc.) and the communications may comprise wired and/or wireless communications.

The host system 170 may be operated, for example, by the provider of, or operator associated with, the virtual payment product being provided by the transaction software 110, and/or by a third party that may be associated with such a provider or operator. For example, the host system 170 may be operated by a bank or a building society. The host system 170 may be configured to carry out a number of different tasks relating to transaction execution, including authorisation of transactions and actually providing the electronic device 100 with the transaction software 110 in the first place. Thus, the host system 170 may be viewed as comprising an authorisation (or authentication) system 171 for authorising a transaction and a provisioning system 172 for providing the transaction software 110 to the electronic device 100. The authorisation system 171 and the provisioning system 172 may be operated by different entities (and may, therefore, be separate systems) or may be operated by the same entity (and may, therefore, be separate systems or a combined system). The authorisation system 171 and the provisioning system 172 may each comprise one or more servers that may be arranged to carry out one or more operations as discussed below.

The electronic device 100 may also be arranged to communicate with the host system 170 by any suitable communications means, such as via one or more networks (such as the internet, a metropolitan area network, a local area network, a telecommunications network, a satellite network, etc.). Such communications may occur during a software provisioning process (described in more detail later). However, a data connection directly (i.e. not via the POS 160) between the electronic device 100 and the host system 170 when performing a transaction is not necessary.

The electronic device 100 is arranged so that the transaction software 110 may access and use, or hook into, the NFC controller 130 via the OS 120, without any involvement of the SE 150. Thus, the transaction software 110 may emulate an SE. The transaction software 110 may send commands and/or data to the NFC controller 130 and receive and process commands and/or data sent to the NFC controller 130 from the POS 160. Thus, NFC transactions may be performed on the client side (i.e. on the electronic device 100 side) by the transaction software 110, without any need for, or recourse to, the SE 150. Thus, the SE 150 is shown in FIG. 1 only for the purposes of demonstrating a connection that may exist between the NFC controller 130 and an SE 150, since the SE 150 is not required at all for carrying out NFC transactions in embodiments of the invention. Thus, the disadvantages discussed above in using an SE 150 are overcome.

When carrying out an NFC transaction, before a transaction is approved or allowed by the authorisation system 171, transaction information is sent to the authorisation system 171 (to enable the authorisation system 171 to allow/approve/authorise or refuse/decline the transaction) to minimise the risk of actioning fraudulent transactions.

Figure 2:
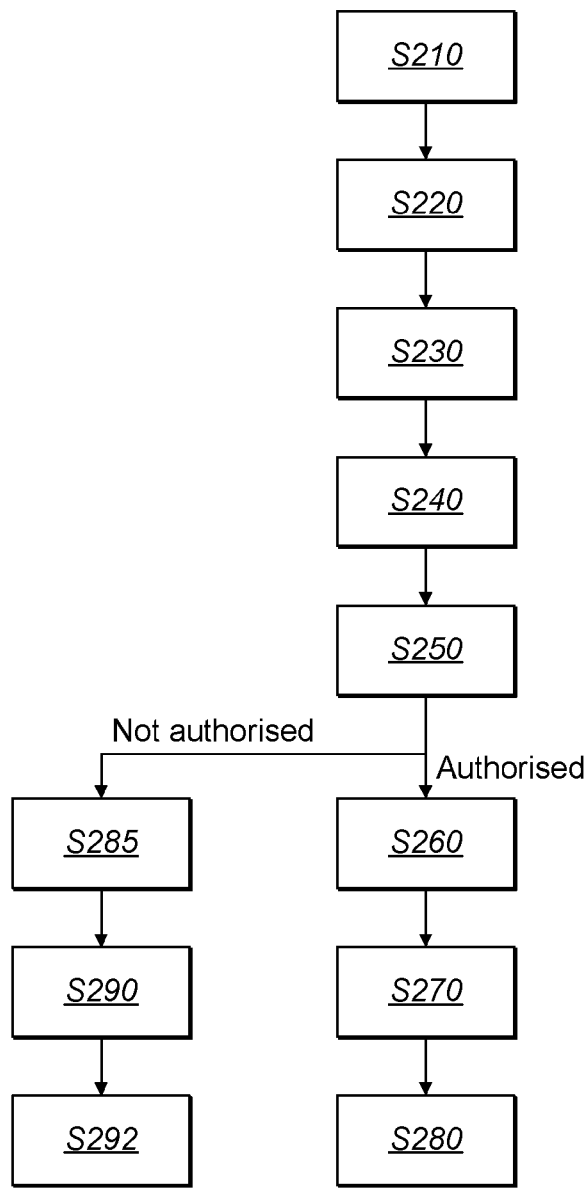
FIG. 2 is a flowchart illustrating a method for handling a transaction in the virtual card NFC payment system of FIG. 1.

FIG. 2 is a flowchart illustrating a method for handling a transaction in the virtual card NFC payment system of FIG. 1. The method illustrated in FIG. 2 assumes that the electronic device 100 is close enough to the POS 160 to enable the electronic device 100 and the POS 160 to communicate with each other via NFC.

In step S210, the POS 160 transmits information relating to the desired payment transaction to the transaction software 110 (via the NFC controller 130 of the electronic device 100). The information relating to the transaction may comprise transaction data defined by an electronic transaction standard, for example the EMV (Europay, MasterCard and Visa) global standards. The information relating to the transaction may comprise at least one of: a transaction amount (authorised), a transaction amount (other), a terminal (POS) country code, transaction currency code, transaction date, transaction type and an unpredictable number. It will be appreciated, however, that the information relating to the transaction may comprise any type of data or information or attribute associated with, or describing, the desired transaction.

In Step S220, the transaction software 110 generates authentication data based on the information relating to the transaction that the transaction software 110 received at Step S210. The generation of this authentication data shall be described in more detail below with reference to FIG. 3. This authentication data is data that the authorisation system 171 can use when authenticating the transaction.

As shall be described in more detail later, the authentication data is generated based, at least in part, on (a) the data relating to the transaction received at Step S210 and (b) device information, wherein the device information comprises one or both of: (i) information on the electronic device 100 suitable for identifying the electronic device 100 and (ii) information specifying at least part of a configuration of the electronic device 100.

In Step S230, the transaction software 110 outputs authentication information (namely information comprising the generated authentication data, and possibly other data too). The authentication information is passed from the transaction software 110 to the NFC controller 130 for NFC transmission to the POS 160.

In Step S240, the POS 160 receives the authentication information and transmits an authorisation request to the authorisation system 171 via a data connection.

In some embodiments, the authentication information received from the transaction software 110 merely contains the authentication data that the transaction software 110 generated. In this case, the POS 160 may generate the authorisation request so that the authorisation request comprises, or is based on, the authentication data and at least part of the information relating to the transaction that was transmitted to the transaction software 110. In other embodiments, the authentication information received from the transaction software 110 contains the authentication data that the transaction software 110 generated along with at least part of the information relating to the transaction that was transmitted to the transaction software 110. In this case, the POS 160 may generate the authorisation request so that it comprises the authentication information. In either case, as shall be described shortly, the authentication information may comprise further data (in addition to the authentication data and data relating to the transaction).

In Step S250, the authorisation system 171 receives the authorisation request and performs an authorisation process on the authorisation request. Part of this authorisation process may comprise checking various rules, such as whether a credit limit or overdraft limit associated with the virtual payment product would be exceeded if the transaction were approved (in which case the authorisation system 171 would decline the transaction). As part of the authorisation process, the authorisation system performs 171 an authentication process. In particular, the authorisation system 171 performs an authentication process on the data relating to the transaction (which formed part of the authorisation request received at the authorisation system 171) using the authentication data (which also formed part of the authorisation request received at the authorisation system 171). The authentication process determines whether the information relating to the transaction received in the authorisation request is authentic—in embodiments of the invention, the information relating to the transaction is authentic if (a) the information relating to the transaction has not been modified and (b) the information relating to the transaction was generated by the particular transaction software 110 executing on the particular electronic device 100 that the authorisation system 171 believes is involved in this transaction. This shall be described in more detail later. If is determined that the information relating to the transaction is not authentic, then the result of the authorisation process is that the transaction is to be declined; if is determined that the information relating to the transaction is authentic, then the result of the authorisation process is that the transaction is to be allowed provided, of course, that each of the other rules (if any) that are checked, as mentioned above, indicate that the transaction is to be allowed.

If it is determined that the transaction is allowed, then in Step S260 the authorisation system 171 (or by some other system associated with the authorisation system 171) performs transaction processing to give effect to the transaction (as is well-known in this field of technology). In Step S270, the authorisation system 171 may send to the POS 160 a confirmation that the transaction has been allowed. The POS 160 may then provide an indication to the user of the electronic device 100 that the transaction has been allowed. In Step S280, the POS 160 may transmit a confirmation that the transaction has been allowed to the transaction software 110. The transaction software 110 may then provide an indication to the user of the electronic device 100 that the transaction has been allowed.

If, on the other hand, it is determined that the transaction is declined, then in Step S285 the authorisation system 171 (or by some other system associated with the authorisation system 171) performs processing relating to declining the transaction (e.g. logging a declined transaction, as is well-known in this field of technology). In Step S290, the authorisation system 171 may send to the POS 160 an indication that the transaction has been declined. The POS 160 may then provide an indication to the user of the electronic device 100 that the transaction has been declined. In Step S292, the POS 160 may transmit an indication to the transaction software 110 that the transaction has been declined. The transaction software 110 may then provide an indication to the user of the electronic device 100 that the transaction has been declined.

Figure 3:
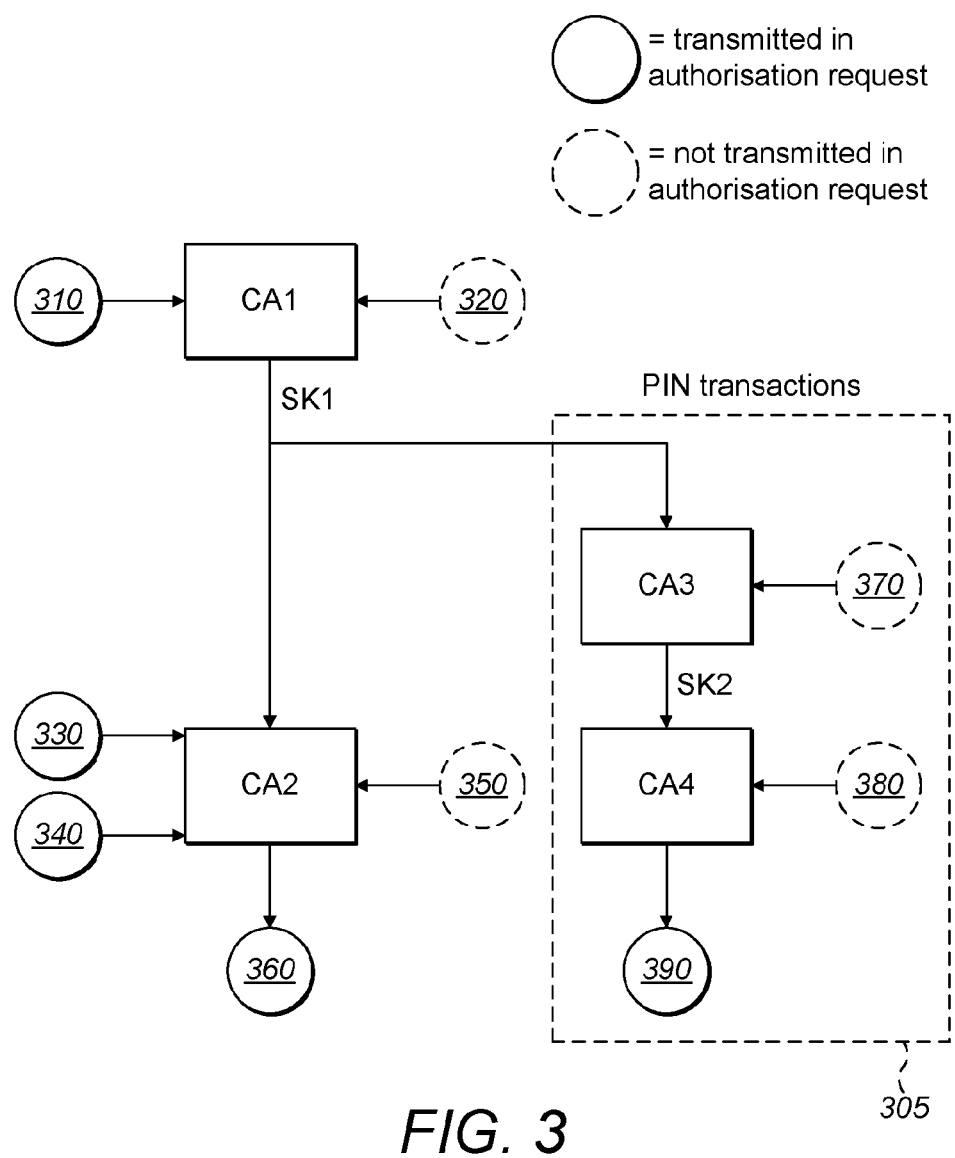
FIG. 3 is a flowchart illustrating a method by which authentication data may be generated for use in the method of FIG. 2.

FIG. 3 is a flowchart illustrating a method by which authentication data may be generated for use in the method of FIG. 2. In particular, FIG. 3 is a flowchart illustrating a method by which authentication data may be generated at Step S220 of FIG. 2.

The transaction software 110 generates a first session key (SK1) using a first algorithm/process (CA1), which may comprise a cryptographic algorithm/process. SK1 may be generated in any suitable way for generating a session key, as is known in this field of technology. SK1 may be of any suitable data size, but generally related to the cryptographic algorithm in CA1, for example, 16 to 24 bytes.

In one embodiment, the electronic device 100 stores a counter 310, referred to below as an application transaction counter (ATC) 310. ATC 310 is a number that is incremented with every transaction and, therefore, is unique to that transaction. ATC 310 may have any suitable data size, for example 2 bytes, and if the number of transactions reaches the maximum allowable (which may be the data limit of ATC 310, or a lower number fixed during provisioning of the virtual payment product), the virtual payment product may expire and a new virtual payment product may be provisioned to the electronic device 100 (e.g. by updating the transaction software 110).

The transaction software 110 may generate SK1 by providing ATC 310 as an input to CA1, so that SK1 is generated based, at least in part, on ATC 310. In this way, SK1 should be different for every transaction (since each transaction will have a different value for ATC 310).

In some embodiments, CA1 is a keyed algorithm, and CA1 uses a cryptographic key as an input to generate SK1. Therefore, the transaction software 110 may have embedded, as part of the transaction software, a cryptographic key, referred to herein as a device key (or DK) 320, which the transaction software 110 uses as an input to CA1 in order to generate SK1. DK 320 may be stored in any manner within the transaction software 110 using any appropriate techniques—preferably, DK 320 is stored in a secured manner using any well known cryptographic or security techniques as are well-known in this field of technology. DK 320 may have any suitable data size, but generally related to the cryptographic algorithm in CA1, for example it may be between 16 to 24 bytes. DK 320 may be configured by the provisioning system 172 to be unique to the electronic device 100 (as described later). DK 320 may be managed and/or updated (for example, if it expires) on a periodic basis by the provisioning system 172.

It will be appreciated that CA1 may receive, and process, additional data as its input to generate SK1.

As the transaction software 110 uses SK1 to generate the authentication data, the authentication data is generated based, at least in part, on ATC 310.

Having generated SK1, an authentication request cryptogram (ARQC) 360 is generated using a second algorithm/process CA2, which may comprise a cryptographic algorithm/process. To generate ARQC 360, CA2 uses as an input (a) the data relating to the transaction 340 received by the transaction software 110 at Step S210 and (b) device information 350, wherein the device information 350 comprises one or both of: (i) information on the electronic device 100 suitable for identifying the electronic device 100 and (ii) information specifying at least part of a configuration of the electronic device 100. To generate ARQC 360, CA2 may also use as an input internal card data 330. In some embodiments, CA2 is a keyed algorithm, and CA2 then uses a cryptographic key, namely SK1, as an input for generating ARQC 360. It will be appreciated that CA2 may receive, and process, additional data as its input to generate ARQC 360.

The internal card data 330 may comprise information defined in EMV standards, for example at least one of: an identifier of the type of cryptogram returned to the POS 160 (for example, decline, go-online); a flag to indicate whether a PIN was entered or provided; a flag to indicate whether the transaction software 110 has communicated with the authorisation system 171; a flag to indicate whether the ATC 310 is at a threshold; a flag to indicate whether transit counters are at a threshold; some reserved flags (which may be set to '0'); and a cryptogram version number (CVN). It will be appreciated that the internal card data 330 may comprise additional, or alternative, data relating to the virtual payment product being provided by the transaction software 110 (i.e. the virtual payment product to which the transaction is associated). The internal card data 330 used by CA2 may have any suitable data size, for example up to 20 bytes.

The device information 350 may comprise, or be based on (e.g. by calculating a cryptographic hash), any type of data that is one or both of: (i) information being stored on the electronic device 100 suitable for identifying the electronic device 100 and (ii) information specifying at least part of a configuration of the electronic device 100. For example, the device information 350 may comprise, or be based on: a device MAC address for the electronic device 100; an International Mobile Station Equipment Identity (IMEI) for the electronic device 100; the whole or a part of the OS 120; a version or type or serial number of the electronic device 100; an application software token provided by the mobile OS platform application store (e.g. an Android Play Store software token, a Microsoft Windows Marketplace software token, a RIM BlackBerry World software token, an Apple App Store software token etc.) being stored on the electronic device 100; etc. The transaction software 110 may gather the device information 350 from the electronic device 100 at the time of generating the ARQC 360 to ensure that the ARQC 360 that is generated is based on the current configuration and identity of the specific electronic device 100 that is executing the transaction software 110. The device information 350 may have any suitable data size, for example up to 30 bytes.

ARQC 360 may take a form defined in a transaction authentication standard, for example EMV standards, and, as such, may typically have a data size of 8 to 16 bytes. However, rather than generating an ARQC, CA2 may alternatively generate any suitable authentication cryptogram of any suitable size but generally related to the cryptographic algorithm in CA2.

The ARQC 360 may be truncated, or otherwise modified, in order to achieve a target data size.

The authentication data generated at Step 220 of FIG. 2 is based on the ARQC 360. The authentication data may be equal to the ARQC 360. As discussed below, the authentication data may be formed by combining the ARQC 360 with other data.

The authentication information output by the transaction software at Step 230 comprises the authentication data generated as set out above. In embodiments that make use of ATC 310 to generate ARQC 360, the authentication information further comprises ATC 310 (so that the ATC 310 can be used during the authentication process at the authorisation system 171). In embodiments that make use of the internal card data 330 to generate ARQC 360, the authentication information further comprises the internal card data 330 (so that the internal card data 330 can be used during the authentication process at the authorisation system 171). As discussed above, in some embodiments, the authentication information output by the transaction software 110 further comprises the data relating to the transaction 340.

In embodiments that make use of DK 320 to generate ARQC 360, DK 320 is not included in the authentication information. Instead, as will be discussed shortly, DK 320 (or a value based on DK 320) is retrieved or derived by the authorisation system 171 during the authentication process in Step S250. In this way, DK 320 may not be obtained by intercepting the authorisation request transmitted in Step S240 and, therefore, is kept secret from third parties. Furthermore, this means that the value of DK 320 used by the transaction software 110 to generate the ARQC 360 must match a corresponding value that the authorisation system 171 has stored and has associated with the transaction software 110 on the electronic device 100 in order for the authentication process to successfully authenticate the data relating to the transaction. This enables the authorisation system 171 to verify that the authorisation request has originated from the correct transaction software 110 operating on the correct electronic device 100.

Similarly, the device information 350 is not included in the authentication information. Instead, as will be discussed shortly, the device information 350 (or a value based on the device information 350) is retrieved or derived by the authorisation system 171 during the authorisation part of the authorisation process in Step S250. In this way, the device information 350 may not be obtained by intercepting the authorisation request transmitted in Step S240 and, therefore, is kept secret from third parties. Furthermore, this means that the value of the device information 350 used by the transaction software 110 to generate the ARQC 360 must match a corresponding value that the authorisation system 171 has stored and has associated with the transaction software 110 on the electronic device 100 in order for the authentication process to successfully authenticate the data relating to the transaction. This again enables the authorisation system 171 to verify that the authorisation request has originated from the correct transaction software 110 operating on the correct electronic device 100 tied to the virtual payment product.

In some embodiments, the transaction software 110 is arranged to receive a personal-identification-number (PIN), or some other form of personal identification (such as a fingerprint or retinal image) entered or provided by a user of the electronic device 110. In the following, the term PIN shall be used to refer to a personal-identification-number or other value/data (such as fingerprint data or retinal image data) for identifying the user of the electronic device 110. In such embodiments, the transaction software 110 is arranged to generate PIN authentication data based, at least in part, on the PIN provided by the user. The authentication information output at Step 230 of FIG. 2 may then be based, at least in part, on the PIN authentication data. Examples of this are discussed below.

In some embodiments, the transaction software is arranged to detect, based on the received data relating to the transaction, whether the transaction satisfies a predetermined criterion. The receiving/obtaining of a PIN and generation of PIN authentication data may then be performed only if it is determined that the transaction satisfies the predetermined criterion. As an example, the predetermined criterion may be that a transaction value for the transaction exceeds a predetermined threshold (i.e. this is a "high value" transaction) and/or that the data relating to the transaction requires or specifies that a PIN is received from the user. It will be appreciated that other types of criterion could be used in addition or alternatively. Alternatively, the transaction software 110 may be configured to support the ability to require a PIN for every transaction, or to require a PIN at predetermined intervals, for example after a certain number of transactions, after the transactions amounts reach a certain cumulative total, etc.

If the transaction software determines that a PIN is required, then, in additional to the steps mentioned above with reference to FIG. 3, the transaction software 110 also undertakes the 'PIN transaction' steps shown in the dashed-line box 305 in FIG. 3. If it is determined that a PIN is required the transaction software 110 may ask the user to enter their PIN, or, if the user has already entered their PIN (for example, because the transaction software is configured to enable the user to enter their PIN at the start of transactions), to use the already entered PIN.

In particular, in the 'PIN transaction' steps shown in the dashed line box 305 in FIG. 3, the transaction software 110 may generate a second session key (SK2) using a third algorithm/process (CA3), which may comprise a cryptographic algorithm. In some embodiments, CA3 is a keyed algorithm, and CA3 then uses SK1 as a cryptographic key as an input for generating SK2. The transaction software 110 may have embedded, as part of the transaction software 110, an initialisation vector 370 (or predetermined constant data value) which the transaction software 110 uses as an input to CA3 in order to generate SK2. The initialisation vector 370 may be stored in any manner within the transaction software 110 using any appropriate techniques—preferably, the initialisation vector 370 is stored in a secured manner using any well known cryptographic or security techniques as are well-known in this field of technology. The initialisation vector 370 may have any suitable data size, for example it may be between 16 to 24 bytes. The initialisation vector 370 may be configured by the provisioning system 172 to be unique to the electronic device 100 (as described later). The initialisation vector 370 may be managed and/or updated (for example, if it expires) on a periodic basis by the provisioning system 172.

SK2 may have any suitable data size, but generally related to the cryptographic algorithm in CA3, for example 16 to 24 bytes.

Having generated SK2, PIN authentication data 390 may be generated using a fourth algorithm/process (CA4), which may comprise a cryptographic algorithm. In some embodiments, CA4 is a keyed algorithm, and CA4 then uses SK2 as a cryptographic key as an input for generating the PIN authentication data 390. CA4 uses, as an input, a PIN 380 entered or provided by the user.

The user entered PIN 380 may be of any length, for example it may be four digits, five digits or six digits long. The user entered PIN 380 may have any suitable data size, for example 8 bytes. The PIN authentication data 390 may be of any suitable data size, but generally related to the cryptographic algorithm in CA4, for example 4 to 16 bytes.

The PIN authentication data 390 may be included as part of the authentication information. In particular, the authentication data may be generated based on the PIN authentication data, for example by combining the ARQC 360 with the PIN authentication data. This may be done, for example, by concatenating at least part of the ARQC 360 and at least part of the PIN authentication data 390. Alternatively, it may be necessary according to transaction standards, such as the EMV global standards, for the authentication data to have the same data size regardless of whether or not the PIN transaction steps are performed. Therefore, in some embodiments, the PIN authentication data 390 may be used to modify the ARQC 360, for example by replacing at least some (e.g. a number of bits or bytes) of the ARQC 360 with a corresponding amount of the PIN authentication data 390, or by performing an operation on the ARQC 360 using the PIN authentication data 390, for example by XORing at least part of the ARQC 360 with at least part of the PIN authentication data 390. In this way, the authentication data may always have the same length, being either the ARQC 360 or a modified version of the ARQC 360 (modified using the PIN authentication data 390).

The initialisation vector 370 and the user entered PIN 380 do not form part of the authentication information that is transmitted to the authorisation system 171 as part of the authorisation request. The authorisation system 171 may again retrieve or derive each of these values during the authentication process in Step S250 and, thus, they may be kept secure by the electronic device 100 and the authorisation system 171 and not be intercepted by third parties during any data transmissions.

Each of the algorithms CA1, CA2, CA3 and CA4 may use any suitable method, for example one or more of: The Data Encryption Standard (DES); Triple-DES (3DES); the Advanced Encryption Standard (AES); The Rivest-Shamir-Adleman (RSA) algorithm; elliptic-curve-cryptography (ECC); an XOR; the secure-hashing-algorithm (SHA256); etc. When cryptographic algorithms are used, the algorithms may perform symmetric and/or asymmetric cryptographic operations (such as encryption, decryption, digital signature generation, message authentication code generation, keyed hashing, etc.). All of CA1, CA2, CA3 and CA4 may use the same underlying method, or some or all of CA1, CA2, CA3 and CA4 may use different underlying methods. By way of example:

CA1 may use 3DES or another encryption algorithm to encrypt ATC 310 using DK 320 as the encryption key to generate SK1. Alternatively, CA1 may use a keyed hashing algorithm to generate SK1 as a hash of ATC 310, using the key DK 320. Alternatively, CA1 may combine (e.g. XOR or concatenate) some or all of DK 320 with some or all of ATC 310 to generate SK1.

CA2 may generate the ARQC 360 as a (hashed) message authentication code (MAC), e.g. using SHA256, based, at least in part, on the data relating to the transaction 340 and the device information 350 (using SK1 as a key) or may generate a digital signature for the data relating to the transaction 340 and the device information 350 using an asymmetric signature algorithm. The ARQC 360 may be the whole, or a part, of the message authentication code or the digital signature generated.

CA3 may use 3DES or another encryption algorithm to encrypt the initialisation vector 370 using SK1 as the encryption key to generate SK2. Alternatively, CA3 may use a keyed hashing algorithm to generate SK2 as a hash of the initialisation vector 370, using the key SK1. Alternatively, CA3 may combine (e.g. XOR or concatenate) some or all of SK1 with some or all of the initialisation vector 370 to generate SK2.

CA4 may generate the PIN authentication data 390 as a (hashed) message authentication code (MAC), e.g.

using SHA256, based, at least in part, on the PIN 380, or may generate a digital signature for the PIN 380 using an asymmetric signature algorithm. The PIN authentication data 390 may be the whole, or a part, of the message authentication code or the digital signature generated.

It will be appreciated that, in some embodiments, the PIN transaction steps are not carried out or provided. When they are provided, the generation of SK2 using CA3 is optional—for example, instead of generating SK2, SK1 may be used in place of SK2, in which case the initialisation vector 370 is not needed and CA3 is not performed.

It will be appreciated that, in some embodiments, CA2 need not use SK1, in which case CA1 is not performed and ATC 310 and DK 320 are not needed. When CA2 uses SK1, it will be appreciated that CA1 may not be performed and, instead, either (a) SK1 assumes the value of ATC 310 (in which case DK 320 is not needed) or (b) SK1 assumes the value of DK 320 (in which case ATC 310 is not needed).

Figure 4:
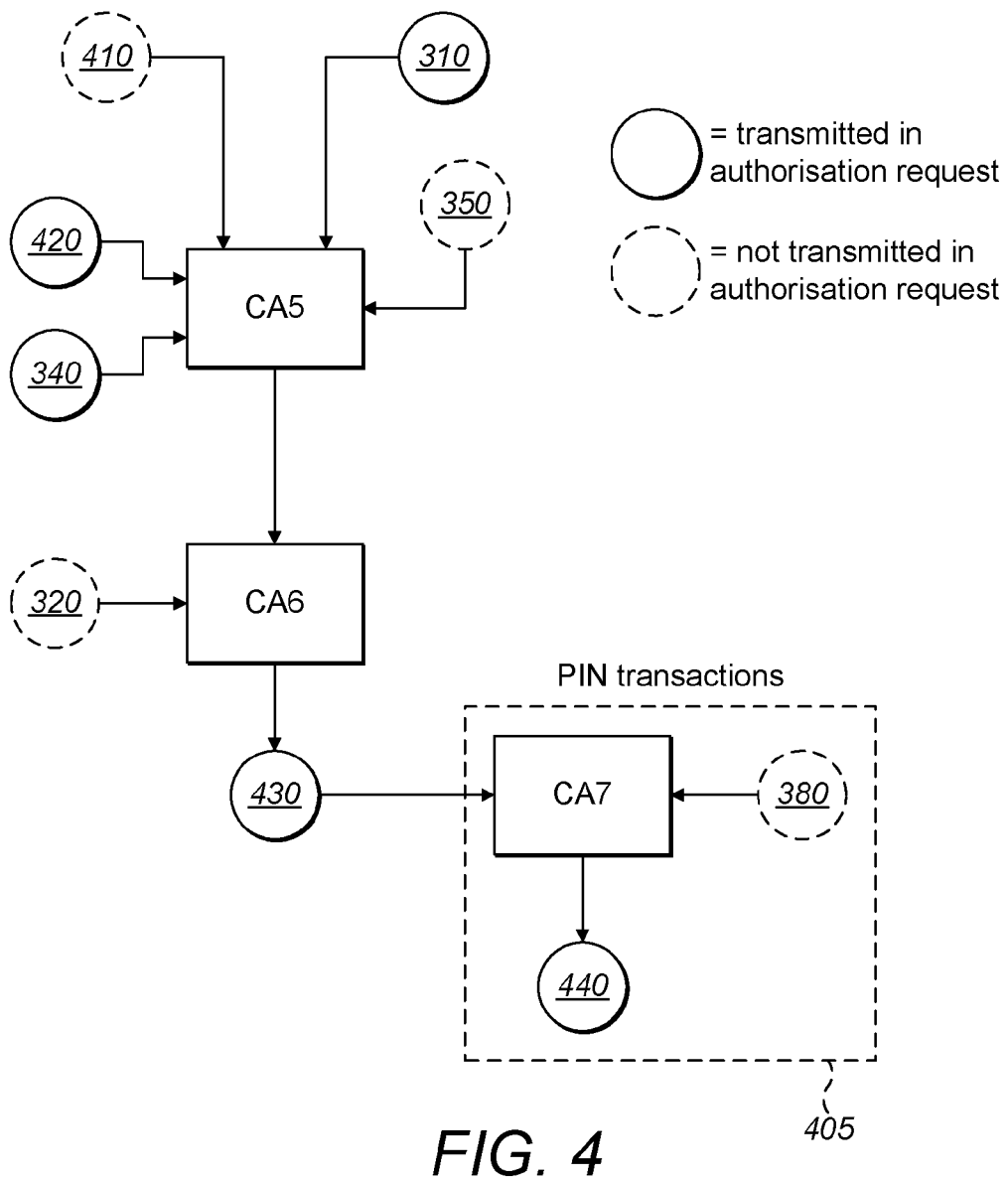
FIG. 4 is a flowchart illustrating a further method by which authentication data may be generated for use in the method of FIG. 2.

FIG. 4 is a flowchart illustrating an example alternative method by which authentication data may be generated for use in the method of FIG. 2. In particular, FIG. 4 is a flowchart illustrating a method by which authentication data may be generated at Step S220 of FIG. 2 and is an example alternative method to that shown in FIG. 3.

The methods shown in FIGS. 3 and 4 have a number of similarities, for example they both use a number of the same input parameters, for example the ATC 310, DK 320 etc, and both can generate an ARQC and optionally PIN authentication data.

In the method shown in FIG. 4, the transaction software generates a hash using a fifth algorithm/process (CA5), which may comprise a cryptographic algorithm/process. The hash may be generated in any suitable way known in this field of technology. The hash may be of any suitable data size, for example, 12 to 24 bytes.

The hash may be generated based on the ATC 310, data relating to the transaction 340, the device information 350, an identifier of the virtual payment product 410 and a cryptographic version number (CVN) 420. Further details regarding the ATC 310, data relating to the transaction 340 and the device information 350 are described above.

CA5 may concatenate at least part of each of these five inputs (for example, the entirety of each of the inputs may be concatenated, or only a part of some of the inputs and the entirety of the other inputs may be concatenated, or only a part of each of the inputs may be concatenated, etc) and generate the hash based on the concatenation. Alternatively, CA5 may not concatenate the inputs in order to generate the hash, but may instead generate the hash by any other suitable means, for example by XORing the inputs, or hashing each of the inputs and concatenating at least part of the results, etc.

As will be appreciated, the identifier of the virtual payment product 410 and the CVN 420 may be part of the internal card data 330 described earlier. Therefore, in an alternative, the identifier of the virtual payment product 410 and the CVN 420 shown in FIG. 4 may be replaced with internal card data 330, which may comprise the CVN, the identifier of the virtual payment product and any one or more additional data items described earlier in respect of the internal card data 330.

The identifier of the virtual payment product 410 and CVN 420 may each have any suitable data size, for example between 2 and 20 bytes.

It will be appreciated that CA5 may receive, and process, additional data as inputs to generate the hash.

As the transaction software 110 uses the hash to generate the authentication data, the authentication data is generated based, at least in part, on the ATC 310, data relating to the transaction 340, the device information 350, an identifier of the virtual payment product 410 and the cryptographic version number (CVN) 420.

Having generated the hash, an authentication request cryptogram (ARQC) 430 is generated using a sixth algorithm/process CA6, which may comprise a cryptographic algorithm/process. The transaction software 110 may generate the ARQC 430 by providing the hash as an input to CA6, so that ARQC 430 is generated based, at least in part, on, the hash, and by extension, therefore, the ATC 310, data relating to the transaction 340, the device information 350, an identifier of the virtual payment product 410 and the cryptographic version number (CVN) 420.

In some embodiments, CA6 is a keyed algorithm, and CA6 uses a cryptographic key as an input to generate ARQC 430. The cryptographic key used in the embodiment shown in FIG. 4 is the device key (or DK) 320 that is described in more detail earlier.

ARQC 430 may take a form defined in a transaction authentication standard, for example EMV standards, and, as such, may typically have a data size of 8 to 16 bytes. However, rather than generating an ARQC, CA6 may alternatively generate any suitable authentication cryptogram of any suitable size but generally related to the cryptographic algorithm in CA6.

The ARQC 430 may be truncated, or otherwise modified, in order to achieve a target data size.

Where the method shown in FIG. 4 is implemented, rather than the method shown in FIG. 3, the authentication data generated at Step S220 of FIG. 2 is based on the ARQC 430. The authentication data may be equal to the ARQC 430. As discussed below, the authentication data may be formed by combining the ARQC 430 with other data.

The authentication information output by the transaction software at Step S230 comprises the authentication data generated as set out above. In embodiments that make use of the ATC 310 to generate ARQC 430, the authentication information further comprises ATC 310 (so that the ATC 310 can be used during the authentication process at the authorisation system 171). In embodiments that make use of the internal card data 330 (for example, at least the identifier of the virtual payment product 410 and CVN 420) to generate ARQC 430, the authentication information further comprises the relevant internal card data 330 (so that the internal card data 330 can be used during the authentication process at the authorisation system 171). As discussed above, in some embodiments, the authentication information output by the transaction software 110 further comprises the data relating to the transaction 340.

In embodiments that make use of DK 320 to generate ARQC 430, DK 320 is not included in the authentication information. Instead, as will be discussed shortly, DK 320 (or a value based on DK 320) is retrieved or derived by the authorisation system 171 during the authentication process in Step S250. In this way, DK 320 may not be obtained by intercepting the authorisation request transmitted in Step S240 and, therefore, is kept secret from third parties. Furthermore, this means that the value of DK 320 used by the transaction software 110 to generate the ARQC 430 must match a corresponding value that the authorisation system 171 has stored and has associated with the transaction software 110 on the electronic device 100 in order for the authentication process to successfully authenticate the data relating to the transaction. This enables the authorisation system 171 to verify that the authorisation request has originated from the correct transaction software 110 operating on the correct electronic device 100.

Similarly, the device information 350 is not included in the authentication information. Instead, as will be discussed shortly, the device information 350 (or a value based on the device information 350) is retrieved or derived by the authorisation system 171 during the authentication part of the authorisation process in Step S250. In this way, the device information 350 may not be obtained by intercepting the authorisation request transmitted in Step S240 and, therefore, is kept secret from third parties. Furthermore, this means that the value of the device information 350 used by the transaction software 110 to generate the ARQC 430 must match a corresponding value that the authorisation system 171 has stored and has associated with the transaction software 110 on the electronic device 100 in order for the authentication process to successfully authenticate the data relating to the transaction. This again enables the authorisation system 171 to verify that the authorisation request has originated from the correct transaction software 110 operating on the correct electronic device 100 tied to the virtual payment product.

If the transaction software 110 determines that a PIN is required for a transaction (by virtue of one or more of the determination/criteria described earlier in respect of the method shown in FIG. 3), then, in addition to the steps mentioned above with reference to FIG. 4, the transaction software also undertakes the 'PIN transaction' steps shown in the dashed-line box 405 in FIG. 4. If it is determined that a PIN is required, the transaction software 110 may ask the user to enter their PIN, or, if the user has already entered their PIN (for example, because the transaction software is configured to enable the user to enter their PIN at the start of transactions), to use the already entered PIN.

In particular, in the 'PIN transaction' steps shown in the dashed line box 405 in FIG. 4, the transaction software 110 may generate PIN authentication 440 using a seventh algorithm/process (CA7), which may comprise a cryptographic algorithm. In some embodiments, CA7 is a hash algorithm that generates the PIN authentication data 390 by hashing at least part of the ARQC 430 and the user entered PIN 380 (the user entered PIN 380 is described in more detail above in respect of FIG. 3). For example, CA7 may concatenate at least part of the ARQC 430 and the user entered PIN 380 (for example, the entirety of each of the inputs may be concatenated, or only a part of some of the inputs and the entirety of the other inputs may be concatenated, or only a part of each of the inputs may be concatenated, etc) and generate the hash based on the concatenation. Alternatively, CA7 may not concatenate the inputs in order to generate a hash, but may instead generate the PIN authentication data 440 by any other suitable means, for example by XORing the inputs, or using a keyed algorithm or hashing each of the inputs and concatenating at least part of the results, etc.

The PIN authentication data 440 may be of any suitable data size, but generally related to the cryptographic algorithm CA7, for example 4 to 32 bytes.

The PIN authentication data 440 may be included as part of the authentication information. In particular, the authentication data may be generated based on the PIN authentication data 440, for example by combining the ARQC 430 with the PIN authentication data 440. This may be done, for example, by concatenating at least part of the ARQC 430 and at least part of the PIN authentication data 440. Alternatively, it may be necessary according to transaction standards, such as the EMV global standards, for the authentication data to have the same data size regardless of whether or not the PIN transaction steps are performed. Therefore, in some embodiments, the PIN authentication data 440 may be used to modify the ARQC 430, for example by replacing at least some (e.g. a number of bits or bytes) of the ARQC 430 with a corresponding amount of the PIN authentication data 440, or by performing an operation on the ARQC 430 using the PIN authentication data 440, for example by XORing at least part of the ARQC 430 with at least part of the PIN authentication data 440. In this way, the authentication data may always have the same length, being either the ARQC 430 or a modified version of the ARQC 430 (modified using the PIN authentication data 440).

The user entered PIN 380 does not form part of the authentication information that is transmitted to the authorisation system 171 as part of the authorisation request. The authorisation system 171 may again retrieve or derive each of these values during the authentication process in Step S250 and, thus, they may be kept secure by the electronic device 100 and the authorisation system 171 and not be intercepted by third parties during any data transmissions.

Each of the algorithms CA5, CA6 and CA7 may use any suitable method, for example one or more of: The Data Encryption Standard (DES); Triple-DES (3DES); the Advanced Encryption Standard (AES); The Rivest-Shamir-Adleman (RSA) algorithm; elliptic-curve-cryptography (ECC); an XOR; the secure-hashing-algorithm (SHA1, SHA256 etc); etc. When cryptographic algorithms are used, the algorithms may perform symmetric and/or asymmetric cryptographic operations (such as encryption, decryption, digital signature generation, message authentication code generation, keyed hashing, etc.). All of CA5, CA6 and CA7 may use the same underlying method, or some or all of CA5, CA6 and CA7 may use different underlying methods. By way of example:

CA5 may generate the hash using, for example, SHA-1, based, at least in part, on the ATC 310, data relating to the transaction 340, the device information 350, the identifier of the virtual payment product 410 and the cryptographic version number (CVN) 420. Alternatively, CA5 may combine (e.g., XOR) some or all of the ATC 310, data relating to the transaction 340, the device information 350, the identifier of the virtual payment product 410 and the cryptographic version number (CVN) 420 to generate the ARQC 430.

CA6 may use Elliptic Curve Cryptography (ECC) or another encryption algorithm to encrypt the hash using DK 320 as the encryption key to generate ARQC 430. Alternatively, CA6 may use a keyed hashing algorithm to generate ARQC 430 as a hash of the hash generated by CA5, using the key DK 320. Alternatively, CA5 may combine (e.g. XOR or concatenate) some or all of DK 320 with some or all of the hash to generate the ARQC 430.

CA7 may generate the PIN authentication data 440 as a (hashed) message authentication code (MAC), e.g. using SHA256, based, at least in part, on the PIN 380, or may generate a digital signature for the PIN 380 using an asymmetric signature algorithm. The PIN authentication data may be the whole, or a part, of the message authentication code or the digital signature generated.

In Step S250, the authorisation system 171 carries out the authentication process. The authentication process needs to use processing/operations that correspond to the operations used to generate the authentication data at Step 220. This may be predetermined at the authorisation system 171 (e.g.

if only one algorithm is ever used). However, in some embodiments of the invention, the authorisation system 171 may be able to carry out a number of different authentication processes, in which case the authorisation system 171 may be arranged to determine the cryptographic 'recipe' used to generate the authentication data from information included with the authorisation request. For example, the authentication information received as part of the authorisation request may comprise an indication that the authentication data was generated using transaction software 110 on the electronic device 100, in which case the authorisation system 171 may use this to determine which authentication process to perform (or how to perform the authentication process)— namely, an authorisation process that corresponds to the method that the transaction software 110 used to generate the authentication data. This indication may identify the actual process by which the authentication data was generated by the transaction software 110 on the electronic device 100—this indication could be, for example, the CVN in the internal card data 330.

The authorisation request received by the authorisation system 171 identifies the virtual payment product (or that particular transaction software 110 executing on that particular electronic device 100) involved in the transaction. As shall be described shortly, when the transaction software 110 was provisioned to the electronic device 100, the provisioning system 172 will have stored various data relating to the virtual payment product (or that particular transaction software 110 executing on that particular electronic device 100) in a database, where this database is accessible by the authorisation system 171. Other information, such as a user's PIN, may be stored in the same, or a different database. The various information stored in the database(s) may be indexed based on the identity of the virtual payment product (or that particular transaction software 110 executing on that particular electronic device 100), e.g. a virtual card number. Therefore, having received the authorisation request, the authorisation system 171 can access the data in the database(s) that corresponds to the virtual payment product (or that particular transaction software 110 executing on that particular electronic device 100). The required data may be obtained by the authorisation system 171 by looking the data up in a database on, or accessible by, the authentication process of the authorisation system 171 and/or deriving the data from information that is accessible to the authentication process of the authorisation system 171 (which may be stored on the authorisation system 171 or elsewhere).

The authorisation system 171 is able to access, from the database(s), a value or data to be used as (or from which to obtain) device information 350 for use in the authentication process. In this context, this device information may be referred to as authentication process data. This accessed value is stored in a record that corresponds to the virtual payment product (or that particular transaction software 110 executing on that particular electronic device 100) that the authorisation system 171 believes is involved in the transaction, i.e. the virtual payment product (or that particular transaction software 110 executing on that particular electronic device 100) identified in the authorisation request.

In embodiments that use DK 320, the authorisation system 171 is able to access, from the database(s), a value or data to be used as (or from which to obtain) a device key DK 320 for use in the authentication process. This accessed value is stored in a record that corresponds to the virtual payment product (or that particular transaction software 110 executing on that particular electronic device 100) that the authorisation system 171 believes is involved in the transaction, i.e. the virtual payment product (or that particular transaction software 110 executing on that particular electronic device 100) identified in the authorisation request.

In embodiments that use the initialisation vector 370, the authorisation system 171 is able to access, from the database(s), a value or data to be used as (or from which to obtain) an initialisation vector 370 for use in the authentication process. This accessed value is stored in a record that corresponds to the virtual payment product (or that particular transaction software 110 executing on that particular electronic device 100) that the authorisation system 171 believes is involved in the transaction, i.e. the virtual payment product (or that particular transaction software 110 executing on that particular electronic device 100) identified in the authorisation request.

In embodiments that use the PIN 380, the authorisation system 171 is able to access, from the database(s), a value or data to be used as (or from which to obtain) a PIN 380 for use in the authentication process. This accessed value is stored in a record that corresponds to the virtual payment product (or that particular transaction software 110 executing on that particular electronic device 100) that the authorisation system 171 believes is involved in the transaction, i.e. the virtual payment product (or that particular transaction software 110 executing on that particular electronic device 100) identified in the authorisation request.

The authorisation system 171 has access to data relating to the transaction 340 (as this is part of the authentication information in the authorisation request). Additionally, in embodiments that make use of ATC 310, the authorisation system 171 has access to ATC 310 (as this is part of the authentication information in the authorisation request). Similarly, in embodiments that make use of the internal card data 330 (or specifically the identifier of the virtual payment product 410 and/or CVN 420), the authorisation system 171 has access to internal card data 330 (or the identifier of the virtual payment product 410 and/or CVN 420) (as this is part of the authentication information in the authorisation request).

Thus, the authorisation system 171 has access to input data values for all of the operands (or inputs to the algorithms CA1, CA2, CA3, CA4, CA5, CA6 and CA7) of the methods illustrated in FIGS. 3 and 4—some of these values are obtained from the authorisation request; some of the values are obtained from one or more records in one or more databases accessible to the authorisation system 171. The authorisation system 171 therefore carries out the process shown in FIG. 3 or FIG. 4, as described above, using the data received in authentication information and the data obtained from the database(s) in order to generate "test" (or second) authentication data. The authorisation system 171 can then compare the test authentication data with the authentication data received in the authorisation request.

If the authentication data received in the authorisation request matches the test authentication data (e.g. the authentication data is the same as the test authentication data), then the test authentication data will be a reconstructed version of the authentication data and the authentication will be successful, i.e. the authentication process determines that the information relating to the transaction received in the authorisation request is authentic, and the authorisation process proceeds to Step S260.

If the authentication data received in the authorisation request does not match the test authentication data (e.g. the authentication data is not the same as the test authentication data), then the authentication is unsuccessful, i.e. the authentication process determines that the information relating to the transaction received in the authorisation request is not authentic, and the authorisation process proceeds to Step S285. An unsuccessful authentication may be caused by at least one of: (a) one or more of the non-transmitted data items used to generate the test authentication data not matching that which was used by the software application 110 to generate the authentication data (for example, the value of at least one of DK 320, the device information 350, the initialisation vector 370, and PIN 380 used by the host system 170 in the authentication process being different from the corresponding value used by the transaction software 110 to generate the authentication data), which could be due to the authorisation request being corrupted or tampered with, or due to the authorisation request originating from a device or transaction software other than that which the authorisation system 171 believes is involved in the transaction; and/or (b) one or more of the algorithms CA1, CA2, CA3, CA4, CA5, CA6 or CA7 used by the authorisation system 171 in the authentication process being different from that used by the transaction software 110 to generate authentication data; and/or (c) the authentication information being tampered with or modified during transmission between the electronic device 100 and the POS 160 and/or between the POS 160 and the authorisation system 171. These may indicate fraudulent activity and, therefore, the authorisation system 171 will decline the transaction and proceed to Step S285.

It may be possible to identify what has caused the authentication process to fail, however it may be arranged that this is not communicated to the user of the electronic device 100 in Steps S290 and/or S292, or to any other entity, as this may assist third parties in breaking the authentication process. However, where it is identified that the user entered PIN 380 was incorrect, the owner of the virtual card may be notified by a different communications channel, for example SMS, email or a telephone call, that the entered PIN was incorrect. In this way, if the user of the electronic device 100 is the owner of the virtual card, they may be made aware of their mistake, but if the user of the electronic device 100 is a fraudulent party, they may not be made aware of what caused the transaction failure.

Implementation of the above described processes helps to improve the safety and security of NFC transactions without the use of an SE on the electronic device 100. In particular, the use of the device information 350 in the manner set out above means that only the specific device to which the transaction software 110 was initially provisioned should be able to successfully carry out a transaction. The use of DK 320 and the initialisation vector 370 achieve a similar effect and help increase the overall security of the processing and transactions.

Provisioning of at least parts of the software application 110 may take place at any time during the life-cycle of a virtual payment product. For example, it may be carried out at the same time that a new virtual payment product is being issued to the user, or when the user chooses to enable NFC transactions, or when a provisioned virtual transaction card has expired, been cancelled or blocked and new transaction software 110 needs to be provisioned, or when a new/ updated version of the transaction software 110 is available.

Figure 5:
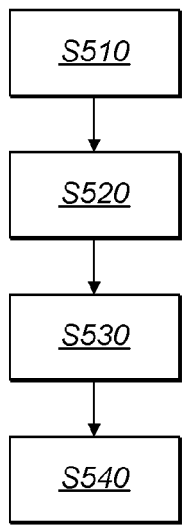
FIG. 5 is a flowchart illustrating a method for provisioning transaction software to a mobile electronic device.

FIG. 5 is a flowchart illustrating a method for provisioning transaction software 110 to a mobile electronic device 100 according to an embodiment of the invention. As indicated above, the process may be initiated at any time during the life-cycle of the virtual payment product and may be initiated by either the electronic device 100 (for example, when the user chooses to enable NFC transactions) or by the host system 170 (for example, when an existing virtual payment product has been blocked).

In Step S510, the electronic device 100 transmits to the provisioning system 172 the device information 350 (examples of which have been described above). The device information 350 may be retrieved by an application executing on the electronic device 100. The device information 350 may be retrieved from the OS 120 or any other suitable element on the electronic device 100 (e.g. a memory storing a MAC address for the electronic device 100 or a memory storing a version or type or serial number of the electronic device 100). The transmission of the device information 350 to the provisioning system 172 takes place via a data connection between the electronic device 100 and the host system 170 shown in FIG. 1 (examples of which have been discussed above).

Other information may also be included in the data transmitted from the electronic device 100 to the provisioning system 172, for example an indication of whether only a part or the whole of the transaction software 110 needs to be provisioned—in particular, if the electronic device 100 does not already have transaction software installed, then the whole of the transaction software 110 may be required, whereas if the electronic device 100 already has one version of the transaction software installed, then the electronic device 100 may only need to receive an update for part of the transaction software 110. Furthermore, the data transmitted from the electronic device 100 to the host system 170 may also include other information, for example indicating a customer ID, an account ID and/or a product ID. This information may, for example, be added to the transmission by a mobile gateway.

On receipt of the device information 350, in Step S520 the provisioning system 172 generates the required at least part of the transaction software 110. This may involve generating material or data that will be required by the at least part of the transaction software 110 to generate authentication data in the future at Step S220. For example:

In embodiments that use DK 320, the provisioning system 172 may generate DK 320 (e.g. as a random number or based, at least in part, on the received device information 350). The generated DK 320 may be specific (or unique) to the electronic device 100 (or the transaction software 110 to be executed on that electronic device 100, or the virtual payment product in question). The generated DK 320 may be embedded as part of the at least part of the transaction software 110 (e.g. as a value stored within the at least part of the transaction software 110)—preferably, DK 320 is embedded in a secured manner using any well known cryptographic or security techniques as are well-known in this field of technology.

In embodiments that use the initialisation vector 370, the provisioning system 172 may generate the initialisation vector 370 (e.g. as a random number or based, at least in part, on the received device information 350). The generated initialisation vector 370 may be specific (or unique) to the electronic device 100 (or the transaction software 110 to be executed on that electronic device 100, or the virtual payment product in question). The generated initialisation vector 370 may be embedded as part of the at least part of the transaction software 110 (e.g. as a value stored within the at least part of the transaction software 110)—preferably, the initialisation vector 370 is embedded in a secured manner using any well known cryptographic or security techniques as are well-known in this field of technology.

In Step S530, the device information 350 (and DK 320 and the initialisation vector 370 in embodiments that use DK 320 and the initialisation vector 370) are stored by the provisioning system 170 in one or more databases. These values/data are stored as being associated with the at least part of the transaction software 110 to be provisioned to the electronic device 100. For example, a database may store a record for each provisioned at least part of the transaction software 110, where the record for an at least part of the transaction software 110 comprises the device information 350 (and DK 320 and the initialisation vector 370 in embodiments that use DK 320 and the initialisation vector 370) that are embedded within that at least part of the transaction software 110. The database(s) may be local to the provisioning system 172 or local to the authorisation system 171 or remote from, but accessible to, the provisioning system 172 and the authorisation system 171.

By storing this information with an association to the transaction software 110 installed on the electronic device 100, the information is bound to that particular transaction software 110. Furthermore, as the information stored in the database(s) comprises the device information, the transaction software 110 and the electronic device 100 are further bound together. Thus, if this particular provisioned at least part of the transaction software 110 is executed on a different electronic device 100, then the authentication process at Step 250 will fail—i.e. the particular transaction software 110 provisioned to this particular electronic device 100 can only be successfully executed on this particular electronic device 100, as attempts to use it on a different electronic device 100 will result in authentication failures and, therefore, declined transactions.

In Step S540, the provisioning system 172 transmits or provisions (via the data connection between the electronic device 100 and the provisioning system 172) the generated at least part of the transaction software 110 to the electronic device 100 for storage in memory on the electronic device 100.

The above-described embodiments involve the POS 160 operating in a so-called 'on-line' context or mode. In the 'on-line' context, the POS 160 forwards an authorisation request to the authorisation system 171 at the time that the user is using the electronic device 100 to perform the transaction. However, in other embodiments, the POS 160 may operate in an 'off-line' context or mode such that there is no active communication between the POS 160 and the authorisation system 171 at the time that the transaction is taking place, i.e. at the time that the user is using the electronic device 100 to perform the transaction. When operating in an 'off-line' context, the POS 160 does not forward straightaway the authentication information to the authorisation system 171 for authentication. Instead, the POS 160 may store the authentication information described above and then, at a later stage, forward the stored authentication information to the authorisation system 171 for authentication when the POS 160 is operating in an 'on-line' context or when the authorisation system 171 can otherwise obtain, or be provided with, the authentication information from the POS 160. The POS 160 may be configured to be permanently 'off-line'—for example, the POS 160 may not actually have the capability to communicate with the authorisation system 171 at the time that the user is using the electronic device 100 to perform the transaction (for example if the POS 160 is a stand-alone vending machine). Alternatively, the POS 160 may have the option of operating in, and switching between, the 'off-line' mode and the 'on-line' mode and may be configured, at any point in time, to be operating in one of these two modes.

The transaction software 110 may be configured to enable the POS 160 to perform 'off-line' authentication. To enable this, during the provisioning process described above and shown in FIG. 5, in Step S520 the provisioning system 172 may further generate at least a private key (referred to herein as a device private key) and a corresponding digital certificate (referred to herein as a device digital certificate). The device private key may be associated with the electronic device 100 itself, or it may be associated with the particular transaction software 110 that is to be provisioning to the electronic device 100. The device digital certificate will include at least a public key (referred to herein as a device public key) that corresponds to the device private key. The device private key may be embedded as part of the at least part of the transaction software 110 that is provisioned to the electronic device 100 (for example, as data stored within the at least part of the transaction software 110)—the device private key may be embedded in a secured manner using any well known cryptographic or security techniques that are well-known in this field of technology. Alternatively, the device private key may be provisioned to the electronic device 100 as separate from, but along with, the at least part of the transaction software for secure storage in memory on the electronic device 100. Similarly, the device digital certificate may be embedded as part of the at least part of the transaction software 110 that is provisioned to the electronic device 100 (for example, as data stored within the at least part of the transaction software 110)—the device digital certificate may be embedded in a secured manner using any well known cryptographic or security techniques that are well-known in this field of technology.

Alternatively, the device digital certificate may be provisioned to the electronic device 100 separate from, but along with, the at least part of the transaction software for secure storage in memory on the electronic device 100. In this way, the device private key may be used by the transaction software 110 during an off-line authentication process; and the device digital certificate (once provided by the transaction software 110 to the POS 160) may be used by the POS 160 during the off-line authentication process.

The device private key may be used during an off-line authentication process to digitally sign one or more items of information that are transmitted from the transaction software 110 to the POS 160 and, if the device digital certificate is provided to the POS 160, then the device public key in the device digital certificate may be used by the POS 160 to authenticate/verify the digital signature (as explained in more detail below).

The generation and use of public keys and private keys using asymmetric cryptographic techniques is well-known in this field of technology. Similarly, digital certificates, digital signatures and methods of generating digital certificates and digital signatures, and methods of authenticating/verifying a digital signature are well-known in this field of technology. Consequently, these concepts shall not be described in more detail herein except where necessary to obtain a better understanding of embodiments of the invention.

In embodiments of the invention, the device digital certificate may also comprise any other information (in addition to the device public key) that may be of use to the POS 160 during an off-line authentication process. For example, the device digital certificate may also comprise one or more details about the virtual payment product provisioned on the transaction software 110, such as one or more of a permanent account number (PAN) for the virtual payment product, an expiry date for the virtual payment product and/or an issue date for the virtual payment product. Furthermore, the device digital certificate may also comprise one or more of a expiry date for the device digital certificate, issuer action codes and/or any other data or information that may be of use during off-line authentication.

Issuer action codes indicate, or identify or specify, one or more actions that the provisioning system 172 would like the POS 160 to undertake during off-line authentication. For example, an issuer action code may identify, or comprise, an instruction for the POS 160 that instructs the POS 160, if it is operating in the 'off-line' context, to change to the 'on-line' context so that an on-line authentication process may be executed or to decline the transaction if the POS 160 cannot change to the 'on-line' context. As another example, an issuer action code may identify, or comprise, an instruction for the POS 160 that instructs the POS 160, if it is operating in the 'off-line' context, to allow the POS 160 to perform off-line authentication process and to decline the transaction if the off-line authentication process does not result in a successful authentication. Issuer action codes may take any suitable form, for example a form specified by a card issuer.

The device digital certificate may itself be digitally signed using a private key associated with an operator of the provisioning system 172 (referred to herein as a card issuer private key). Consequently, a digital certificate (referred to herein as a card issuer digital certificate) that comprises the public key (referred to herein as a card issuer public key) corresponding to the card issuer private key may be provided to the electronic device 110. The card issuer digital certificate may be embedded as part of the at least part of the transaction software 110 that is provisioned to the electronic device 100 (for example, as data stored within the at least part of the transaction software 110)—the card issuer digital certificate may be embedded in a secured manner using any well known cryptographic or security techniques that are well-known in this field of technology. Alternatively, the card issuer digital certificate may be provisioned to the electronic device 100 separate from, but along with, the at least part of the transaction software for secure storage in memory on the electronic device 100. In this way, the card issuer digital certificate (once provided by the transaction software 110 to the POS 160) may be used by the POS 160 during the off-line authentication process (namely to authenticate and access the device digital certificate). For example, contents of the device digital certificate may have been encrypted using the card issuer private key, in which case the POS 160 may use the card issuer public key (obtained from the card issuer digital certificate) to decrypt the encrypted content of the device digital certificate—in this way, the POS 160 may access or obtain the device public key. It will be appreciated that one or more additional or alternative digital certificates may be provided and used in a similar manner, in line with well-known public-key-infrastructure techniques.

Figure 6:
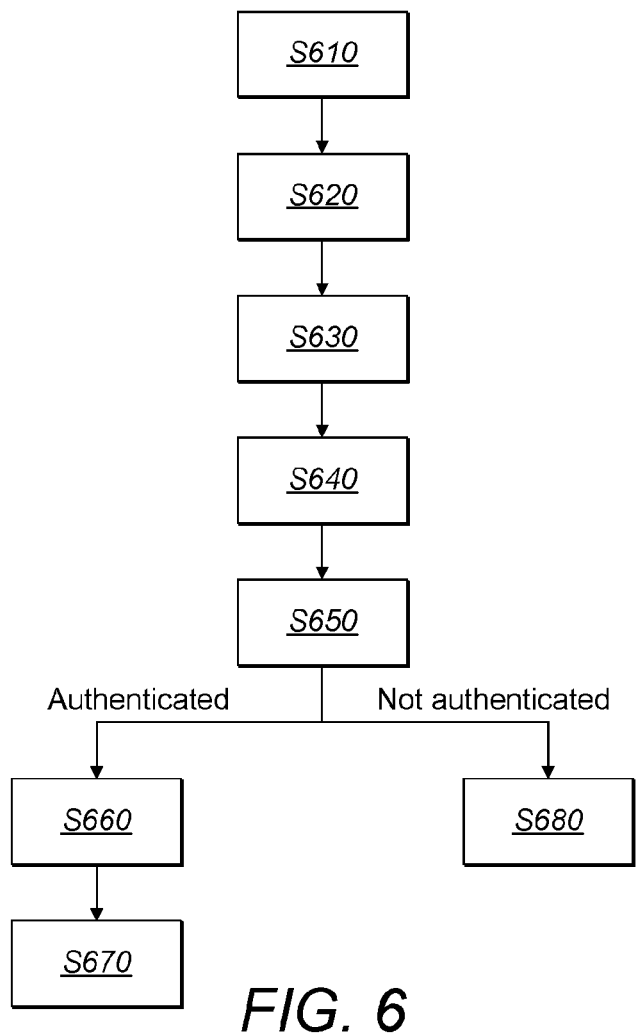
FIG. 6 is a flowchart illustrating an example of how to process a transaction when a point of sale is operating in an off-line context, according to an embodiment of the invention.

FIG. 6 is a flowchart illustrating an example of how to process a transaction when the POS 160 is operating in an off-line context, according to an embodiment of the invention.

In Step S610, the POS 160 transmits to the transaction software 110 (via the NFC controller 130 of the electronic device 100) a communication related to the transaction. This step may be analogous to Step S210 of FIG. 2, whereby the POS 160 transmits information relating to the desired transaction to the transaction software 110 (via the NFC controller 130 of the electronic device 100). In addition to some or all of the information relating to the transaction described in respect of Step S210 above, the information relating to the transaction that is transmitted in the communication at Step S610 may further comprise an indication that the POS 160 is operating in an off-line context.

The transaction software 110 may recognise from this received communication (e.g. due to an indication in the received communication) that the POS 160 is operating in an off-line context and that off-line authentication may be undertaken.

In Step S620, the transaction software 110 may return to the POS 160 (via the NFC controller 130 of the electronic device 100) an indication or identification of an off-line authentication process that the transaction software 110 is configured to support. This indication may, for example, be embedded as data or a data structure within the transaction software 110 as part of the provisioning process described above and is intended to enable the POS 160 to undertake an authentication process (to authenticate the electronic device 100 and/or the particular transaction software 110 being executed) during the off-line transaction.

The indication of the off-line authentication process may, for example, be an application file locator (AFL), using which the POS 160 can look up in its memory, or in a memory or database of a different device to which the POS 160 has access, what items of information will be required from the electronic device 100 in order to process the transaction, and what off-line authentication process should be carried out once the POS 160 has obtained the one or more items of information for use in processing the transaction. For example, the one or more items of information required may comprise the 'on-line' authentication information (described above in respect of FIGS. 2, 3 and 4), at least some of the information relating to the transaction (for example, transaction amount etc), any suitable data relating to the virtual payment product that is accessible to the transaction software 110, for example the PAN and/or the virtual payment product expiry date etc.

In Step S630, the POS 160 may transmit to the transaction software 110 a request for the one or more items of information it has determined it will need for use in processing the transaction.

In step S640, the transaction software 110 generates and provides to the POS 160 a response to the request.

In Step S650 the POS 160 may undertake off-line transaction authentication and process the transaction based on the response, as discussed in more detail below.

It will be appreciated that the steps S620 and S630 are optional. In particular, the transaction software 110 may provide a response to the communication that the POS 160 sent at the step S610, where this response may contain the same information that would be provided if the steps S620, and S630 had been performed.

In either case, the response provided to the POS 160 comprises:
(a) One or more items of information for use in processing the transaction. The one or more items of information may comprise one or more of:
information relating to the transaction software 110, such as a version of the transaction software 110, an expiration date for the transaction software 110, etc.;
information relating to a virtual payment product provided by the transaction software 110, such as one or more of an account number associated with the virtual payment product, an expiry date for the virtual payment product and/or an issue date for the virtual payment product;

information relating to the transaction (examples of which are discussed above with reference to FIGS. 2, 3 and 4);

device information 350 (examples of which have been set out above).

(b) A digital signature generated by the transaction software 110 at step S640 based on at least one of the one or more items of information. This digital signature is generated using the device private key.

(c) The device digital certificate.

(d) Optionally, one or more further digital certificates (such as the card issuer digital certificate) that the POS 160 may use to access and/or authenticate the device digital certificate (as discussed above).

The off-line transaction authentication process performed by the POS 160 at Step S650 may involve one or more of:

The POS 160 may use at least some information included in the device digital certificate. For example, where the device digital certificate comprises a certificate expiry date, the POS 160 may check that the device digital certificate is still valid and the off-line transaction authentication process will fail if the certificate is no longer valid. If the device digital certificate comprises virtual payment product information, for example, issue date, expiry date, etc. the POS 160 may check that all of that information is valid and the off-line transaction authentication process will fail if any of this information is not valid.

The POS 160 may use the device public key included in the device digital certificate to verify/authenticate the digital signature that was transmitted to the POS 160 in the response at Step S640. This enables the POS 160 to verify the origin and integrity of the one or more items of information that were digitally signed when forming the response. The off-line transaction authentication process will fail if the digital signature is not successfully verified/authenticated.

At least some of the one or more items of information in the response (which may or may not be one or more of the items of information that were digitally signed to form the digital signature) may correspond with some of the information included in the device digital certificate (for example, some of the virtual payment product information in the device digital certificate, such as the PAN, expiry date etc.), in which case the POS 160 may check that these one or more items of information match (e.g. are the same as) the corresponding information in the device digital certificate. This may ensure that that received one or more items of information have not been altered at all since the transaction software 110 was provisioned to the electronic device 100. The off-line transaction authentication process will fail any of these one or more items of information do not match (e.g. are not the same as) the corresponding information in the device digital certificate.

If all of these authentication checks are successful, then in Step S560 the authentication is successful and this may recorded by the POS 160. Optionally, after successful authentication, the method may proceed to Step S570 where the POS 160 may transmit to the electronic device 100 (via NFC) a notification of authentication, such that the transaction software 110 may display that authentication has been successful and the consumer may obtain the goods or services in respect of the desired transaction.

Since the POS 160 is in an off-line mode, the POS 160 may in Step S670 also save all of the necessary transaction related information so that the transaction may be actioned when the POS 160 switches to an 'on-line' context at a later time. The saved transaction related information may also include the 'on-line' authentication information that is described in respect of FIGS. 2, 3 and 4 so that when the POS 160 switches to an 'on-line' context, an authorisation request as described above with reference to FIGS. 2, 3 and 4 may be sent to the authorisation system 171 so that the authorisation system 171 may perform its authentication process before the transaction is actually completed by the host system 170. If the 'on-line' authentication process (which is described above) fails, the financial transaction may be terminated—whilst the consumer may have already left the POS 160 sometime earlier with the purchased good and/or services, the operator of the host system 170 may still be able to take some consequential action, e.g. cancel the virtual payment product for the future and/or notify all POSs to refuse off-line transactions in respect of that virtual payment product etc.

If at least one of the off-line authentication checks are unsuccessful, then at Step S680, the POS 160 may perform an action in accordance with the rules of the POS 160 and/or any issuer action codes that are included in the device digital certificate. For example, if any of the authentication checks fails, the POS 160 may have a rule that the POS 160 must switch to the on-line mode such that on-line authentication may take place, and if it is not possible to switch to the on-line mode, then decline the transaction. The action of the POS 160 may be different depending on which part of the off-line authentication process has failed and the action may be determined by the rules of the POS 160 and/or the issuer action codes.

In Step S680, the POS 160 performs the required action for an unsuccessful authentication, for example switching to an on-line context for on-line authentication to be performed by the authorisation system 171, or declining the transaction and optionally sending the transaction software 110 (via NFC) notification of a declined transaction. Where the POS is unable to switch to an on-line context, it may store details of the declined transaction so that when it later switches to an on-line context, the failed authentication can be investigated, for example by the authorisation system 171, or by any other suitable system, and any necessary action (such as cancelling the virtual payment product) undertaken.

As part of the digital certificate generation in the provisioning process described above, the provisioning system 172 may also generate "verification data" for inclusion in the device digital certificate. The verification data may be based on at least part of the device information 350 (examples of which have been described above) that is transmitted to the provisioning system in 172 in Step S510 of the provisioning process and/or on an indicator that is set to indicate that the transaction software 110 is invalid (for example, a software application expiry date that has expired). For example, at least part of the device information 350 may be included as a discrete entry in the device digital certificate and the indicator set to indicate that the transaction software 110 is invalid may additionally, or alternatively, be included as a discrete entry in the digital certificate.

In addition to this, or as an alternative to this, the verification data may comprise data that is based (or is a function), at least in part, on one or both of the device information and/or the indicator set to indicate that the transaction software 110 is invalid. In this case, the data may also be based on any other information or data, for example information relating to the virtual payment product, such as at least one of the PAN, the product expiry date, the product issue date etc. The verification data may be generated as a hash (e.g. a SHA1 hash) of an amount of data, where this amount of data comprises at least part of the device information 350 and/or the indicator set to indicate that the transaction software 110 is invalid, and possibly any other information and data, for example the PAN and virtual payment product expiry date, and the combined data hashed using a hashing algorithm. For example, the amount of data may be a combination (e.g. concatenation or an XOR or some other combination) of least part of the device information 350 and/or the indicator set to indicate that the transaction software 110 is invalid, and possibly any other information and data, for example the PAN and virtual payment product expiry date.

By including verification data that is based, at least in part, on at least part of the device information 350, the verification data is bound to the electronic device 100 from which the device information 350 was transmitted in Step S410. By then including the verification data in the device digital certificate, the verification data, and therefore also the electronic device 100 from which the device information 350 was transmitted in Step S410, is bound to the at least part of the transaction software 110 to be provisioned to the electronic device 100.

By including verification data that is based, at least in part, on an indicator set to indicate that the transaction software 110 is invalid, when the POS 160 comes to consider the indicator during off-line authentication process, the POS 160 can be more certain that the indicator has not been tampered with since the device digital certificate was generated by the provisioning system 172.

During the 'off-line' authentication process described above, in Step S640, the one or more items of information that form part of the response transmitted to the POS 160 comprise "first verification data". The first verification data may include at least one of device information gathered or generated by the transaction software 110 from the electronic device 100 on which the transaction software 110 is executing and/or an indicator of the validity of the transaction software 110 gathered from the transaction software 110.

By gathering the device information from the electronic device 100 on which the transaction software 110 is operating, it may be ensured that the device information that is returned to the POS 160 as part of the first verification data is based on the current configuration and identity of the specific electronic device 100 that is executing that specific transaction software 110.

During the authentication process in Step S650, the POS 160 may additionally authenticate the transaction application 110 and/or electronic device 100 by considering the verification data in the device digital certificate and the received first verification data.

For example, if the verification data comprises device information as a discrete entry, the device information received in the first verification data may be directly compared with the verification data in the device digital certificate. If they do not match, the device information sent to the POS 160 as part of the first verification data is different to that used by the provisioning system 172 to generate the verification data in the device digital certificate, for example because the transaction software 110 is now operating on a different electronic device, or because the electronic device 100 has a different configuration now to its configuration during the provisioning process (for example, the electronic device 100 has a new or updated OS 120). This may indicate fraudulent activity and, therefore, the POS 160 will proceed to Step S680.

If the verification data in the device digital certificate additionally or alternatively comprises data (e.g. a hash) that was based, at least in part, on the device information used during provisioning, the POS 160 may generate test data based, at least in part, on the device information included in the received first verification data using a process analogous to that used by the provisioning system 172 to generate the verification data in the device digital certificate. In this way, if the information used to generate the test data (i.e. the device information in the received first verification data and any other necessary information) is the same as that used to generate the verification data in the device digital certificate during provisioning, the test data will match the verification data that is in the device digital certificate. If they do not match, at least one of the following may have occurred: (a) the device information in the received first verification data is different to that used by the provisioning system 172 to generate the verification data, for example because the transaction software 110 is now operating on a different electronic device, or because the electronic device 100 has a different configuration now to its configuration during the provisioning process (for example, the electronic device 100 has a new or updated OS 120); (b) other items in the one or more items of information for use in processing the transaction (for example, the PAN etc) sent to the POS 160 during Step S640 is different to that used by the provisioning system 182 to generate the verification data, for example because the information on the transaction software 110 has been modified. These may indicate fraudulent activity and, therefore, the POS 160 will proceed to Step S680.

By basing the verification data in the device digital certificate at least in part on the device information during provisioning, the verification data is bound to the electronic device 100 for which the device digital certificate was generated by the provisioning system 172, the electronic device 100 may be authenticated by the POS 160. Therefore, if the transaction software 110 is cloned onto a different electronic device, or onto a payment card, different device information should be sent to the POS 160 during off-line authentication, the new electronic device/payment card will not be authenticated and off-line transactions prevented. Therefore, the use of fraudulent copies of the virtual payment product in off-line transactions may be prevented.

Where the verification data in the device digital certificate is additionally, or alternatively, based on an indicator that is set to indicate that the software program is invalid, the transmitted first verification data described above may additionally or alternatively comprise an indicator of the validity of the software application. An analogous process to that described above in respect of the device information may be carried out in order to verify the indicator of the validity of the software application against the verification data in the device digital certificate.

If the indicator of the validity of the software application received in the first verification data is verified as matching the indicator that is set to indicate that the transaction software is invalid (on which the verification data in the device digital certificate is, at least in part, based), the indicator of the validity of the software application will indicate that the transaction software 110 is invalid. Authentication of the transaction software 110 will thus fail, since the transaction software 110 is invalid. Upon such a failure, the POS 160 will proceed to Step S680 and perform an action in accordance with the POS 160 rules and/or the issuer action codes. As explained above, this action may be to initiate an 'on-line' authentication process involving the authorisation system 171 (as described earlier in respect of the 'authentication information' and FIGS. 2, 3 and 4) or decline the transaction (for example, if it is not possible to initiate an on-line authentication and/or authorisation process).

This may be a desirable characteristic where payment product issuers do not wish to take the risk of allowing off-line transactions to take place and instead insist that on-line authentication must always be performed. In this way, even if a perfect spoof of the transaction software 110 and the electronic device 100 were created on a different electronic device or on a payment card, all transactions may still have to undergo on-line authentication, during which fraudulent activity may be detected with more likelihood than in off-line authentication.

If the indicator of the validity of the software application that is received as part of the first verification data has been altered in any way, for example so as to indicate that the software application is valid (for example, by setting the software application expiry date to a date in the future), the indicator of the validity of the software application will not match the indicator that is set to indicate that the transaction software is invalid (on which the verification data in the device digital certificate is, at least in part, based). This will again cause the authentication of the transaction software 110 to fail and the POS 160 will proceed to Step S680 and perform an action in accordance with the POS 160 rules and/or the issuer action codes.

Therefore, it will not be possible to alter the indicator of the validity of the transaction software 110 at all on the transaction software 110 without off-line authentication still failing, thereby preventing the possibility of off-line authentication succeeding.

Whilst in the above it is explained that the indicator set to indicate that the transaction software 110 is invalid may, for example, be an expiry date for the transaction software 110 that is set to an expired expiry date (i.e. a date in the past), it may alternatively be any other item of data that could be set to indicate that the transaction software 110 is invalid, for example a transaction software 110 issue date that is set to a date in the future.

By setting the indicator in the device digital certificate to indicate that the virtual payment product is invalid, successful off-line authentication by the POS 160 may be prevented and either an on-line authentication process initiated or the transaction declined. This may be useful where payment product issuers do not wish to take the risk of allowing off-line transactions to take place and instead insist that on-line authentication must always be performed. In this way, even if a perfect spoof of the transaction software 110 and the electronic device 100 were created on a different electronic device or on a payment card, all transactions may still have to undergo on-line authentication, during which fraudulent activity may be detected with more likelihood than in off-line authentication.

When the provisioning system 172 generates the device digital certification with an indicator set to indicate that the transaction software 110 is invalid, the provisioning system 172 may set the indicator to be any value that would indicate that the transaction software 110 is invalid. For example, the value could be randomly selected from with the set of possible values that would indicate that the transaction software 110 is invalid (e.g. a randomly generated expiration date prior to the current date). The value could be based, at least in part, on the device information 350 received at the provisioning system 350.

In an aspect of the present disclosure, the transaction software 110 on the electronic device 100 is configured such that at least part of at least one of the cryptographic processes described above, for example generation of the authentication data and/or the digital signature used in off-line transactions, may be performed using multiparty computation (MPC) (also known as Secure Multiparty Computation). Additionally or alternatively, in an aspect of the present disclosure, the POS 160 and/or authorisation system 171 are configured to perform MPC to carry out at least part of the one or more of their respective cryptographic processes described above, for example the authorisation process carried out by the authorisation system 171 and/or decryption/authentication of the digital signature by the POS 160.

Figure 7:
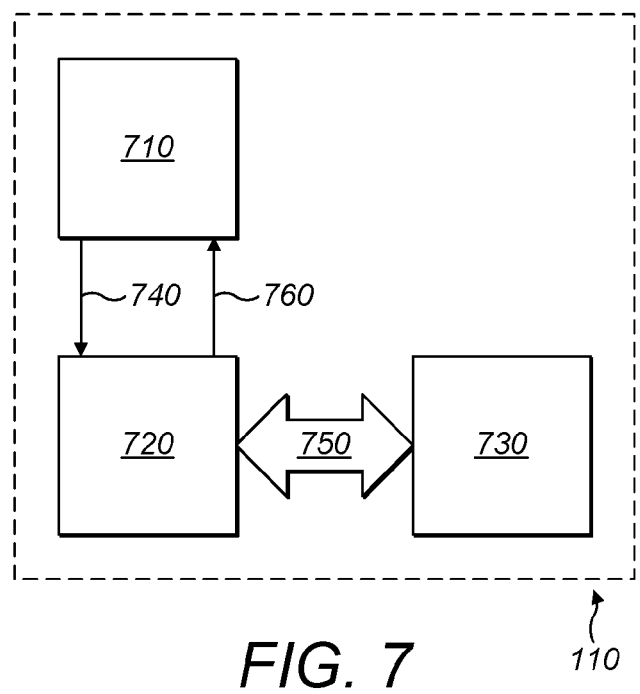
FIG. 7 is a software system comprising a first party and a second party configured to jointly perform multi party computation (MPC)

MPC is a process whereby a sensitive function, for example a cryptographic process, is split between (or implemented by) two or more different "parties". Herein, each "party" may be an item of software, such as the whole or part of a software application, a software module, a software library, etc. The function implemented by the MPC is "sensitive" in that it makes use of secret data (i.e. data to be hidden from other entities) in order to generate its output. The two or more parties can interact to perform the sensitive function jointly. Each of the two or more parties will have (or store therein) respective secret data, using which they may (together) perform the sensitive function, whilst still keeping their secret data private. For example, any secret data that are required to perform the sensitive function and that are stored in only one of the parties can be utilised to perform the sensitive function and still be kept private/hidden from the other parties. Likewise, other secret data that are required to perform the sensitive function and that are stored in only one of the other parties can also be utilised to perform the sensitive function whilst still keeping the data private. This can improve the security of the implementation of the sensitive function as all of the data required to carry out the sensitive function are not known by any single one of the parties and are not exposed in their entirety at any one location within the memory of the device performing the MPC. Further details regarding the operation of MPC may be found in the paper: Andrew Chi-Chih Yao: Protocols for Secure Computations (extended Abstract) FOCS 1982: 160-164, which may be found at http://research.cs.wisc.edu/areas/sec/yao1982-ocr.pdf FIG. 7 shows a representation of an embodiment of the transaction software 110 on the electronic device 100. In this embodiment, the transaction software 110 is configured to use MPC to perform any one or more of the earlier described cryptographic processes. The transaction software 110 comprises an optional calling module 710, along with a first party 720 and a second party 730. As with the parties 720, 730, the calling module 710 may be an item of software, such as the whole or part of a software application, a software module, a software library, etc. The calling module 710, the first party 720 and the second party 730 are separate items of software within the transaction software 110.

When a particular cryptographic process is to be performed (here, the particular cryptographic process is the process being implemented via MPC), the first party 720 and the second party 730 are used to implement and perform the cryptographic process. The particular cryptographic process may be reached as part of the normal execution of the transaction software 110; alternatively, performance of the particular cryptographic process may be determined or detected, either by the calling module 710 or any other part of the transaction software 110. When the particular cryptographic process is to be performed, the calling module 710 (or some other part of the transaction software 110) contacts or calls the first party 720 in step 740 with a request to carry out the cryptographic process, i.e. a request is provided to the first party 720, for example by calling a function of, or using an interface of, the first party 720. The request may comprise, or provide an indication of or a memory address of, data that are required by the first and second parties to carry out the particular cryptographic process. For example, it may comprise data to be encrypted, such as transaction information etc. In step 750, the first party 720 and second party 730 jointly use MPC to perform the cryptographic process and generate a result (for example, the authentication data and/or digital signature), i.e. generate the outcome of the particular cryptographic process when the particular cryptographic process processes specific data to be processed (which may be indicated in the request). In step 760, the first party 720 (additionally or alternatively, the second party 730) returns the result to the calling module 710 (although it will be appreciated that the result may be returned to any module or part of the transaction software 110). The calling module 710, or any other part/module of the transaction software 110, may then utilise the returned result in the transaction processes described above in respect of FIGS. 1 to 6.

The first party 720 may comprise first secret data and the second party 730 may comprise second secret data. Preferably, the first secret data is known only to the first party 720 and is not disclosed at any time to the second party 730 or to any other module or part of the transaction software 110, or any other software or application on the electronic device 100 or anywhere else. Preferably, the second secret data is known only to the second party 730 and is not disclosed at any time to the first party 720 or to any other module or part of the transaction software 110, or any other software or application on the electronic device 100 or anywhere else. The first party 720 will utilise the first secret data and the second party 730 will utilise the second secret data during step 750 in order to generate the result.

The first and second parties may be configured to perform at least part of the cryptographic process described earlier for the generation of the authentication data. In one example, the first and second parties may be configured to perform CA1 using MPC. Thus, the result returned by the first party 720 in step 760 may be SK1. By using MPC to generate SK1, the DK 320 is not stored in its entirety in one location anywhere on the electronic device 100, thus improving the security of the implementation of CA1 and the transaction software 110. Additionally, or alternatively, any other data used to generate SK1 may be stored by at least one of the first and second parties. For example, the ATC 310 may be stored in at least one of the first and second parties. Where both the first and second parties store the ATC 310, the ATC held by the first party 720 may be compared with the ATC held by the second party 730 as part of the MPC process. Data stored by at least one of the first and second parties may be stored in an encrypted format in the memory spaces of the first and/or second party and decrypted before use. A different module within the transaction software 110 (which may or may not be the calling module 710) may then carry out any other steps necessary to generate the authentication data, which is to be output to a terminal (for example, the POS 160) for authentication of the transaction, as described earlier. For example, the result SK1 may be used to generate the ARQC 360, which may then form at least part of the authentication data that is output to a terminal for authentication of the transaction, as described earlier.

In another example, the first and second parties may be configured to perform CA5 using MPC. Thus, the result returned by the first party 720 in step 760 may be the hash. By using MPC to generate the hash, the data used to generate the hash, for example the ATC 310 and/or identifier of the virtual payment product 410 etc, may not be stored in their entirety in one location anywhere on the electronic device 100, thus improving the security of the implementation of CA5 and the transaction software 110. Additionally, or alternatively, any other data used in carrying out CA5 may not be stored in its entirety in one location anywhere on the electronic device 110. The other data may then be assembled such that it is in a complete form before CA5 is performed using MPC. This may prevent that data from being tempered with, thus improving the security of the implementation of CA5 and the transaction software 110. A different module within the transaction software 110 (which may or may not be the calling module 710) may then carry out any other steps necessary to generate the authentication data, which is to be output to a terminal (for example, the POS 160) for authentication of the transaction, as described earlier. For example, the hash may be used to generate the ARQC 430, which may then form at least part of the authentication data that is output to a terminal for authentication of the transaction, as described earlier.

In another example, the first and second parties may be configured to perform CA2 (and possibly CA1 too) using MPC. Thus, the result returned by the first party 720 in step 760 may be the ARQC 360, or the authentication data that is based on the ARQC 360. Again, by utilising MPC in this way, the DK 320 is not stored in its entirety in one location anywhere on the electronic device 100, thus improving the security of the implementation of the generation of the ARQC 360 and the security of implementation of the transaction software 110. Additionally, or alternatively, any other data used in carrying out CA2 may not be stored in its entirety in one location anywhere on the electronic device 110. The other data may then be assembled such that it is in a complete form before CA2 is performed using MPC. This may prevent that data from being tempered with, thus improving the security of the implementation of CA2 and the transaction software 110. If necessary, a different module within the transaction software 110 (which may or may not be the calling module 710) may then carry out any other steps required to generate the authentication data, which is to be output to a terminal for authentication of the transaction, as described earlier. For example, if the result is the authentication data, it may be that no further steps need to be performed and the authentication data may simply be output to a terminal for authentication of the transaction, or it may be that the authentication data is modified in some way before being output to the terminal, or is included as only part of the output to the terminal.

In another example, the first and second parties may be configured to perform CA6 (and possibly CA5 too) using MPC. Thus, the result returned by the first party 720 in step 760 may be the ARQC 430, or the authentication data that is based on the ARQC 430. By utilising MPC in this way, the DK 320 is not stored in its entirety in one location anywhere on the electronic device 100, thus improving the security of the implementation of the generation of the ARQC 430 and the security of implementation of the transaction software 110. Additionally, or alternatively, any other data used in carrying out CA6 may not be stored in its entirety in one location anywhere on the electronic device 110. The other data may then be assembled such that it is in a complete form before CA6 is performed using MPC. This may prevent that data from being tempered with, thus improving the security of the implementation of CA6 and the transaction software 110. If necessary, a different module within the transaction software 110 (which may or may not be the calling module 710) may then carry out any other steps required to generate the authentication data, which is to be output to a terminal for authentication of the transaction, as described earlier. For example, if the result is the authentication data, it may be that no further steps need to be performed and the authentication data may simply be output to a terminal for authentication of the transaction, or it may be that the authentication data is modified in some way before being output to the terminal, or is included as only part of the output to the terminal.

In another example, the first and second parties may be configured to perform CA3 using MPC. Thus, the result returned by the first party 720 in step 760 may be SK2. By utilising MPC in this way, the initialisation vector 370 is not stored in its entirety in one location anywhere on the electronic device 100, thus improving the security of the implementation of CA3 and the transaction software 110. Additionally, or alternatively, any other data used in carrying out CA3 may not be stored in its entirety in one location anywhere on the electronic device 110. The other data may then be assembled such that it is in a complete form before CA3 is performed using MPC. This may prevent that data from being tempered with, thus improving the security of the implementation of CA3 and the transaction software 110. A different module within the transaction software 110 (which may or may not be the calling module 710) may then carry out any other steps necessary to generate the authentication data, which is to be output to a terminal for authentication of the transaction, as described earlier. For example, the result SK2 may be used to generate the PIN authentication data 390, which may then form at least part of the authentication data that is output to a terminal for authentication of the transaction, as described earlier.

In another example, the first and second parties may be configured to perform CA4 (and possibly CA3 too) using MPC. Thus, the result returned by the first party 720 in step 760 may be the PIN authentication data 390. Again, by utilising MPC, the initialisation vector 370 is not stored in its entirety in one location anywhere on the electronic device 100, thus improving the security of the implementation of the generation of the PIN authentication data 390 and the security of the implementation of the transaction software 110. Additionally, or alternatively, any other data used in carrying out CA4 may not be stored in its entirety in one location anywhere on the electronic device 110. The other data may then be assembled such that it is in a complete form before CA4 is performed using MPC. This may prevent that data from being tempered with, thus improving the security of the implementation of CA4 and the transaction software 110. If necessary, a different module within the transaction software 110 (which may or may not be the calling module 710) may then carry out any other steps required to generate the authentication data, which is to be output to a terminal for authentication of the transaction, as described earlier. For example, the PIN authentication data 370 may be combined with an ARQC 360 in order to form the authentication data to be output to the terminal, as described earlier.

In another example, the first and second parties may be configured to perform CA7 using MPC. Thus, the result returned by the first party 720 in step 760 may be the PIN authentication data 440. A different module within the transaction software 110 (which may or may not be the calling module 710) may then carry out any other steps necessary to generate the authentication data, which is to be output to a terminal for authentication of the transaction, as described earlier. For example, the PIN authentication data 440 may be combined with an ARQC 430 in order to form the authentication data to be output to the terminal, as described earlier.

In another example, the first and second parties may be configured to perform CA1, CA2, CA3 and CA4 using MPC. Thus, the result returned by the first party 720 in step 760 may be the ARQC 360 and the PIN authentication data 390, or the PIN authentication data 390 and authentication data that is based at least in part on the ARQC 360, or authentication data that is based at least in part on the ARQC 360 and the PIN authentication data 390. A different module within the transaction software 110 (which may or may not be the calling module 710) may then carry out any other steps required to generate the authentication data, which is to be output to a terminal for authentication of the transaction, as described earlier. The first party 720 and the second party 730 may additionally, or alternatively, be configured to carry out any other cryptographic processes.

In another example, the first and second parties may be configured to perform CA5, CA6 and CA7 using MPC. Thus, the result returned by the first party 720 in step 760 may be the ARQC 430 and the PIN authentication data 440, or the PIN authentication data 440 and authentication data that is based at least in part on the ARQC 430, or authentication data that is based at least in part on the ARQC 430 and the PIN authentication data 440. A different module within the transaction software 110 (which may or may not be the calling module 710) may then carry out any other steps required to generate the authentication data, which is to be output to a terminal for authentication of the transaction, as described earlier. The first party 720 and the second party 730 may additionally, or alternatively, be configured to carry out any other cryptographic processes.

By configuring the first party 720 and the second party 730 in any of these ways, it is possible to more safely and securely carry out the cryptographic processes described earlier using software on the electronic device 100. In particular, the DK 320 and/or the initialisation vector 370 and/or the ATC 310 may not be exposed in their entirety in one location anywhere within the memory of the electronic device 100 and no single party/application/module on the electronic device 100 or anywhere else will have access to the complete DK 320 and/or initialisation vector 370 and/or ATC 310. Thus, a secure element (SE) on the electronic device 100 is not required for storing any of the sensitive data, thereby simplifying the configuration of the electronic device 110 and reducing costs.

Additionally, or alternatively, the first party 720 and the second party 730 may be configured to generate the digital signature for the 'off-line' authentication process described earlier (see, for example, FIG. 6 and the associated description). As described earlier, the digital signature may be generated by using the device private key to digitally sign one or more items of information that are to be transmitted from the transaction software 110 to the POS 160. The calling module 710 may pass to the first party 720 in step 740 the one or more items of information to be digitally signed. The first and second parties may then jointly perform MPC in step 750 and return the digital signature in step 760.

Therefore, as described above in respect of the authentication data, it is possible to more safely and securely generate the digital signature using software on the electronic device 100. In particular, the device private key is not exposed in its entirety in one location within the memory of the device and no single party/application/module on the electronic 100, or anywhere else, has access to the complete device private key. Thus, a secure element (SE) on the electronic device 100 is not required for storing any of the sensitive data, thereby simplifying the configuration of the electronic device 100 and reducing costs.

The first and second parties may be configured to generate only a digital signature, which is returned in step 760 as the result, or generate only data relating the authentication data described above, which are returned in step 760 as the result, or generate both a digital signature and data relating to the authentication data described above, which all returned in step 760 as the result.

The authorisation system 171 may utilise the MPC processes described above in order to carry out the earlier described authentication process. In particular, the first party 720 and second party 730 may be implemented in software on the authorisation system 171. The first and second parties may then jointly perform MPC in order to generate "test" (or second) authentication data, using which the authorisation system 171 may authenticate any authentication data received from the electronic device 100.

Likewise, the POS 160 may utilise MPC to decrypt/validate the digital signature. In particular, the first party 720 and second party 730 may be implemented in software on the POS 160 and jointly perform MPC in order to decrypt/validate the digital signature and generate the unencrypted data output.

It will be appreciated that, in some embodiments, multiple cryptographic processes may be implemented using MPC. In some embodiments, each of those multiple cryptographic processes is implemented by its own respective first party 720 and second party 730. For example, if CA1, CA2, CA3 and/or CA4 are to be implemented using MPC, then CA1 may be implemented using its own respective first party 720*a* and second party 730*a*; CA2 may be implemented using its own respective first party 720*b* and second party 730*b*; CA3 may be implemented using its own respective first party 720*c* and second party 730*c*; and CA4 may be implemented using its own respective first party 720*d* and second party 730*d*. Alternatively, the first party 720 and second party 730 may be arranged to implement multiple cryptographic process using MPC—for example, there may be a single first party 720 and a single second party 730 that, together, implement two or more of CA1, CA2, CA3 and/or CA4 via MPC. The first party 720 and second party 730 may be arranged in analogous ways in respect of CA5, CA6 and/or CA7.

The first party 720 may be programmed in a first programming language (for example, C, C++, C#, Java, Fortran, Perl, assembly language, machine code, etc) and the second party 730 may be programmed in a second programming language (for example, C, C++, C#, Java, Fortran, Perl, assembly language, machine code, etc). The first programming language may be different from the second programming language, for example the first programming language may be C++ and the second programming language Java, or the first programming language may be Java and the second programming language Perl etc.

By writing the first party 720 using a programming language that is different to the programming language used to write the second party 730, the work effort required by an attacker to successfully attack both of the parties and obtain the first secret data from the first party 720 and the second secret data from the second party 730 is increased. Thus, the secret data stored in the first and second parties may be more difficult for an attacker to obtain, and the MPC processes be more difficult to understand and infiltrate/copy, thereby improving the security of the software. This may be particularly the case if, for example, one of the programming languages used is a compiled programming language (e.g. C or C++) whereas the other programming language used is not a compiled programming language and is, instead, a scripted or interpreted programming language (e.g. JavaScript).

Additionally, the programming (or code or instructions) of at least one of the first party 720 and/or second party 730 may be obfuscated, such that the code of the first party 720 and/or second party 730 are implemented as obfuscated code. Any known software obfuscation technique may be used, for example, any suitable obfuscation tools/libraries may be utilised. Further details regarding program obfuscation may be found, for example, at http://www.cs.princeton-.edu/~boaz/Papers/obf_informal.html By obfuscating at least one of the parties, the programming (or code or instructions) of that party or parties will be more difficult for an attacker to understand. Thus, the work effort required by an attacker to successfully attack an obfuscated party (or parties) will be even further increased, thus making it even more difficult for an attacker to obtain secret data stored in the party (or parties) and making the MPC processes more difficult to understand and infiltrate/copy, thereby further improving the security of the software.

The programming of both the first and second parties may be obfuscated such that the first party 720 is implemented as first obfuscated code and the second party is implemented as second obfuscated code. The obfuscation technique/methodology used for each of the parties may be different. This would even further increase the work effort required by an attacker to successfully attack the obfuscated parties, thus making it even more difficult for an attacker to obtain secret data stored in the parties, thereby even further improving the security of the software.

The first secret data held by the first party 720 may be viewed as a first 'key share' and the second secret data held by the second party 730 may be viewed as a second 'key share'. The first and second 'key shares' may be considered to perform the function of 'a key value' as a whole, in that a cryptographic algorithm based on the key value as a whole may effectively be performed by the first and second parties using MPC and the two 'key shares' that they store.

By way of example only, if the first party 720 and the second party 730 are configured to perform CA6, the device key 320 may be considered to be 'a key value'. The first secret data may be considered to be a first 'key share' of the device key 320 (for example, a part of the device key 320) and the second secret data may be considered to be a second 'key share' of the device key 320 (for example, a different part of the device key 320). In this way, the device key 320 is not stored, or exposed, in its entirety in one location anywhere on the electronic device 100 and yet CA6 may still be performed.

Any other data used by any of the cryptographic algorithms that the first and second parties 720 and 730 are configured to perform may also be considered to be 'a key value', wherein the first and second secret data may be considered to be first and second key shares of the key value. For example, the key value may be the ATC 310 or the initialisation vector 370 etc. Two or more different key values, for example two or more of the ATC 310, the device key 320 and the initialisation vector 370, may effectively be stored by the first and second parties 720 and 730 in the first and second secret data. In particular, if the first and second parties 720 and 730 are configured to perform two or more cryptographic algorithms, for example CA1 and CA2, or CA5 and CA6, two or more 'key values', for example the ATC 310 and the device key 320, may be stored as 'key shares' within the first and second parties.

The security of stored 'key values' may be increased by refreshing or updating the first and second secret data (the first and second 'key shares').

Annex C, which is part of the present disclosure, describes a 'key refresh' technique whereby key shares held by the entities participating in a Multiparty Computation (MPC) protocol are updated. It will be understood that the 'key shares' referred to in Annex C may be the first and second secret data described above. Thus, the first party 620 may store one key share (or first secret data) and the second party may store another key share (or second secret data).

The two 'key shares' (or first secret data and second secret data) may be considered together to perform the function of 'a key value' as a whole, in that a cryptographic algorithm based on a key value as a whole may effectively be performed by the first and second parties using MPC and the two 'key shares' (or first and second secret data) that they store. Updating the 'key shares' may change each of the 'key shares', but will not change the 'key value'. In effect, changing the 'key shares' may change the way in which the 'key value' is represented or stored in memory by the 'key shares', but will not change the 'key value' itself.

Annex C uses the terminology of 'Alice' and 'Bob' or party $A_1$ and party $A_2$. Alice and party $A_1$ may be considered to be the first party 720 described above and Bob and party $A_2$ may be considered to be the second party 730 described above.

In Annex C, whilst a Diffie-Hellman key exchange technique is described in order to agree a random number/bitstring v, it will be appreciate that any technique may be used whereby the first and second parties may both obtain the random number/bitstring v in a secure manner.

Annex C states that the Hash function H1( . . . ) is SHA-256. However, it will be appreciated that Hash function H1( . . . ) may be any suitable hash function, for example any suitable SHA-1, SHA-2, SHA-3 function etc.

Whilst Annex C describes the key refresh protocol specifically in respect of RSA and elliptic curves, it will be appreciated that it may be applied to any type of cryptographic algorithm (for example, the data encryption standard (DES), the advanced encryption standard (AES) etc) wherein the first and second parties each store secret data that may be refreshed using the key refresh protocol.

Figure 8:
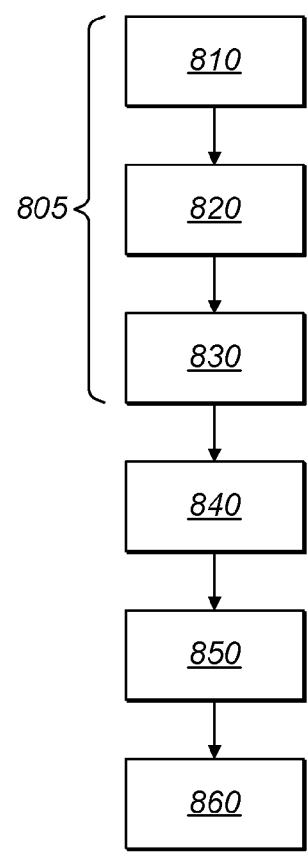
FIG. 8 is a flowchart illustrating a method for refreshing the first and second secret data held by the first and second parties of FIG. 7.

FIG. 8 is a flowchart illustrating a method for refreshing the first and second secret data held by the first and second parties 720 and 730.

The method for refreshing the first and second secret data may be initiated by any suitable party or module. For example, it may be initiated by the calling module 710 (and/or some other part of the transaction software 110) contacting or calling the first and/or second party 720 and 730 with a request to refresh the first and second secret data. Additionally, or alternatively, it may be initiated by either the first party 720 or the second party 730.

The method for refreshing the first and second secret data may be initiated at any suitable time. For example, it may be initiated periodically, for example every 10 minutes, or every 30 minutes, or every hour, or every 5 hours, or every 10 hours, or every 24 hours etc. Additionally, or alternatively, it may be initiated at random or pseudo-random intervals. Additionally, or alternatively, it may initiated every time the first and second parties 720 and 730 perform an MPC operation, for example, every time the first party 720 and second party 730 jointly use MPC to perform a cryptographic process and generate a result, such as the generation of authentication data and/or a digital signature (i.e. step 750 described above).

The first and second parties 720 and 730 may first agree a number v between them, which is a modification value that may be a positive number within a given size. The size of the number v may be a function of the key size (as can be seen below), and may be any suitable size, for example between 110 to 310 bits. This agreement process is represented with reference numeral 805 in FIG. 8, which may be performed by executing steps 810-830.

Steps 810 and 820 carry out a key exchange (for example, a Diffie-Hellman key exchange) and in step 830, the first and second parties 720 and 730 use the exchanged keys to generate the modification value v.

In Step 810, the first party 720 generates a first key pair, comprising a first public key $Q_1$ and a first private key $k_1$, and the second party 730 generates a second key pair, comprising a second public key $Q_2$ and a second private key $k_2$. The first key pair and second key pair are preferably ephemeral key pairs.

The key pairs may be generated in any suitable way. For example, the first party 720 may generate the first key pair using an elliptic curve technique as follows:

select $k_1 \leftarrow F_q$ set $Q_1$ to $k_1*G$

Likewise, the second party 730 may generate the second key pair using an elliptic curve technique as follows:

select $k_2 \leftarrow F_q$ set $Q_2$ to $k_2*G$

In the above equations, and in all following equations, $x \leftarrow y$ means assign y to the variable x.

In this example, all finite fields are prime finite fields, such that $F_q$ denotes the set of integers modulo q. We assume all operations modulo q are in the range $[0, \ldots, q-1]$. G is an elliptic curve point, wherein the operation k*G (where k is an integer modulo q) refers to elliptic curve point multiplication.

It will be appreciated that this is merely one example of how key pairs may be generated by the first and second parties 720 and 730, and that any other suitable technique may be used.

In Step 820, the first party 720 passes the first public key $Q_1$ to the second party 730 and the second party 730 passes the second public key $Q_2$ to the first party 720, such that the first and second parties 720 and 730 exchange public keys $Q_1, Q_2$.

In Step 830, the first party 720 and the second party 730 each use the exchanged keys to compute a modification value v, such that they both have the modification value v. The modification value v may be generated using any suitable process or algorithm. For example, the first party 720 may:

set $T \leftarrow k_1*Q_2$ compute $v = PRG(T;k)$ and the second party 730 may:

set $T \leftarrow k_2*Q_1$ compute $v = PRG(T;k)$

The function $PRG(T, k)$ is a pseudo-random generator that takes a short message T and from it generates a sequence of bits of arbitrary length, k. The value k is used to define the length/number of bits required for the modification value v.

The function PRG(T;I) may be executed by each of the first and second parties 720 and 730 by carrying out the following steps:

$s \leftarrow \lceil k/256 \rceil$

For $i=0, \ldots s-1$ do $b_i \leftarrow H_1(T\|i)$, where we pad T with a 32-bit integer representing i If k (mod 256)!=0

$b_s \leftarrow_1(T\|s)$ truncate $b_s$ to k−256*s bits

Output $b_0, \ldots, b_{s-1}$

Output $b_s$ if $b_s$ is non-empty

The modification value v comprises the output bits $b_0, \ldots, b_{s-1}$ (and $b_s$ if that is also computed).

It will be appreciated that this is merely an example pseudo-random generator function and that any suitable pseudo-random generator function may alternatively be used for generating the modification value v.

By generating the modification value v as a random k bit number/bitstring between the first and second parties 720 and 730 using a key pair exchange, no eaves dropper can learn the modification value v and the first and second parties 720 and 730 cannot control the output in any way.

In this example, the hash function $H_1(\ )$ is SHA-256. However, it will be appreciated that any hashing function, of any digest size, may alternatively be used. For example, SHA-1, SHA-2, SHA-3, with digests that are 224, 256, 384, 512 bits etc.

Furthermore, in this example, it is noted that when applying hash functions to finite field elements or elliptic curve points, the canonical bit representation of the element is taken. It does not matter which one, as long as the first and second parties 720 and 730 agree on it.

Thus, the first and second parties 720 and 730 have both arrived at the modification value v and the agreement process 805 is complete. Whilst steps 810-830 provide a particular way in which the agreement process 805 may be executed in order to arrive at a modification value v, it will be appreciated that the agreement process 805 may take any form and comprise any suitable steps that enable the first and second parties 720 and 730 to arrive at a modification value v. Preferably the agreement process 805 is secure, such that an eaves dropper cannot learn the modification value v, and will not allow either the first party 720 or the second party 730 to control what the modification value v will be.

In step 840, the first and second parties 720 and 730 may optionally check that updating their secret data using the modification value v will not result in their updated secret data being a negative value. Whether or not this step is performed may be dependent on the type of cryptographic operation (for example, elliptic curve cryptography, ECC, or RSA, etc) that the first and second parties 720 and 730 are configured to perform using MPC and the first and second secret data.

In one example, where the first and second secret data are RSA 'key shares', step 840 may be performed to make sure that updating the first and second secret data using the modification value v will not result in either the first or second secret data becoming a negative value. This is because the RSA algorithm may not work correctly where either of the first or second 'key shares' is negative.

Checking whether or not updating the first and second secret data would result in either becoming a negative value may be performed in any suitable way. In one example, a counter may be used to count the number of times the respective secret data of the first and second parties 720, 730 has been updated such that the first and second parties 720 and 730 may only update the first and second secret data a limited number of times. For example, a counter value $c_i$ may be set (for example, when the transaction software 110 was provisioned to the electronic device 100, or at some later time) and maintained by the first and/or second party 720 and 730. Each time step 850 is to be executed to update the secret data, in step 840 the first and/or second party 720 and 730 may set $c_i \leftarrow c_i - 1$ (such that the number of times the secret data has been updated is counted by decrementing $c_i$) and check the new $c_i$. If $c_i$ is greater than 0 (which is the threshold condition in this example), the first party 720 and/or second party 730 may proceed with updating their respective secret data in step 850. If $c_i$ it equals 0, it may be expected that one of the modified first and second secret data will be negative, so an error condition may be set and the method for refreshing the first and second secret data aborted (which is, in this example, the predetermined action indicative of the threshold condition not having been met). In this case, the party that has made the determination may issue an error code to the calling module 710 (or any other suitable part of the transaction software 110).

$c_i$ may be set to any suitable value, for example $2^n$, where n may be any suitable value, such as 16 or 32.

In order further to explain how use of the counter $c_i$ ensures that neither of the updated first data nor the updated second secret data will be negative, the following is noted. Firstly, by setting the counter $c_i$ to $2^n$, the maximum number of refresh operations is limited to $2^n$.

The first party 720 and second party 730 each compute v as described above. In short hand, this may be represented as both the first and second parties 720 and 730 performing $v \leftarrow \text{AgreeRandom}(l-1-n)$, where AgreeRandon(l-1-n) is the process described above for computing v. (l-1-n) is the maximum length of v, where l is the length of the 'key value' that the first and second secret data together represents and n is the value used to set the counter $c_i$ (i.e. $c_i \leftarrow 2^n$). However, it will be appreciated that the maximum length for v may be set to a different value, for example to l-1, or l-n, or l-5 etc, etc, provided that the maximum length for v is less than the length, l, of the 'key value'.

If we consider the party that updates their secret data by adding v to it (which is the second party 730 in the example of step 850 described below), we have:

$$d_2^{(j)} \leq d_2^{(0)} + j \cdot 2^{l-1-n}$$

where $d_2^{(j)}$ denotes the value of the secret data held by the second party 730 after the j-th refresh operation (i.e., after the secret data has been updated j times) and $d_2^{(0)}$ denotes the initial value of the secret data held by the second party 730.

Noting that j is bounded by $2^n$, we have:

$$d_2^{(j)} \leq d_2^{(0)} + j \cdot 2^{l-1} \leq 2 \cdot \theta(n) \leq 2 \cdot N$$

We will now consider the party that updates their secret data by subtracting v from it (which is the first party 720 in the example of step 850 described below). Again noting that the number of refresh operations j is bounded by $2^n$, we have:

$$d_1^{(j)} \geq d_1^{(0)} - j \cdot 2^{l-1-n} \geq d_1^{(0)} - 2^{l-1} \geq 0$$

where $d_1^{(j)}$ denotes the value of the secret data held by the first party 720 after the j-th refresh operation (i.e., after the secret data has been updated j times) and $d_1^{(0)}$ denotes the initial value of the secret data held by the first party 720.

Therefore, due to the bound of $2^n$ on the number of refresh operations and due to the above linking of the maximum length of v, the number of refresh operations $2^n$ and the length, l, of the 'key value', it can be seen that using the counter $c_i$ ensures that neither the updated first data nor the updated second secret data will be negative.

In an analogous alternative, rather than subtracting 1 from the counter $c_i$, any suitable number may be subtracted from the counter $c_i$ in order to count the number of times the secret data has been updated.

Alternatively, it will be appreciated that where a counter is implemented to count the number of times the secret data has been updated, rather than subtracting 1 from $c_i$ each time step 850 is to be executed, the first party 720 and/or second party 730 may instead maintain a counter $f_i$ and add 1 (or any other suitable value) to the counter $f_i$ ($f_i \leftarrow f_i+1$) and check the new $f_i$. If $f_i$ is less than $c_i$ (the threshold condition in this example), it may proceed with updating the secret data. If $f_i=c_i$, an error condition may be set and the method for refreshing the first and second secret data aborted.

Furthermore, rather than the first party 720 and/or second party 730 maintaining and checking $c_i$ or $f_i$, the calling module 710 (or any other part of the transaction software 110) may maintain and/or check $c_i$ or $f_i$.

Furthermore, rather than increment (or decrementing) $c_i$ or $f_i$ before Step 850 is executed, in an alternative $c_i$ or $f_i$ may be incremented (or decremented) during or after Step 850. In Step 840, the value of $c_i$ or $f_i$ could then merely be checked to ensure that it meets a threshold condition before Step 850 is executed again.

If it is determined that either the updated first secret data or the updated second secret data will be negative, an error condition may be set and the method for refreshing the first and second secret data may be aborted (which is, in this example, the predetermined action indicative of a negative value). In this case, the party that has made the determination may issue an error code to the calling module 710 (or any other suitable part of the transaction software 110), in response to which the transaction software 110 may seek to obtain new first and second secret data, for example by having at least part of the transaction software 110 reprovisioned from the provisioning system 172.

Otherwise, if it is determined in step 840 that the updated first and second secret data will both be positive, or if step 840 is not undertaken (for example, where the cryptographic method that the first and second parties 720 and 730 are configured to perform using MPC is ECC), the method will proceed to step 850.

In step 850, the first and second parties 720 and 730 update their stored secret data using the modification value v. The way in which the stored secret data is updated using the modification value v may depend on the first and second secret data.

For example, if the first and second secret data are first and second RSA key shares, the first party 720 may update the first secret data ($d_1$ in the following equations) as follows:

Set $d_1 \leftarrow d_1 - v$(over integers)

Signal success to the second party 730.

The second party 730 may update the second secret data ($d_2$ in the following equations) as follows:

Set $d_2 \leftarrow d_2 + v$(over integers)

Signal success to the first party 720

It will be appreciated that rather than having the first party 720 subtract the modification value v from the first secret data $d_1$ and the second party 730 add v to the second secret data $d_2$, the first party 720 may add v to the first secret data $d_1$ and the second party 730 subtract v from the second secret data $d_2$.

It will also be appreciated that adding or subtracting the modification value v from the secret data is only one example of how the secret data may be updated. The first and second secret data may be updated by the modification value v in any suitable way that refreshes the first and second secret data without changing the corresponding 'key value' that the first and second secret data together represent.

Where the first and second secret data are first and second ECC key shares, step 850 may be executed differently to that described above in respect of the RSA example. In particular, the first party 720 may update the first secret data ($x_1$ in the following equations) as follows:

Set $x_1 \leftarrow x_1 - v \pmod{q}$

Signal success to the second party 730

The second party 730 may update the second secret data ($x_2$ in the following equations) as follows:

Set $x_2 \leftarrow x_2 + v \pmod{q}$

Signal success to the first party 720

For an ECC algorithm, there may be no refresh limit. Therefore, a counter $c_i/f_i$ may not be kept.

On completion of step 850, the first and second secret data are refreshed and the method may proceed to step 860. In step 860, the first party 720 may delete its copy of the modification value v, the key pair $Q_1$ and $k_1$, the public key $Q_2$ and the old first secret data (i.e., the first secret data prior to updating using the modification value v). The second party 730 may delete its copy of the modification value v, the key pair $Q_2$ and $k_2$, the public key $Q_1$ and the old second secret data (i.e., the second secret data prior to update using the modification value v).

When it is time for the first and second secret data to be refreshed again, the method may start again from step 810. By deleting the keys, the modification value v and the old secret data, security of the refresh operation may be improved since only the refreshed first and second secret data will be stored. Thus, records of the way in which the previous refresh had been carried out are not kept (and thus cannot be accessed by fraudulent entities).

However, in an alternative, in step 860 the keys and the old first and second secret data may be deleted, but the modification value v kept. When it is time for the first and second secret data to be refreshed again, the method may return directly to step 850 and the modification value v be used again. In this way, processing times may be reduced as steps 810-840 will not need to be executed again for each further refresh.

In a further alternative, step 860 may not take place at all. Instead, the keys, the old first and second secret data and the modification value v may all be kept. When it is time for the first and second secret data to be refreshed again, the step 850 may be repeated again with the modification value v being used again. Again, in this way, processing times may be reduced as steps 810-840 will not need to be executed again for each further refresh.

In a further alternative, in step 850, where the first and second secret data are first and second ECC key shares, in addition to updating the first and second secret data, the public keys $Q_1$ and $Q_2$ may be updated using the modification value v. The first party 720 and the second party 730 may each perform the following steps:

set $Q_2 \leftarrow Q_2 - v*G$ set $Q_1 \leftarrow Q_1 - v*G$

In this way, the public keys $Q_1$ and $Q_2$ that are held by the first and second parties may be updated using the modification value v.

In this alternative, the method may then proceed to step 860, where the modification value v, the previous public keys $Q_1$ and $Q_2$, and the old first and second secret data are all deleted. When it is time for the first and second secret data to be refreshed again, the refresh process may start again from step 830, where the private keys $k_1$ and $k_2$ and the updated public keys $Q_1$ and $Q_2$ are used to determine a new modification value v. In this way, processing times may be reduced as steps 810 and 820 will not need to be executed, but a high level of security still maintained as a new modification value v is determined for each refresh of the first and second secret data.

Whilst FIG. 8 and the corresponding description describe implementations of the key refresh method specifically in respect of the first and second parties 720 and 730 being configured to perform cryptographic operations using RSA and ECC, it will be appreciated that the key refresh method may be applied to any type of cryptographic operation (for example, the data encryption standard (DES), the advanced encryption standard (AES) etc), wherein the first and second parties each store suitable secret data.

Refreshing the first and second secret data may improve security of storage of the 'key value' (for example, the device key 320 and/or the initialisation vector 370 and/or the identifier of the virtual payment product 410 and/or the device private key) in software because, if the first party 720 were compromised and a malicious entity were able to extract the first secret data, it is likely still to take some time for the malicious entity to be able to extract the second secret data from the second party 730. By the time the second secret data has been extracted, it is likely that the first and second secret data will have been refreshed using the process described above. Thus, the malicious entity would have the first key share from before the refresh and the second key share from after the refresh. These two would not together effectively operate as the 'key value' (since the 'key value' is effectively represented by the first and second key shares, or the first and second refreshed key shares) and could not be used together to perform a cryptographic process based on the 'key value'. An MPC process performed using the first key share from before a refresh and the second key share from after a refresh would either fail altogether, or the result generated would not be correct.

In one example, the first and second parties 720 and 730 may be configured to perform CA6 and a malicious entity may have obtained the second key share from before a refresh and the first key share from after the refresh. If the malicious entity were then to emulate CA6 and use the second key share from before the refresh and the first key share from after the refresh, they would not arrive at the correct ARQC 430. This is because the second key share from before the refresh and the first key share from after the refresh would not together correctly operate as the device key 320. Thus, if the malicious entity tried to use the ARQC that they have generated as at least part of authentication data for authorisation of a transaction, the transaction would not be authorised by the authorisation system 171 according to the authorisation process described earlier because the ARQC would be incorrect.

By refreshing the first and second secret data in the way described above, the 'key shares' that the first and second secret data represent may change without changing the corresponding 'key value'. In effect, refreshing the 'key shares' may change the way in which the 'key value' is represented or stored in memory by the 'key shares', but will not change the 'key value' itself. In this way, for each possible value of the input data to the cryptographic operation, performance of MPC using the updated first and second secret data will generate the same result as performance of MPC using the first and second secret data prior to the step of updating. Thus, the 'key shares' may be changed, thereby improving security of storage of the 'key shares' in software, without requiring a new 'key value' and corresponding 'key shares' to be generated and provisioned to the electronic device 100 (for example, by re-provisioning a part of, or the whole of, the transaction software 110), thereby reducing communications overheads and processing time.

By way of example only, if the first and second parties 720 and 730 are configured to generate a result that is a digital signature for 'off-line' authentication using a device private key, the device private key may be considered to be 'the key value'. The first secret data may be a first 'key share' of the device private key (for example, a part of the device private key) and the second secret data may be a second 'key share' of the device private key (for example, a different part of the device private key). Refreshing the first and second secret data as described above will change the first and second 'key shares', but will not change the device private key. Thus, if the first and second parties 720 and 730 were to generate a digital signature on the same data (i.e. digitally signing one or more items of information) before the key share refresh and after the key share refresh, the digital signature would still be the same.

Therefore, secret data required for cryptographic operations (for example, the device key 320 and/or the initialisation vector 370 and/or the identifier of the virtual payment product 410 and/or the device private key) may be stored more securely in software on the electronic device 100, without requiring new secret data to be generated and provisioned to the electronic device 100, or requiring the use of an SE on the device 110.

Where the first and second parties 720 and 730 store 'key shares' for two or more 'key values' (for example, two or more of the device key 320 and/or the initialisation vector 370 and/or the identifier of the virtual payment product 410 and/or the device private key ATC 310), each of the 'key shares' that the first and second parties 720 and 730 stores may be considered to be first and second secret data. In this way, the above described refresh process may refresh the 'key shares' for only one of the 'key values' and leave the 'key shares' for the other 'key values' unaffected. The 'key shares' for the other 'key values' may be independently refreshed using the refresh process described above.

Alternatively, where the first and second parties 720 and 730 store 'key shares' for two or more 'key values', the first secret data may comprise first key shares for two or more of the 'key values', and the second secret data may comprise corresponding second key shares for two or more of the 'key values'. In this way, the above described refresh method may refresh the 'key shares' corresponding to at least two of the 'key values'.

The calling module 710 and/or the first and second parties 720 and 730 may be configured to perform an authentication process for authentication of an MPC process that the first and second parties 720 and 730 are configured to perform. The first and second parties 720 and 730 may be configured to perform both the authentication process and the key refresh process described above, or just one of the two processes.

Preferably, the authentication process is used where the first and second parties 720 and 730 are configured to execute an algorithm using MPC wherein it is not possible to have a public verification of the generated result, for example the generation of a message authentication code (MAC). In one example, the authentication process may be implemented as part of any one or more of CA1-CA7 that are configured to perform message authentication code generation and/or as part of the digital signature generation for off-line authentication described above.

For algorithms that are based on a secret key (for example, MAC generating algorithms), it may not be possible to have a public verification of the generated result (unlike RSA, for example). However, zero knowledge proofs may be utilised to check for errors or attacks in the generation of the result by the first and second parties 720 and 730. For a MAC generating algorithm, the first party 720 may check the interim-mac value generated by the second party, and the second party 730 may check the interim-MAC generated by the first party 720, by performing a zero knowledge proof of the equality of discrete logarithms.

Annex C describes a verification of MAC generation process to check for errors or attacks in the generation of a MAC by the parties to a Multiparty Computation (MPC) protocol. Annex C uses the terminology party $A_1$ and party $A_2$ (or $A_i$ and $A_{3-i}$). Party $A_1$ (or $A_i$ or $A_{3-i}$) may be considered to be the first party 720 described above and Bob and party $A_2$ (or $A_{3-i}$ or $A_i$) may be considered to be the second party 730 described above.

Annex C also describes a hash function H2. It will be appreciated that the hash function H2 disclosed in Annex C is merely exemplary and that any suitable hash function protocol may be utilised for hash function H2.

Likewise, the function square roots modulo ρ is merely exemplary and determination of the square roots modulo ρ may be achieved using any suitable function or procedure.

Annex C describes a third part, Requestor (R). The Requestor (R) may be the calling module 710 described above, or any other suitable item of software, such as the whole or part of a software application, a software module, a software library, etc It will be understood that the 'key shares' referred to in Annex C may be the first and second secret data described above. Thus, the first party 620 may store one key share (or first secret data) and the second party may store another key share (or second secret data).

Annex C describes the verification process specifically in respect of MAC (message authentication code) generation. However, it will be appreciated that it may be applied to any algorithm that the first and second parties may execute using MPC. The process may find particular application with algorithms based on a secret where it is not possible to have a public verification of the generated result.

Figure 9:
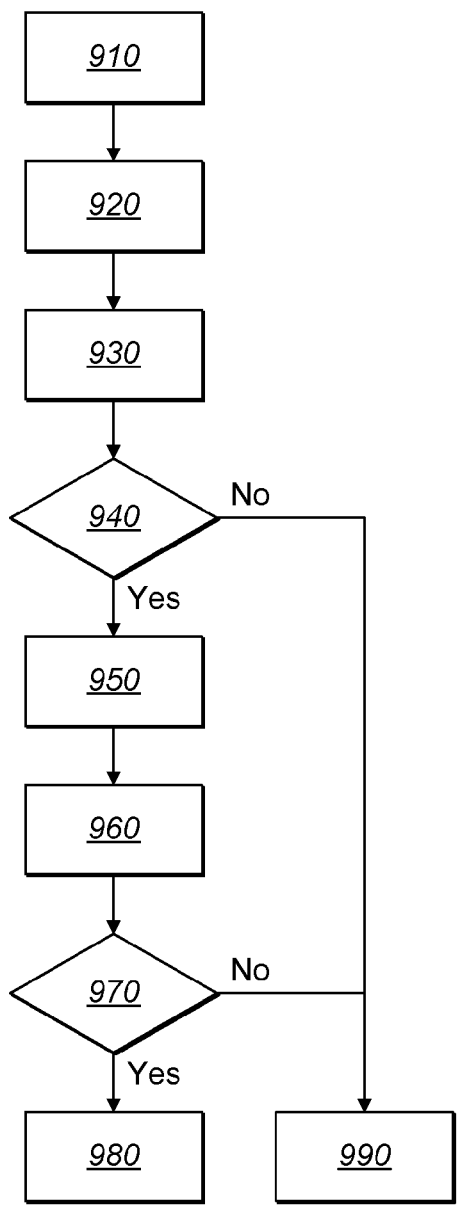
FIG. 9 is a flowchart illustrating a method for generating a MAC using the system of FIG. 7.

FIG. 9 shows a flowchart illustrating a method for generating a MAC of message m (MAC(m)) using MPC, including preliminary authentication. In step 910, the calling module 710 contacts or calls the first party 720, and optionally also the second party 730, with a request to carry out an operation i.e., a request is provided to the first party 720, and optionally also the second party 730, for example by calling a function of, or using an interface of, the first party 720, and optionally also the second party 730. The request comprises, or provides an indication of a memory address of, a message m (i.e. input data) in respect of which a MAC is requested. Step 910 may be analogous to step 740 described above in respect of FIG. 7.

If the calling module 710 has contacted only the first party 720, the first party 720 may then provide the message m to the second party 730, for example by passing the message m to the second party 730 or providing an indication of a memory address of message m.

In steps 920-950, the first and second parties 720 and 730 jointly use MPC to generate a result (which may be the requested MAC(m) or a result from which MAC(m) may be derived by the calling module 710, or any other part of the transaction software 110) and perform at least part of preliminary authentication. Steps 920-950 may thus be analogous to step 750 described above in respect of FIG. 7.

In step 920, the first and second parties 720 and 730 each generate intermediate data for use in generating the result of the MPC operation. The intermediate data may be interim-macs. The first party 720 may generate first intermediate data, interim-mac$_1$, using ECC as follows:

$$W_1 \leftarrow H_2(m)$$

$$\text{Interim-mac}_1 \leftarrow x_1 * W_1$$

The second party may generate second intermediate data, interim-mac$_2$, using ECC as follows:

$$W_2 \leftarrow H_2(m)$$

$$\text{Interim-mac}_2 \leftarrow x_2 * W_2$$

As previously explained, $x_1$ is the first secret data held by the first party 720, and $x_2$ is the second secret data held by the second party 730.

The hash function $H_2(\ )$ may be any suitable form of hash function. In one particular example, $H_2(m)$ may be determined using the following process:
1. $x \leftarrow H_3(m)$ (mod p) i.e. convert the hash output to an integer modulo p
2. $z \leftarrow x^3 + A*x + B$
3. $y \leftarrow \text{SqrRoot}(z, p)$
4. if y is false then:
   a. $x \leftarrow x+1$
   b. Goto step 2.
5. Output (x, y)

Therefore, $H_2(m) = (x, y)$ (for example, a Jacobian point with two values x and y).

In this example, the hash function $H_3(\ )$ is SHA-256. However, it will be appreciated that any hashing function, of any digest size, may alternatively be used. For example, SHA-1, SHA-2, SHA-3, with digests that are 224, 256, 384, 512 bits etc. $H_3(\ )$ may be the same hash function as $H_1(\ )$ described earlier.

SqrRoot(z, p) is a square root modulo p, where p is the prime for the elliptic curve scheme.

Note that if p=3 (mod 4), this implies that taking squares can be performed using a method such as:
6. $t \leftarrow (p-3)/4$
7. $u \leftarrow x^t$ (mod p)
8. $s \leftarrow u*x$ (mod p)
9. $c \leftarrow u^2*x$ (mod p)
10. if c is not equal to (p−1), then return s as the square root, else return false Note: $s = x^{(p-1)/4}$ and $c = x^{(p+1)/2}$. Thus, s is the square root and c is the Legendre symbol that indicates if the square root exists.

It will be appreciated that this is merely one example of how the square root SqrRoot(z, p) may be determined and that any alternative suitable method may instead be used.

In step 930, the first party 720 passes interim-mac$_1$ to the second party 730 and the second party 730 passes interim-mac₂ to the first party 720, such that the first and second parties 720 and 730 exchange intermediate data.

In step 940, the first and second parties 720 and 730 perform preliminary authentication. In particular, the second party 730 may perform a first authentication process on interim-mac₁ (which in this example is first authentication data), wherein the first authentication process is a check that interim-mac₁ is on the elliptic curve $E(F_p)$ (wherein all finite fields will be prime fields, thus $F_p$ denotes the set of integers modulo p and it is assumed that all operations modulo p are in the range [0, . . . , p−1], and $E(F_p)$ is an elliptic curve of prime group order q, (wherein q is a value defined by the curve parameters for the curve being used)). In one example, for a particular curve, we could have the values:

p=2224 (232−1)+2192+296−1;
a=−3;
b=0x5AC635D8 AA3A93E7 B3EBBD55 769886BC 651 D06B0 CC53B0F6 3BCE3C3E 27D2604B;
q=0xFFFFFFFF 00000000 FFFFFFFF FFFFFFFF BCE6FAAD A7179E84 F3B9CAC2 FC632551

It will be appreciated that these values are by way of example only to demonstrate a particular implementation. It will be appreciated that the above described methods may be implanted using any suitable elliptic curve, in which case these values may be different for different implementations.

If interim-mac₁ is not on the elliptic curve (i.e. interim-mac₁ $\notin E(F_p)$), the first authentication data has failed the first authentication process and the MPC operation is considered to have failed. The second party 730 may then proceed to step 990 (the 'No' path shown in FIG. 9), where a predetermined action indicative of failure of the MPC operation—which in this case is that MAC generation is aborted and the second party 730 optionally returns an error message to the calling module 710 (either directly or via the first party 720)—is performed.

The first party 720 may separately perform a second authentication process on interim-mac₂ (which in this example is second authentication data), wherein the second authentication process is a check that interim-mac₂ is on the elliptic curve $E(F_p)$. If it is not on the curve (i.e. interim-mac₂$\notin E(F_p)$), the second authentication data has failed the second authentication process and the MPC operation is considered to have failed. The first party 720 may then proceed to step 990 (the 'No' path shown in FIG. 9), where a predetermined action indicative of failure of the MPC operation—which in this case is that MAC generation is aborted and the first party 720 optionally returns an error message to the calling module 710 (either directly or via the second party 730)—is performed.

If interim-mac₁ and interim-mac₂ are both found to be on the elliptic curve in step 940, the first authentication data has passed the first authentication process and the second authentication data has passed the second authentication process. The first and second parties 720 and 730 may then proceed to step 950 (the 'Yes' path shown in FIG. 9).

In step 950, the first party 720 may compute "mac" using interim-mac₁ and interim-mac₂. In one example, it may compute mac as follows:

mac←trunc(interim-mac₁+interim-mac₂)

Also in step 950, the second party 730 may compute "mac'" using interim-mac₁ and interim-mac₂. In an analogous fashion to that explained above, it may compute mac' as follows:

mac'←trunc(interim-mac₁+interim-mac₂)

In step 960, the result of the MPC operation is returned to the calling module 710. In particular, the first party 720 may return mac to the calling module 710 and the second party 730 may return mac' to the calling module 710. The first and second parties 720 and 730 may each directly return mac and mac' respectively to the calling module 710. Alternatively, the second party 730 may pass mac' to the first party 720, wherein the first party 720 returns mac and mac' to the calling module 710 (analogous to step 760 described above in respect of FIG. 7). Alternatively, the first party 720 may pass mac to the second party 730, wherein the second party 730 returns mac and mac' to the calling module 710.

In step 970, as a further optional part of preliminary authentication, the calling module 710 may check that mac is the same as mac'. If mac does not equal mac', preliminary authentication has been failed and the MPC operation is considered to have failed. The calling module 710 may then proceed to step 990 (the 'No' path shown in FIG. 9) where MAC generation is aborted and the calling module 710 optionally discards mac and mac'. If mac does equal mac', the calling module 710 may proceed to step 980, where the calling module 710 sets MAC(m)=mac=mac'. Thus, the calling module 710 has obtained MAC(m) generated using an MPC operation with preliminary authentication.

In an alternative, rather than returning mac and mac' to the calling module 710 in step 960 for checking by the calling module 710, the first party 720 and/or second party 730 may perform the further check of step 970 (for example, the second party 730 may pass mac' to the first party 720 for checking against mac and/or the first party 720 may pass mac to the second party 730 for checking against mac'). In this case, where mac=mac', mac and/or mac' and/or MAC (m) may be returned to the calling module 710 by the first party 720 and/or the second party 730 as the result of the MPC operation. Where mac does not equal mac', the first party 720 and/or second party 730 may proceed to step 990 and the first party 720 and/or second party 730 optionally return an error message to the calling module 710.

In a further alternative, step 970 may be carried out by a different module or part of the transaction software 110. For example, the calling module 710 may forward mac and mac' to the different module or part for checking, or the first party 720 and/or second party 730 may pass mac and mac' to the different module or part for checking. The different module or part may abort MAC generation if mac does not equal mac' and optionally return an error message to the calling module 710 and/or the first party 720 and/or the second party 730. If mac=mac', the different module or part may return mac and/or mac' and/or MAC(m) to the calling module 710 and/or the first party 720 and/or the second party 730.

By performing preliminary authentication, interim-macs may be generated by the first and second parties 720 and 730 and authenticated in relatively few processing steps, thus enabling the calling module 710 quickly to obtain MAC(m). Optionally, mac and mac' may also be authenticated as part of preliminary authentication. Thus, MAC(m) may be generated reliably, as errors or attacks in the generation of the interim-macs and/or mac and mac' may be identified and MAC generation aborted, thereby preventing an inaccurate MAC(m) being obtained and/or used by the calling module 710 or any other module or part of the transaction software 110 (for example, as part of authentication data).

Further authentication may be undertaken in order even further to improve the reliability and accuracy of MAC generation. Preferably, further authentication will take place in addition to preliminary authentication, although it will be appreciated that further authentication may be an alternative to preliminary authentication.

Figure 10:
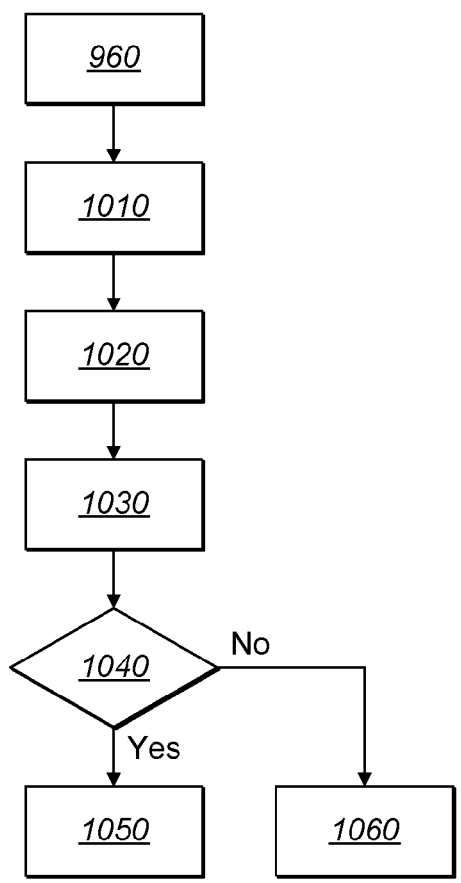
FIG. 10 is a flowchart illustrating a further method for generating a MAC using the system of FIG. 7.

FIG. 10 shows a flowchart illustrating a further method for generating a MAC of message m (MAC(m)) using MPC, including further authentication. Steps 910-960 may have been performed first such that preliminary authentication has taken place and the result of the MPC operation is returned to the calling module 710. In an alternative where preliminary authentication does not take place, steps 910-930, 950 and 960 (wherein step 930 is followed by step 950) may have been performed first such that the result of the MPC operation is returned to the calling module 710 without preliminary authentication. In either case, after the result of the MPC operation has been returned to the calling module 710 in step 660, the first and second parties 720 and 730 may proceed to step 1010 to carry out further authentication.

In parallel with further authentication, the calling module 710 may perform steps 970-990 described earlier such that MAC(m) may be obtained and used by the calling party 710, or any other module or part of the transaction software 110, whilst further authentication is taking place. In this way, the calling module 710 may quickly obtain MAC(m), thereby maintaining a fast MAC generation speed. If further authentication is failed, the calling module 710 (and/or any other relevant part or module of the transaction software 110) may be notified and action may be taken (for example, to recall MAC(m)), thereby offering an improvement in the accuracy and reliability of MAC(m)). Steps 970-990 are omitted from FIG. 10 for the sake of clarity.

In an alternative, after the calling module 710 has obtained MAC(m) (either by determining it in step 980, or by receiving it from the first party 720 and/or second party 730 as the result of the MPC operation), the calling module 710 may wait for completion of further authentication (steps 1010-1050) and receipt of confirmation that further authentication has been passed before MAC(m) is used. If further authentication is failed, the MPC operation is considered to have failed and the calling module 710 may be notified and MAC(m) discarded.

In step 1010, the first and second parties 720 and 730 may each generate an authentication value e and a signature s. For example, the first party 720 may generate first authentication values $s_1$ and $e_1$ as follows:

$$r_1 \leftarrow F_q$$

$$U_1 \leftarrow r_1 * G$$

$$V_1 \leftarrow r_1 * W_1$$

$$e_1 \leftarrow H_4(Q_1 \| W_1 \| \text{interim-mac}_1 \| U_1 \| V_1)(\text{mod } q)$$

$$s_1 \leftarrow r_1 - x_1 * e_1 (\text{mod } q)$$

$U_1$ is a point on the elliptic curve, generated by multiplying a random (or pseudo-random) number, $r_1$, with the curve generator G. $V_1$ is the result of $W_1$ (i.e., of the hash of the message m, obtained by the first party 720), multiplied with the random number, $r_1$. $W_1$ is thus linked to $U_1$ and $V_1$ in such a way that the second party 730 is able to use $U_1$ and $V_1$ to check that $W_1$ is correct (as described later), without $W_1$ or $r_1$ being passed from the first party 720 to the second party 730 in the clear. Further authentication can therefore take place without compromising the security of the first party 720 or the MPC process.

$Q_1$ is the first party's 720 public key corresponding to the first secret data $x_1$. $Q_1$ may have been generated and shared with the second party 730 in any suitable way and at any suitable time, for example when provisioning the transaction software 110, or at some later time.

$e_1$ represents a first interim part of the point on the curve and forms at least part of first authentication data. As set out above, $e_1$ is based on interim-mac$_1$ (intermediate data generated by the first party 720) and, thus, the first authentication data is based on interim-mac$_1$.

$e_1$ in this example is a hash of a first intermediate state. The first intermediate state in this example is a concatenation of data held by the first party 720. The data may be concatenated in any order and the above described concatenation order is by way of example only. However, it will be appreciated that concatenating the data in a different order would result in a different value for the first intermediate state and a different value for $e_1$. Therefore, the order of the concatenation used should correspond with that used by the second party 730 to generate the corresponding check value $h_2$ (as described in detail later). The data may alternatively be combined to generate $e_1$ in any other suitable way, provided the corresponding check value $h_2$ is generated in the same way.

The hashing function $H_4( )$ is carried out to protect the first intermediate state and the data making up the first intermediate state ($Q_1$, $W_1$, interim-mac$_1$, $U_1$, $V_1$) from eavesdroppers during transmission to the second party 730 (described later). In an alternative, the hashing function $H_4( )$ may not be applied, such that $e_1$=the first intermediate state (i.e. $Q_1 \| W_1 \| \text{interim-mac}_1 \| U_1 \| V_1$), or any other suitable form of protection (for example encryption, etc) may be applied to the first intermediate state before transmission of $e_1$ to the second party 730.

$s_1$ is a first signature value and is a signature of $e_1$. It is generated to allow integrity and/or validity checking of $e_1$. In this example, $s_1$ is generated using the first secret data, $x_1$, and is generated according to a particular function. However, it will be appreciated that $s_1$ may be generated in any suitable way (for example, without using $x_1$ and/or using any other suitable additional data). In a further alternative, $s_1$ may not be generated and transmitted to the second party 730 at all, provided the data and operations used by the second party 730 to generate the corresponding check value $h_2$ are configured not to expect and require $s_1$ (as will be appreciated from the further description below).

The second party 730 may generate second authentication value $e_2$ and second signature $s_2$ as follows:

$$r_2 \leftarrow F_q$$

$$U_2 \leftarrow r_2 * G$$

$$V_2 \leftarrow r_2 * W_2$$

$$e_2 \leftarrow H_4(Q_2 \| W_2 \| \text{interim-mac}_2 \| U_2 \| V_2)(\text{mod } q)$$

$$s_2 \leftarrow r_2 - x_2 * e_2 (\text{mod } q)$$

$U_2$ is a point on the elliptic curve, generated by multiplying a random (or pseudo-random) number, $r_2$, with the curve generator G. $V_2$ is the result of $W_2$ (i.e., of the hash of the message m, obtained by the second party 730), multiplied with the random number, $r_2$. $W_2$ is thus linked to $U_2$ and $V_2$ in such a way that the first party 720 is able to use $U_2$ and $V_2$ to check that $W_2$ is correct (as described later), without $W_2$ or $r_2$ being passed from the second party 730 to the first party 720 in the clear. Further authentication can therefore take place without compromising the security of the second party 730 or the MPG process.

$Q_2$ is the second party's 730 public key corresponding to the second secret data $x_2$. $Q_2$ may have been generated and shared with the first party 720 in any suitable way and at any suitable time, for example when provisioning the transaction software 110, or at some later time.

$e_2$ represents a second interim part of the point on the curve and forms at least part of second authentication data. As set out above, $e_2$ is based on interim-mac$_2$ (intermediate data generated by the second party 730) and, thus, the second authentication data is based on interim-mac$_2$.

$e_2$ in this example is a hash of a second intermediate state. The second intermediate state in this example is a concatenation of data held by the second party 730. The data may be concatenated in any order and the above described concatenation order is by way of example only. However, it will be appreciated that concatenating the data in a different order would result in a different value for the second intermediate state and a different value for $e_2$. Therefore, the order of the concatenation used should correspond with that used by the first party 720 to generate the corresponding check value $h_1$ (as described in detail later). The data may alternatively be combined to generate $e_2$ in any other suitable way, provided the corresponding check value $h_1$ is generated in the same way. The hashing function $H_4( )$ is carried out to protect the second intermediate state and the data making up the intermediate state ($Q_2$, $W_2$, interim-mac$_2$, $U_2$, $V_2$) from eavesdroppers during transmission to the first party 720 (described later). In an alternative, the hashing function $H_4( )$ may not be applied, such that $e_2$=the second intermediate state (i.e. $Q_2$||$W_2$||interim-mac$_2$||$U_2$||$V_2$), or any other suitable form of protection (for example encryption, etc) may be applied to the second intermediate state before transmission of $e_2$ to the first party 720.

$s_2$ is a second signature and is a signature of $e_2$. It is generated to allow integrity and/or validity checking of $e_2$. In this example, $s_2$ is generated using the first secret data, $x_2$, and is generated according to a particular function. However, it will be appreciated that $s_2$ may be generated in any suitable way (for example, without using $x_2$ and/or using any other suitable data). In a further alternative, $s_2$ may not be generated and transmitted to the first party 720 at all, provided the data and operations used by the first party 720 to generate the corresponding check value $h_1$ are configured not to expect and require $s_2$ (as will be appreciated from the further description below).

In this example, all finite fields are prime finite fields, thus Fq denotes the set of integers modulo q. It is assumed that all operations modulo q are in the range [0, . . . , q−1]. Furthermore, G is an elliptic curve point, such that r*G refers to elliptic curve point multiplication.

In this example, the hash function $H_4( )$ is SHA-256. However, it will be appreciated that any hashing function, of any digest size, may alternatively be used. For example, SHA-1, SHA-2, SHA-3, with digests that are 224, 256, 384, 512 bits etc. $H_4( )$ may be the same hash function as $H_1( )$ described earlier.

In step 1020, the first party 720 passes the first authentication value $e_1$ and first signature value $s_1$ to the second party 730 and the second party 730 passes the second authentication value $e_2$ and the second signature value $s_2$ to the first party 720, such that the first and second parties 720 and 730 exchange values s and e.

In step 1030, the first and second parties 720 and 730 calculate a check value h. The first party 720 may calculate first check value $h_1$ as follows:

$$U_2 \leftarrow s_2*G + e_2*Q_2$$

$$V_2 \leftarrow s_2*W_1 + e_2*\text{interim-mac}_2$$

$$h_1 \leftarrow H_4(Q_2||W_1||\text{interim-mac}_2||U_2||V_2)$$

Thus, the first party 720 is able to determine $U_2$ and $V_2$ without $W_2$ or $r_2$ being passed in the clear from the second party 730 to the first party 720. The second party is therefore able to check $W_2$ without compromising the security of the second party 730 or the MPC process.

As can be seen, first check value $h_1$ is based, at least in part, on interim-mac$_2$. It can also be seen that $h_1$ is generated in a way that corresponds to the generation of $e_2$ and $s_2$. In particular, if $h_1$ and $e_2$ have both been correctly generated, and if $W_1=W_2$ (which it should if they have both been generated correctly), $h_1$ will equal $e_2$. If the second party 730 were configured to generate $e_2$ and $s_2$ in a different way (for example, by concatenating the data in a different order, etc), the first party 720 would be configured to generate $h_1$ in a corresponding way, such that $h_1$ and $e_2$ should be equal. Furthermore, if the second party 730 were configured not to generate and transmit $s_2$, the first party 720 would be configured not to require $s_2$ for the generation of $h_1$.

The second party 730 may calculate second check value $h_2$ as follows:

$$U_1 \leftarrow s_1 \cdot G + e_1*Q_1$$

$$V_1 \leftarrow s_1*W_2 + e_1*\text{interim-mac}_1$$

$$h_2 \leftarrow H_4(Q_1||W_2||\text{interim-mac}_1||U_1||V_1)$$

Thus, the second party 720 is able to determine $U_1$ and $V_1$ without $W_1$ or $r_1$ being passed in the clear from the first party 720 to the second party 730. The first party 720 is therefore able to check $W_1$ without compromising the security of the first party 720 or the MPC process.

As can be seen, second check value $h_2$ is based, at least in part, on interim-mac$_1$. It can also be seen that $h_2$ is generated in a way that corresponds to the generation of $e_1$ and $s_1$. In particular, if $h_2$ and $e_1$ have both been correctly generated, and if $W_1=W_2$ (which it should if they have both been generated correctly), $h_2$ will equal $e_1$. If the first party 720 were configured to generate $e_1$ and $s_i$ in a different way (for example, by concatenating the data in a different order, etc), the second party 730 would be configured to generate $h_2$ in a corresponding way, such that $h_2$ and $e_1$ should be equal. Furthermore, if the first party 720 were configured not to generate and transmit $s_1$, the second party 730 would be configured not to require $s_1$ for the generation of $h_2$.

In step 1040, the first and second parties 720 and 730 each compare values h and e. In particular, the second party 730 may perform a first authentication process based on $e_1$ (first authentication value) and $h_2$ (second check value). In the first authentication process, the second party 730 may check to see if $h_2$ is equal to $e_1$. If $h_2$ does not equal $e_1$, the first authentication data has failed the first authentication process and the MPC operation is considered to have failed.

Failure of the first authentication process may indicate that the first party 720 has been compromised in some way. For example: at least part of the data used by the first party 720 for the generation of interim-mac$_1$ (for example, $x_1$ and/or $W_1$) and/or any other data using which $e_1$ and/or $s_1$ is obtained (for example, $x_1$ and/or $Q_1$)) has been modified in some unexpected way and/or generated incorrectly by the first party 720; and/or at least part of the protocols used for the generation of $W_1$ and/or interim-mac$_1$ and/or $e_1$ and/or $s_1$ have been modified in some way. Failure of the first authentication process may additionally or alternatively indicate that the second party 730 has been compromised in some way. For example: at least part of the data using which $h_2$ is obtained (for example, $W_2$ and/or $Q_1$, etc) has been incorrectly generated and/or modified in some unexpected way; and/or at least part of the protocols used for the generation of $W_2$ and/or $h_2$ have been modified in some way. Failure of the first authentication process may additionally or alternatively indicate that transmissions of data from the first party 720 to the second party 730 (for example, of interim-$mac_1$ and/or $e_1$ and/or $s_1$) have been compromised in some way, such that that data has been modified or corrupted during transmissions.

In any event, the MPC operation can no longer be trusted and the second party 730 may proceed to step 1060 (the 'No' path in FIG. 10), where a predetermined action indicative of failure of the MPC operation—in this instance, sending an authentication failure notification to the calling module 710 and/or any other relevant part of module of the transaction software 110 (either directly, or via the first party)—is performed.

However, if $h_2$ does equal $e_1$, the first authentication data has passed the first authentication process and the second party 730 may proceed to step 1050 (the 'Yes' path in FIG. 10), where an authentication pass notification is sent to the calling module 710 (either directly, or via the first party). In particular, passing the first authentication process may show that $W_1$ and $W_2$ are equal, so interim-$mac_1$ and interim-$mac_2$ should be trustworthy, and that the first and second parties 720 and 730 have both correctly carried out the first authentication process, and are therefore trustworthy parties.

The first party 720 may separately perform a second authentication process based on $e_2$ (second authentication value) and $h_1$ (first check value). In particular, in the second authentication process, the first party 720 may check to see if $h_1$ is equal to $e_2$. If $h_1$ does not equal $e_2$, the second authentication data has failed the second authentication process and the MPC operation is considered to have failed.

Failure of the second authentication process may indicate that the second party 730 has been compromised in some way. For example: at least part of the data used by the second party 730 for the generation of interim-$mac_2$ (for example, $x_2$ and/or $W_2$) and/or any other data used using which $e_2$ and/or $s_2$ is obtained (for example, $x_2$ and/or $Q_2$) has been modified in some unexpected way and/or generated incorrectly by the second party 730; and/or at least part of the protocols used for the generation of interim-$mac_2$ and/or $e_2$ and/or $s_2$ have been modified in some way. Failure of the first authentication process may additionally or alternatively indicate that the first party 720 has been compromised in some way: For example: at least part of the data using which $h_1$ is obtained (for example, $W_1$ and/or $Q_2$) has been incorrectly generated and/or modified in some unexpected way; and/or at least part of the protocols used for the generation of $W_1$ and/or $h_1$ have been modified in some way. Failure of the second authentication process may additionally or alternatively indicate that transmissions of data from the second party 730 to the first party 720 (for example, of interim-$mac_2$ and/or $e_2$ and/or $s_2$) have been compromised in some way, such that that data has been modified or corrupted during transmissions.

In any event, the MPC operation can no longer be trusted and the first party 720 may then proceed to step 1060 (the 'No' path in FIG. 10), where a predetermined action indicative of failure of the MPC operation—in this instance, sending an authentication failure notification to the calling module 710 and/or any other relevant part of module of the transaction software 110 (either directly, or via the second party)—is performed.

However, if $h_1$ does equal $e_2$, the second authentication data has passed the first authentication process and the first party 720 may proceed to step 1050 (the 'Yes' path in FIG. 10), where an authentication pass notification is sent to the calling module 710 and/or any other relevant part or module of the transaction software 110 (either directly, or via the second party). In particular, passing the second authentication process may show that $W_1$ and $W_2$ are equal, so interim-$mac_1$ and interim-$mac_2$ should be trustworthy, and that the first and second parties 720 and 730 have both correctly carried out the second authentication process, and are therefore trustworthy parties.

If the calling module 710 receives only authentication pass notifications, the MPC operation will be considered to have passed further authentication and MAC(m) will be considered authenticated. If the calling party 710 (and/or any other relevant part or module of the transaction software 110) receives at least one authentication failure notification, the MPC operation will be considered to have failed further authentication. The calling module 710 (and/or any other relevant part of module of the transaction software 110) may then discard MAC(m) (and optionally also mac and mac') and/or take action to recall MAC(m) if it is already in use, for example as authentication data.

Thus, it can be seen that further authentication can identify an alteration in either first and/or second parties 720 and 730 (for example, as a result of a fraudulent entity attempting to access either or both of the parties 720 and 730) and/or an imperfect emulation of the first and/or second party 720 and 730. It can also identify errors in the operation of the first and/or second parties 720 and 730, which may be the result of malicious activity, but nevertheless result in the generation of an incorrect, and therefore useless, MAC(m).

Configuring the first and second parties 720 and 730 to generate e and s as described above therefore makes the first and second parties 720 and 730 more difficult to emulate accurately and makes the detection of any alterations to the first and/or second parties 720 and 730 more likely.

In an alternative, in step 1050, the first and second parties 720 and 730 may not send anything to the calling module 710. In this case, the calling module 710 may assume that further authentication has been passed, unless it receives at least one authentication failure notification from the first party 720 and/or second party 730.

In a further alternative, the second party 730 may pass its authentication notification (either success or failure) to the first party 720. If either the first party 720 or second party 730 determine that further authentication has been failed, the first party 720 may send an authentication failure notification to the calling module 710. If both the first and second party 720 and 730 determine that further authentication has been passed, the first party 720 may send an authentication pass notification to the calling module 710 (or send nothing at all, where the calling module 710 assumes that further authentication has been passed, unless it receives an authentication failure notification).

Likewise, in a further alternative, the first party 720 may pass its authentication notification (either success or failure) to the second party 730. If either the first party 720 or second party 730 determine that further authentication has been failed, the second party 730 may send an authentication failure notification to the calling party 710. If both the first and second party 720 and 730 determine that further authentication has been passed, the second party 730 may send an authentication pass notification to the calling module 710 (or send nothing at all, where the calling module 710 assumes that further authentication has been passed, unless it receives an authentication failure notification).

Where both preliminary and further authentication take place, the first authentication data may comprise interim-$mac_1$ and authentication value $e_1$ and the second authentication data may comprise interim-$mac_2$ and authentication value $e_2$. The first authentication process and the second authentication process may thus comprise steps 940 and 1040.

However, where only further authentication takes place, the first authentication data may comprise authentication value $e_1$ and the second authentication data may comprise authentication value $e_2$. The first authentication process and the second authentication process may thus comprise step 1040.

In an alternative implementation, further authentication may be performed as part of the MPC operation such that further authentication is completed prior to sending mac and mac' (or MAC(m)) to the calling module 710 in step 980. In this way, only if further authentication is passed will the result (mac and mac' and/or MAC(m)) be returned to the calling module 710.

Figure 11:
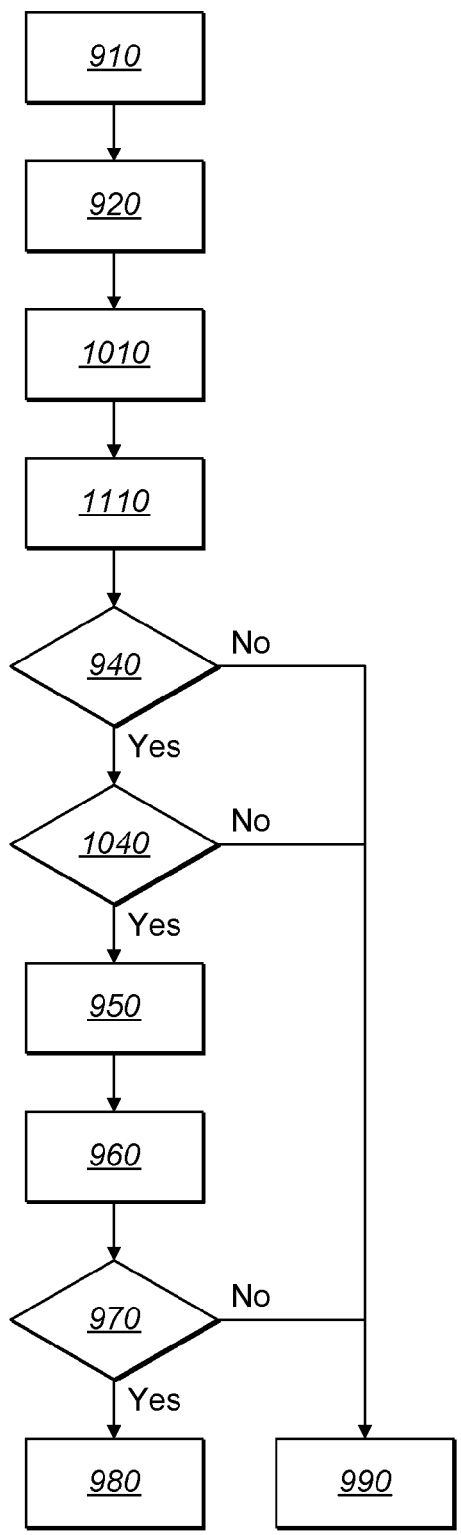
FIG. 11 is a flowchart illustrating a further method for generating a MAC using the system of FIG. 7.

FIG. 11 shows a flowchart illustrating a further method for generating a MAC of message m (MAC(m)) using MPC, including preliminary and further authentication in accordance with this alternative implementation.

Steps 910, 920 and 1010 are performed as explained earlier.

In step 1110, the first party 720 passes interim-$mac_1$ and $s_1$ and $e_1$ to the second party 730 and the second party 730 passes interim-$mac_2$ and $s_2$ and $e_2$ to the first party 720, such that the first and second parties 720 and 730 exchange interim-macs and authentication values s and e.

Step 940 is then performed as explained earlier. In particular, as part of a first authentication process on the first authentication data (which comprises interim-$mac_1$), the second party 730 checks that interim-$mac_1$ is on the elliptic curve. If interim-$mac_1$ is not on the elliptic curve (i.e. interim-$mac_1 \notin E(F_p)$), the first authentication data has failed the first authentication process and the MPC operation is considered to have failed. The second party 730 may then proceed to step 990 (the 'No' path shown in FIG. 11). Separately, as part of a second authentication process on the second authentication data (which comprises interim-$mac_2$), the first party 720 checks that interim-$mac_2$ is on the elliptic curve. If interim-$mac_2$ is not on the elliptic curve (i.e. interim-$mac_2 \notin E(F_p)$), the second authentication data has failed the second authentication process and the MPC operation is considered to have failed. The second party 730 may then proceed to step 990 (the 'No' path shown in FIG. 11).

If interim-$mac_1$ and interim-$mac_2$ are both found to be on the elliptic curve in step 940, preliminary authentication has been passed and the first and second parties 720 and 730 may proceed to step 1040 (the 'Yes' path shown in FIG. 9).

Step 1040 is then performed as explained earlier. In particular, as part of the first authentication process on the first authentication data (which comprises $e_1$), the second party 730 checks to see if $h_2$ is equal to $e_1$. If $h_2$ does not equal $e_1$, the first authentication data has failed the first authentication process and the MPC operation is considered to have failed. The second party 730 may then proceed to step 990 (the 'No' path in FIG. 11). Separately, as part of the second authentication process on the second authentication data (which comprises $e_2$), the first party 720 checks to see if $h_1$ is equal to $e_2$. If $h_1$ does not equal $e_2$, the second authentication data has failed the second authentication process and the MPC operation is considered to have failed. The first party 730 may then proceed to step 990 (the 'No' path in FIG. 11).

If both the first party 720 determines that $h_1$ equals $e_2$ and the second party 730 determines that $h_2$ equals $e_1$, further authentication has been passed and the first and second parties 720 and 730 may proceed to step 950 (the 'Yes' path in FIG. 11).

Steps 950-990 are performed as explained earlier.

Thus, the first and second parties 720 and 730 may carry out preliminary and further authentication in the first and second authentication processes and only if both are passed is the result of the MPC operation (mac and mac', and/or MAC(m)) returned to the calling module 710 in step 960.

It will be appreciated that FIG. 11 represents only one example of how the further method for generating a MAC of message m (MAC(m)) using MPC, including preliminary and further authentication, may be performed. The steps of the method may be performed in any suitable alternative order, for example step 1040 may take place before step 940 such that further authentication takes place before preliminary authentication. Furthermore, rather than generating the interim-macs and values e and s and then exchanging them at the same time in step 1110, the interim-macs may be generated and then exchanged for preliminary authentication. If preliminary authentication is passed, the values e and s may be generated and exchanged for further authentication.

Performing preliminary and further authentication before performing steps 950 and 960 may increase the chances that the calling module 710 will obtain an accurate, reliable MAC(m). However, as a larger number of processing steps take place before the calling module 710 obtains MAC(m), there may be a greater time delay between requesting the MPC operation in step 910 and obtaining MAC(m) in step 980.

Which of the three MAC generation and authentication methods of FIGS. 9-11 is implemented may be chosen based on the requirements placed on the transaction software 110. For example, in some implementations, speed may be important, for example where a service-level agreement (SLA) specifies that a transaction must be completed within a certain period of time. In this case the methods of FIG. 9 or 10 may be used. In other implementations, speed may be of less importance, and accuracy and reliability of MAC(m) generation may be of greater importance, in which case the method of FIG. 11 may be used.

The transaction software 110 may be configured to have the capability of performing two or more of the methods of FIGS. 9-11 and may select which to use on a transaction-by-transaction basis. For example, the transaction software 110 may determine that the transaction value is low and/or that a fast transaction is required (for example, from the information relating to the transaction) and/or that the electronic device 100 has slow processing speeds and thus use the method of FIG. 9 or 10. Likewise, the transaction software 110 may determine that the transaction value is high and/or that speed is not important (again, for example, from the information relating to the transaction) and/or that the electronic device 100 has fast processing speeds, and thus use the method of FIG. 11.

It will be appreciated that in an alternative implementation, for the preliminary authentication and/or further authentication, only the first authentication process may be performed and the second authentication process is not performed at all, and authentication still achieved satisfactorily. Furthermore, whilst the first authentication data and second authentication data is based on interim-$mac_1$ (the intermediate data generated by the first party 720) and interim-$mac_2$ (the intermediate data generated by the second party 730) respectively, the first authentication data and second authentication do not necessarily comprise interim-mac$_1$ and interim-mac$_2$ respectively. Instead, they may be derived from interim-mac$_1$ and inter-mac$_2$ respectively. For example, where only further authentication is performed, the first and second authentication processes are performed on e$_1$ and e$_2$, which are both derived from interim-mac$_1$ and interim-mac$_2$ respectively—in this instance, the interim-macs may still be exchanged between the first and second parties 720 and 730 and used during further authentication (for example, for the generation of check values h), but the first and second authentication processes are performed on authentication values e, not on the interim-macs, so the first and second authentication data may comprise e$_1$ and e$_2$ respectively, and not interim-mac$_1$ and interim-mac$_2$ respectively. Furthermore, for the preliminary authentication and/or further authentication, the first authentication process and/or the second authentication process may be performed by a party or entity other than the second party 730 and the first party 720 respectively. For example, the first authentication process and/or second authentication process may be performed by an authentication party that is a further party to the MPC process.

As indicated above, the method for refreshing the first and second secret data held by the first and second parties 720 and 730 described with reference to FIG. 8 is compatible with the authentication techniques described with reference to FIGS. 9 to 11. In particular, the first and second secret data x$_1$ and x$_2$ may be refreshed using the method for refreshing, and those refreshed secret data still be used in authentication techniques described above (i.e., the refreshing and authentication techniques are such that refreshing the first and second secret data x$_1$ and x$_2$ will not cause the authentication techniques to fail, because the first and second secret data x$_1$ and x$_2$ are refreshed in such a way that the 'key value' they represent does not change)

It will be appreciated that where elliptic curve cryptography is used in any of the above described methods, the elliptic curves used may be any suitable type of elliptic curve, for example those defined in the NIST (http://www.nist.gov/publication-portal.cfm) ANSI (http://www.ansi.org/) and SECG (http://www.secg.org/) standards, and that the toolkits used to perform the above described methods may be any suitable type of toolkit, for example OpenSSL (https://wiki.openssl.org/index.php/Command_Line_Elliptic_Curve_Operations) or ECCTK (http://www.cryptograph-ic.com/ecctk/en/).

Whilst in the above described MPC implementations two parties jointly perform a cryptographic process using MPC to generate a result, it will be appreciated that any number of parties may be implemented in software on the electronic device 100 and jointly perform MPC to execute a cryptographic process to generate a result. For example, three or more parties may be implemented and each of the three or more parties may store respective secret data.

At least one of the three or more parties may be programmed using a different programming language to one or more of the other parties. For example, two parties may be programmed using one programming language (such as C++) and one or more of the other parties may be programmed using a different programming language (such as Java). Alternatively, each of the three or more parties may be programmed using a different programming language, for example, a first party may be programmed using a first programming language (such as C), a second party may be programmed using a second programming language (such as Perl), a third party may be programmed using a third programming language (such as Java), etc.

At least one of the three or more parties may be implemented as obfuscated code. For example, the programming of all three or more parties may be obfuscated. The obfuscation technique/methodology used for at least one of the three or more parties may be different to the technique/methodology used for one or more of the other parties. For example, two parties may be obfuscated using one obfuscation technique/methodology and one or more of the other parties may be obfuscated using a different obfuscation technique/methodology. Alternatively, each of the three or more parties may be obfuscated using a different obfuscation technique/methodology. For example, a first party may be obfuscated using a first obfuscation technique/methodology, a second party may be obfuscated using a second obfuscation technique/methodology, a third party may be obfuscated using a third obfuscation technique/methodology, etc.

Whilst the above MPC implementations and techniques have been described above for use in mobile financial transactions using NFC, it will be appreciated that they may be utilised for any purpose where a cryptographic process is to be undertaken using software.

Any cryptographic process for encryption or decryption of data, or any other sort of cryptographic process, may be carried out using the MPC implementations described above. For example, the cryptographic process may comprise a data encryption or decryption process and/or a keyed hash function (which may be a cryptographic hash function, or any other function suitable for generating a message authentication code) for generating a message authentication code, and/or a process for generating a digital signature, and/or a process for validating or authenticating a message authentication code or a digital signature, etc.

Those processes may be carried out on a mobile electronic device, or on a static electronic device, or on a server, or a POS, or any other computing apparatus with a processor configured to execute a software program that is configured to perform one or more of the MPC processes described above.

Whilst the calling module 710, the first party 720 and second party 730 are all described as being modules (or 'applications' or 'sub-applications' or 'sub-modules') within the transaction software 110, it will be appreciated that one or more of those modules (or 'applications' or 'sub-applications' or 'sub-modules') may alternatively be implemented elsewhere within the electronic device 100. For example, the calling module 710 may form part of the transaction software 110 and each of the first party 720 and the second party 730 may be implemented as separate software instances (or 'modules' or 'applications') on the electronic device 100, separate from, but in direct or indirect communication with, the transaction software 110. Each of the first and second parties may be provisioned to the electronic device 100 along with the transaction software 110, or separately from the transaction software 110, for example as part of an update to the software.

Alternatively, only one of the first or second parties may be implemented as a module within the transaction software 110, with the other parties being implemented as a software module outside of the transaction software 110.

The one or more parties that are implemented outside the transaction software 110 may be implemented as standalone modules (or 'applications'), or they may be implemented as part of another software module, for example another banking or financial application/module/instance, or any other application/module/instance implemented in software on the electronic device 100. Thus, the functionality of at least one of the parties may be implemented as a module (or 'application' or 'sub-application' or 'sub-module') within another software application/module/instance on the electronic device 100. Where both the first and second parties are implemented outside of the transaction software 110, they may both be implemented as modules (or 'applications' or 'sub-applications' or 'sub-modules') within one other software application/module/instance, or the first party may be implemented as a module (or 'application' or 'sub-application' or 'sub-module') within a first other software application/module/instance and the second party may be implemented as a module (or 'application' or 'sub-application' or 'sub-module') within a second other software application/module/instance, or as a stand-alone second party software instance/module/application.

In all of these cases, each of the first and second parties may be provisioned to the electronic device 100 along with the transaction software 110, or separately from the transaction software 110, for example as part of an update to the software on the electronic device 100.

The provisioning system 172 may be configured to generate at least part of the software for performing the MPC process described above, or the software may be generated by a different system.

Various other alternatives to the above aspects of the present disclosure may be readily appreciated.

For example, the processes shown in FIGS. 3 and 4 and described above may generate any type of authentication data that is suitable for the authentication of a transaction. For example, they may generate an ARQC, or any other type of message authentication code (MAC), or hashed message authentication code (HMAC), or another other suitable data.

Furthermore, the process of generating the authentication data may be different to that shown in FIG. 3. For example, CA1 may be excluded altogether and CA2 may generate authentication data using a suitable cryptographic key (which may be DK 320, or any other key). The authentication data may be based on the device information 350 and any other suitable data, for example one or more of the internal card data 330, at least part of the transaction information 340, ATC 310 and/or any other suitable data. Furthermore, additional or alternative cryptographic algorithms to CA1 may be utilised.

Furthermore, for 'high-value' transactions, any process involving a user entered PIN may be undertaken. For example, CA3 may be omitted entirely and CA4 may use any suitable cryptographic key, for example SK1 or any other key. The PIN authentication data may be based on the user entered PIN and any other suitable data, for example the initialisation vector 370 and/or any other data. Furthermore, additional or alternative cryptographic algorithms to CA3 may be utilised. Alternatively, the authentication data generated by CA2 may be based at least in part on the user entered PIN 380.

Likewise, the process of generating the authentication data may be different to that shown in FIG. 4. For example, CA5 may be excluded altogether and CA6 may generate authentication data using a suitable cryptographic key (which may be DK 320, or any other key). The authentication data may be based on the device information 350 and any other suitable data, for example one or more of the ATC 310, data relating to the transaction 340, the identifier of the virtual payment product 410 and the cryptographic version number (CVN) 420. Furthermore, where CA5 is included in the process, it may generate the hash, or any other suitable data such as a session key, based on the based on the device information 350 and any other suitable data, for example one or more of the ATC 310, data relating to the transaction 340, the identifier of the virtual payment product 410 and the cryptographic version number (CVN) 420. CA6 may then generate authentication data based on the output of CA5 and any other suitable data, for example any one or more of the above identified inputs that have not be used by CA5. Further, additional or alternative cryptographic algorithms to CA5 may be utilised.

Furthermore, for 'high-value' transactions, any process involving a user entered PIN may be undertaken. The PIN authentication data 440 may be based on the user entered PIN 380 and any other suitable data, for example the initialisation vector 370 and/or any other data. Furthermore, additional or alternative cryptographic algorithms to CA7 may be utilised. Alternatively, the authentication data generated by CA6 may be based at least in part on the user entered PIN 380.

Furthermore, a 'PIN transaction' may be required for transactions other than 'high-value' transactions. For example, the information relating to the transaction received by the electronic device 100 in Step S210 may indicate that a PIN transaction is required, regardless of the transaction value. For example, this may be implemented when purchasing age restricted products, paying for age restricted services such as gambling, or for any other reason.

The authentication information included in the transmission of Step S230 may take any form and may adhere to any suitable standards, for example EMVco standards.

The virtual transaction card provisioned on the transaction software 110 may be any type of financial transaction card, for example a credit card, debit card, prepayment card etc, from any card issuer.

The provisioning system 172 may be configured to generate DK 320 and/or the initialisation vector 370 itself, or to instruct a different entity to generate one or both of DK 320 and/or the initialisation vector 370.

The provisioning system 172 may store, in the database(s), the original value for DK 320, or may store other data that the authorisation system 171 can used to derive the original value of DK 320. Therefore, the DK 320 associated with the virtual transaction card may be obtained by retrieval or derivation. The same applies analogously to the PIN 380 and/or the initialisation vector 370 and/or the device information 350.

Whilst FIG. 1 shows a direct data communication channel between the electronic device 100 and the host system 170, there may be any number of intervening elements, for example a mobile gateway etc. Likewise, there may also be any number of intervening elements in the data connection between the POS 160 and the host system 170.

Whilst the ATC 310 is described above as being implemented using an incremental counter, it may be implemented using any form of counter, for example a decremental counter, or any other means by which each transaction may be uniquely identified.

It will be appreciated that the methods described have been shown as individual steps carried out in a specific order. However, the skilled person will appreciate that these steps may be combined or carried out in a different order whilst still achieving the desired result.

It will be appreciated that embodiments of the invention may be implemented using a variety of different information processing systems. In particular, although the figures and the discussion thereof provide an exemplary computing system and methods, these are presented merely to provide a useful reference in discussing various aspects of the invention. It will be appreciated that the boundaries between logic blocks are merely illustrative and that alternative embodiments may merge logic blocks or elements, or may impose an alternate decomposition of functionality upon various logic blocks or elements.

It will be appreciated that the above-mentioned functionality may be implemented as one or more corresponding software modules or components. Method steps implemented in flowcharts contained herein, or as described above, may each be implemented by corresponding respective modules; multiple method steps implemented in flowcharts contained herein, or as described above, may together be implemented by a single module.

It will be appreciated that, insofar as embodiments of the invention are implemented by software (or a computer program), then a storage medium and a transmission medium carrying the computer program form aspects of the invention. The computer program may have one or more program instructions, or program code, which, when executed by a computer carries out an embodiment of the invention. The term "program" or "software" as used herein, may be a sequence of instructions designed for execution on a computer system, and may include a subroutine, a function, a procedure, a module, an object method, an object implementation, an executable application, an applet, a servlet, source code, object code, a shared library, a dynamic linked library, and/or other sequences of instructions designed for execution on a computer system. The storage medium may be a magnetic disc (such as a hard drive or a floppy disc), an optical disc (such as a CD-ROM, a DVD-ROM or a BluRay disc), or a memory (such as a ROM, a RAM, EEPROM, EPROM, Flash memory or a portable/removable memory device), etc. The transmission medium may be a communications signal, a data broadcast, a communications link between two or more computers, etc.

ANNEX C

*Notation*

All finite fields will be prime finite fields, thus $\mathbb{F}_p$ etc. denotes the set of integers modulo $p$. We assume all operations modulo $p$ are in the range $[0, ..., p-1]$ The operation x <- y means assign y to the variable x. If we use x <- X where X is a set, we mean assign x a random element in X chosen uniformly at random.

The operation x *G, where x is an integer (or an integer modulo $q$) and G is an elliptic curve point, refers to elliptic curve point multiplication. And P + Q (resp. P - Q) where P and Q are elliptic curve points refers to elliptic curve point addition (resp. subtraction).

$\ell$ is the length of the RSA key in bits

The MAC is based on an elliptic curve $E(\mathbb{F}_p)$ of prime group order $q$ G is the generator of the elliptic curve such that $E(\mathbb{F}_p)$ = <G>

$c_i$ is a counter value where the value will be $2^n$ where n is 16 or 32

*Key Refresh*

Described below is the method used to refresh the key shares held by the entities participating in a Multiparty Computation (MPC) protocol. It should be noted that this is *not* the changing of the key value as a whole, it pertains to the way the key parts are stored.

Overview:

In a two party implementation of a MPC protocol the key shares held by each party (Alice and Bob) can be mutated by:

Note: the key shares will be represented as integer values.

1. Alice generates an ephemeral key pair on a given Elliptic Curve
2. Bob generates an ephemeral key pair on a given Elliptic Curve
3. Alice and Bob swap public keys
4. Using ECDH Alice and Bob agree a positive number within a given size (measured in bits)
5. Depending on the algorithm the key is destined for, an additional check may be performed to ensure that result of the operation will not result in a negative value.
6. Alice will add the agreed value to her stored key share value to give a new key share value which replaces the current stored value.
7. Bob will subtract the agreed value from his stored key share value to give a new key share value which replaces the current stored value.
8. Alice and Bob will destroy:
    a. the agreed number b. their ephemeral EC key pair
c. the ephemeral public key of the other party
d. the old stored key value

Protocol to agree a random number

This protocol generates a random $k$ bit number/bitstring $v$ between parties $A_1$ and $A_2$, such that no eaves dropper can learn $v$, and neither $A_1$ nor $A_2$ can control the output in any way. This is done by using Diffie–Hellman key exchange.

1. Party $A_i$ selects $k_i$ <- $F_q$.
2. Party $A_i$ sets $Q_i$ $k_i * G$.
3. Party $A_i$ transmits $Q_i$ to player $A_{3-i}$.
4. Party $A_i$ sets $T$ <- $k_i * Q_{3-i}$.
5. Both parties compute $v = $ PRG$(T; k)$.

Pseudo-random generator PRG(m,k)

This function will take a short message m and from it generate a sequence of bits of arbitrary length. The value k will be used to define the length/number of bits required.

1. $s$ <- $\lfloor k / 256 \rfloor$
2. For $i = 0, \ldots, s-1$ do
    - $b_i$ $H_1(m \| i)$, where we pad $m$ with a 32-bit integer representing i.
3. If $k \pmod{256} \ne 0$
    - $b_s$ <- $H1(m \| s)$.
    - Truncate $b_s$ to $k - 256 * s$ bits.
4. Output $b_0, \ldots, b_{s-1}$.
5. Output $b_s$ if $b_s$ is non-empty.

Note: Hash function H1(..) is SHA-256, when applying hash functions to finite field elements or elliptic curve points we take a canonical bit representation of the element. It does not matter which one, as long as the software components agree on it.

| $A_1$ | | $A_2$ |
|---|---|---|
| $k_1 \leftarrow \mathbb{F}_q$ | | $k_2 \leftarrow \mathbb{F}_q$ |
| $Q_1 \leftarrow k_1 \cdot G$ | | $Q_2 \leftarrow k_2 \cdot G$ |
| | $\xrightarrow{Q_1}$ | |
| | $\xleftarrow{Q_2}$ | |
| $T \leftarrow k_1 \cdot Q_2$ | | $T \leftarrow k_2 \cdot Q_1$ |
| $v \leftarrow \mathrm{PRG}(T, k)$ | | $v \leftarrow \mathrm{PRG}(T, k)$ |
| $v$ | | $v$ |

*RSA Refresh Protocol*

This protocol is executed between $A_1$ and $A_2$ for the refreshing of RSA key parts.

1. The party $A_i$ executes v <- AgreeRandom($\ell - 1 - n$)
2. Party $A_i$ sets $c_i$ <- $c_i - 1$
3. If $c_i = 0$ then party $A_i$ sets an error condition and aborts.
4. Party $A_1$ sets $d_1$ <- $d_1 - v$ (over integers)
5. Party $A_2$ sets $d_2$ <- $d_2 + v$ (over integers)
6. Party $A_i$ signals success

*Elliptic Curve Refresh Protocol*

This protocol is executed between $A_1$ and $A_2$ for the refreshing of EC key parts, in addition the public key held by $A_i$ and $A_{3-i}$ will also be updated.

1. The party $A_i$ executes v <- AgreeRandom($\ell - 1 - n$)
2. Party $A_1$ sets $x_1$ <- $x_1 - v$ (mod $q$)
3. Party $A_2$ sets $x_2$ <- $x_2 + v$ (mod $q$)
4. Party $A_i$ set $Q_2$ <- $Q_2 - v * G$ and $Q_1$ <- $Q_1 + v * G$
5. Party $A_i$ signals success Note: There is no refresh limit for this operation.

*Verification of MAC generation process*

Due to the inherent nature of MAC algorithms being based on a secret key, it is not possible to have a public verification of the generated result (unlike RSA). However we can utilise Zero knowledge proofs to check for errors or attacks in the generation of the MAC. The idea is that $A_i$ will check the MAC value generated by $A_{3-i}$ by performing zero knowledge proof of the equality of discrete logarithms.

There are three possible deployment options in which the generation and transmission of the MAC can occur:

1. The MAC is optimistically generated and sent without the validation of the MAC being performed.
2. The MAC is generated and transmitted, and then the validation of the MAC is performed.
3. The MAC is generated, the validation of the MAC is performed and if correct the MAC is sent.

The reason for the three methods is to allow an application to select the method which would allow the application to meet any SLA restrictions on the generation and transmission of the MAC.

For the protocol we will require a new party in addition to $A_1$ and $A_2$, the party will request the generation of MAC values from Ai and is responsible for the transmission of the MAC. This party will be designated as R.

Option 1

In this option the MAC is optimistically generated and send to the requestor, no additional verification of the calculations undertaken by party $A_1$ or $A_2$ is performed.

1. R requests a MAC generation from $A_1$ and $A_2$
2. Party $A_i$ computes :-
   a. T <- H2(message)
   b. Interim-mac$_i$ <- $\alpha_i$ * T
   c. Send interim-mac$_i$ to party $A_{3-i}$
3. On receiving interim-mac$_{3-i}$ party $A_i$ perform:-
   a. Check interim-mac$_{3-i}$ is on the curve. If not then abort and send an error message to R
   b. Send to R MAC <- truncation(interim-mac$_{3-i}$ + interim-mac$_i$ )
4. R compares that the MAC values from A1 and A2 and if they compare it transmits the MAC else it aborts

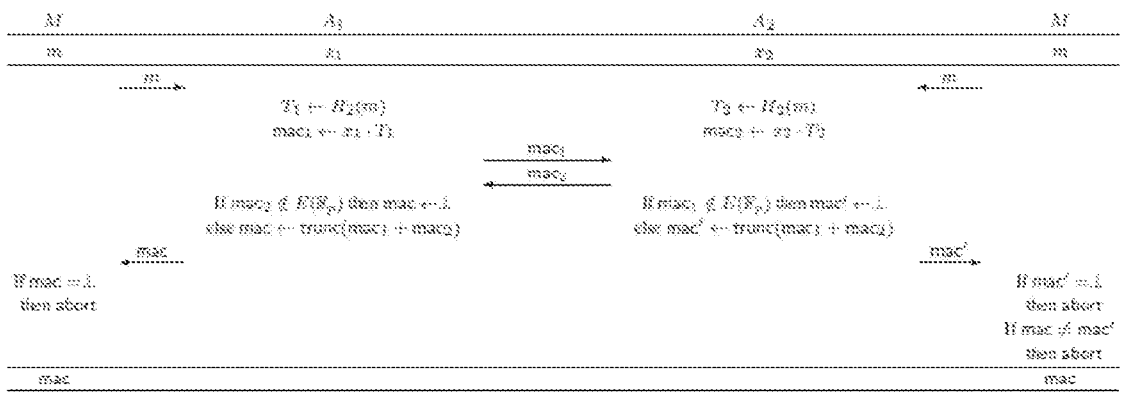

Option 2

In this option the MAC is generated and sent to the Requestor (R), before additional verification of the calculations undertaken by party $A_1$ or $A_2$ is performed.

1. R requests a MAC generation from $A_1$ and $A_2$

2. Party $A_i$ computes :-
    a. T <- H2(message)
    b. Interim-mac$_i$ <- $x_i$ * T
    c. Send interim-mac$_i$ to party $A_{3-i}$
3. On receiving interim-mac$_{3-i}$ party $A_i$ perform:-
    a. Check interim-mac$_{3-i}$ is on the curve. If not then abort and send an error message to R
    b. Send to R MAC <- truncation(interim-mac$_{3-i}$ + interim-mac$_i$ )
4. R compares that the MAC values from A1 and A2 and if they compare it transmits the MAC else it aborts
5. Party $A_i$ computes:-
    a. r <- $F_q$
    b. $U_i$ <- r * G, $V_i$ <- r *T
    c. $e_i$ <- H1($Q_i$ || T || MAC$_i$ || $U_i$ || $V_i$) (mod $q$)
    d. $s_i$ <- r – $x_i$ * $e_i$ (mod $q$)
    e. Send ($s_i$ , $e_i$) to A $_{3-i}$
6. On receiving ($s_{3-i}$ , $e_{3-i}$) Party $A_i$ computes:-
    a. $U_{3-i}$ <- $s_{3-i}$ * G + $e_{3-i}$ * $Q_{3-i}$
    b. $V_{3-i}$ <- $s_{3-i}$ * T + $e_{3-i}$ * MAC$_{3-i}$
    c. h <- H1($Q_{3-i}$ || T || MAC$_{3-i}$ || $U_{3-i}$ || $V_{3-i}$) (mod $q$)
    d. if h not equal to $e_{3-i}$ abort and send an error message to R else return True to R
7. If Party R receives an error message it will abort.

Option 3

In this option the interim MAC shares are generated and the verification of the calculations undertaken by party $A_1$ or $A_2$ is performed. On successful completion of the verification of the generation of the interim mac shares they are combined and the MAC is returned to the Requestor.

1. R requests a MAC generation from $A_1$ and $A_2$
2. Party $A_i$ computes :-
    a. $T_i$ <- H2(message)
    b. Interim-mac$_i$ <- $\alpha_i * T_i$
    c. r <- $\mathbb{F}_q$
    d. $U_i$ <- r * G, $V_i$ <- r *T
    e. $e_i$ <- H1($Q_i$ || T || MAC$_i$ || $U_i$ || $V_i$) (mod $q$)
    f. $s_i$ <- r – $\alpha_i * e_i$ (mod $q$)
    g. Send (Interim-mac$_i$, $s_i$, $e_i$) to $A_{3-i}$
3. On receiving (Interim-mac$_{3-i}$, $s_{3-i}$, $e_{3-i}$) Party $A_i$ computes:-
    a. Check Interim-mac$_{3-i}$ is on the curve, if not abort and send an error message to R
    b. $U_{3-i}$ <- $s_{3-i}$ * G + $e_{3-i}$ * $Q_{3-i}$
    c. $V_{3-i}$ <- $s_{3-i}$ * T + $e_{3-i}$ * MAC$_{3-i}$
    d. h <- H1($Q_{3-i}$ || T || MAC$_{3-i}$ || $U_{3-i}$ || $V_{3-i}$) (mod $q$)
    e. if h not equal to $e_{3-i}$ abort and send an error message to R
    a. else send to R MAC <- truncation(interim-mac$_{3-i}$ + interim-mac$_i$ )
4. If Party R receives an error message it will abort.
5. If Party R does not receive an error message and the values for the MAC returned from $A_1$ and $A_2$ match then R will transmit the MAC

*Hash function H2*

The hash function H1 can be SHA-256.

1. x <- H1(m) (mod $p$)   i.e. convert the hash output to an integer modulo $p$
2. z <- $x^3$ + A * x + B
3. y <- SqrRoot(z, $p$)
4. if y is *false* then:
    a. x <- x + 1
    b. Goto step 2
5. Output (x, y)

*Function Square Roots Modulo p*

We will require the extraction of the square routes modulo $p$, where $p$ is the prime for the elliptic curve scheme. Note that $p$ = 3 (mod 4 ) which implies that taking squares can be perform using a simple method.

1. t <- ($p$ - 3)/4
2. u <- $x^t$ ( mod $p$)
3. s <- u * x ( mod $p$)
4. c <- $u^2$ * x ( mod $p$)
5. if c not equal to ($p$ -1) then return s else return *false*

Note: s = $x^{(p-1)/4}$ and c = $x^{(p+1)/2}$ thus s is the square root and c is the Legendre symbol which will indicate if the square root exists

The invention claimed is:

1. An electronic device comprising:
a memory;
a processor coupled to the memory; and
a virtual secure element stored on the memory, the virtual secure element executed by the processor, the virtual secure element comprising:
  a first party application having programmed instructions to:
    conceal first secret data from a second party application;
    generate first intermediate data based on the first secret data;
    pass the first intermediate data to the second party application;
    authenticate second intermediate data received from the second party application;
    generate a first authentication value based, at least in part, on the first intermediate data;
    pass the first authentication value to the second party application;
    receive a second authentication value from the second party application;
    calculate a first check value based on the second intermediate data; and
    compare the first check value to the second authentication value; and
  the second party application having programmed instructions to:
    conceal second secret data from the first party application;
    generate the second intermediate data based on the second secret data;
    pass the second intermediate data to the first party application;
    authenticate the first intermediate data;
    generate the second authentication value based, at least in part, on the second intermediate data;
    pass the second authentication value to the first party application;
    receive the first authentication value from the first party application;
    calculate a second check value based on the first intermediate data; and
    compare the second check value to the first authentication value,
  wherein the first secret data is different from the second secret data.

2. The electronic device of claim 1,
wherein the virtual secure element further comprises a calling module application,
wherein the first party application having programmed instructions to:
  compute a first authentication data based on the first intermediate data and the second intermediate data in response to authenticating the second intermediate data; and
  send the first authentication data to the calling module application, wherein the second party application having programmed instructions to:
  compute a second authentication data based on the first intermediate data and the second intermediate data in response to authenticating the first intermediate data; and
  send the second authentication data to the calling module application, and
wherein the calling module application having programmed instructions to compare the first authentication data and the second authentication data.

3. The electronic device of claim 2, wherein the first authentication data comprises at least one of a message authentication code (MAC), an authorization request cryptogram (ARQC), a digital signature, and cipher text.

4. The electronic device of claim 1, wherein the first party application having programmed instructions to determine, via elliptic curve cryptography, whether the first intermediate data is on a first elliptic curve, and wherein, the second party application having programmed instructions to determine, via the elliptic curve cryptography, whether the second intermediate data is on a second elliptic curve.

5. The electronic device of claim 1,
wherein the first party application having programmed instructions to:
  generate a first public key corresponding to the first secret data;
  share the first public key with the second party application, and
wherein the second party application having programmed instructions to:
  generate a second public key corresponding to the second secret data;
  share the second public key with the second party application.

6. The electronic device of claim 5, wherein the first authentication value is based, at least in part, on the first public key, and wherein the second authentication value is based, at least in part, on the second public key.

7. The electronic device of claim 1, wherein the first check value is based, at least in part, on the second public key, and wherein the second check value is based, at least in part, on the first public key.

8. The electronic device of claim 7, wherein the first party application having programmed instructions to perform a first hash to obtain the first authentication value, and wherein the second party application having programmed instructions to perform a second hash to obtain the second authentication value.

9. The electronic device of claim 8, wherein the first party application having programmed instructions to perform a third hash to obtain the first check value, and wherein the second party application having programmed instructions to perform a fourth hash to obtain the second check value.

10. The electronic device of claim 9, wherein the virtual secure element further comprises a calling module application, wherein the first party application having programmed instructions to send an authentication failure notification to the calling module application in response to the first check value being different than the second authentication value, and wherein the second party application having programmed instructions to send the authentication failure notification to the calling module application in response to the second check value being different than the first authentication value.

11. The electronic device of claim 9, wherein the virtual secure element further comprises a calling module application, wherein the first party application having programmed instructions to send an authentication pass notification to the calling module application in response to:
the first check value being same as the second authentication value, and the second check value being same as than the first authentication value.

* * * * *